United States Patent
Mallin et al.

(10) Patent No.: US 11,436,938 B2
(45) Date of Patent: Sep. 6, 2022

(54) DEFINING AN INTERACTIVE SESSION THAT ANALYZES USER INPUT PROVIDED BY A PARTICIPANT

(71) Applicant: Debby Webby, LLC, Minneapolis, MN (US)

(72) Inventors: Deb Mallin, Minneapolis, MN (US); Marc Dispensa, Cranford, NJ (US)

(73) Assignee: Debby Webby, LLC, Minneapolis, MN (US)

( * ) Notice: Subject to any disclaimer, the term of this patent is extended or adjusted under 35 U.S.C. 154(b) by 110 days.

(21) Appl. No.: 16/787,913

(22) Filed: Feb. 11, 2020

(65) Prior Publication Data

US 2020/0258417 A1 Aug. 13, 2020

Related U.S. Application Data

(60) Provisional application No. 62/805,034, filed on Feb. 13, 2019.

(51) Int. Cl.
| | |
|---|---|
| G09B 19/00 | (2006.01) |
| G06F 9/451 | (2018.01) |
| G06F 3/0482 | (2013.01) |
| G09B 5/06 | (2006.01) |
| G06F 3/16 | (2006.01) |
| G06F 3/0486 | (2013.01) |
| G06F 3/04883 | (2022.01) |
| G06F 3/0489 | (2022.01) |

(52) U.S. Cl.
CPC .......... *G09B 19/00* (2013.01); *G06F 3/0482* (2013.01); *G06F 3/0486* (2013.01); *G06F 3/0489* (2013.01); *G06F 3/04883* (2013.01); *G06F 3/16* (2013.01); *G06F 9/451* (2018.02); *G09B 5/06* (2013.01)

(58) Field of Classification Search
CPC .......... G09B 19/00; G09B 5/06; G06F 9/451; G06F 3/0482; G06F 3/0486; G06F 3/04883; G06F 3/0489; G06F 3/16
See application file for complete search history.

(56) References Cited

U.S. PATENT DOCUMENTS

| | | | |
|---|---|---|---|
| 3,363,338 A | 1/1968 | Skinner et al. | |
| 3,823,491 A | 7/1974 | Lehmann | |
| 6,227,863 B1 | 5/2001 | Spector | |
| 7,401,293 B2 | 7/2008 | Symmes | |
| 8,956,164 B2 | 2/2015 | Terpstra et al. | |

(Continued)

*Primary Examiner* — Andrew T Chiusano
(74) *Attorney, Agent, or Firm* — Fish & Richardson P.C.

(57) ABSTRACT

In general, the subject matter described in this disclosure can be embodied in methods, systems, and program products for engaging in interactive sessions between computerized devices and participants. The method includes receiving user input that interacts with user controls to specify, for each respective content item in a plurality of content items, a text spelling and an audio recording. The method includes receiving user input that selects a set of user-selected content items from among the plurality of content items for inclusion as part of the first interactive exercise, and assigns an order to the user-selected content items. The computing system presents the selected content items in the user-selected order, receives user input that inputs the respective content items, and determines whether the user input matches the content item.

20 Claims, 49 Drawing Sheets

(56) References Cited

U.S. PATENT DOCUMENTS

| | | | |
|---|---|---|---|
| 2002/0087560 A1* | 7/2002 | Bardwell | G09B 7/00 |
| 2002/0119429 A1 | 8/2002 | Barton | |
| 2007/0055514 A1* | 3/2007 | Beattie | G10L 15/08 |
| | | | 704/235 |
| 2007/0105079 A1 | 5/2007 | O'Toole | |
| 2008/0003552 A1 | 1/2008 | Supe | |
| 2012/0094259 A1* | 4/2012 | Lipsky | G09B 5/04 |
| | | | 434/169 |
| 2013/0224720 A1 | 8/2013 | Kearns | |
| 2014/0234809 A1* | 8/2014 | Colvard | G09B 17/006 |
| | | | 434/169 |
| 2016/0188727 A1* | 6/2016 | Waibel | G09B 19/04 |
| | | | 707/758 |
| 2017/0068986 A1 | 3/2017 | Chan et al. | |
| 2017/0084199 A1* | 3/2017 | Lisitsa | G09B 5/065 |
| 2017/0330479 A1* | 11/2017 | Bowman | G09B 5/125 |
| 2018/0277017 A1* | 9/2018 | Cheung | G09B 19/04 |

\* cited by examiner

Literacy Matters

- Dashboard
- Manage Lessons
- Manage School
- Manage User
- Manage Sounds
- Report

310

Manage Sound 322

| Missing Content/Chunk 350 | Review Sound Library 324 | Add New/Update Content 326 | |
|---|---|---|---|
| LESSON NAME | CONTENT 352 | DOWNLOAD FILE 354 | CHUNK 356 | DELETE FILE 358 |
| Doodle Lesson 002, Doodle Lesson 004, | tap | DW_L2_MD_tap.ogg | t,a_short,p | Delete |
| Doodle Lesson 002, Doodle Lesson 004, | cap | DW_L2_MD_cap.ogg | c_hard,a_short,p | Delete |
| Doodle Lesson 006, | cup | cup.wav | c_hard,u_short,p | Delete |
| | bm_s,z | bm_sz.wav | | Delete |
| Doodle Lesson 004, | an | an.wav | | Delete |
| | bm_c | bm_c.wav | | Delete |
| | bm_g | bm_g.wav | | Delete |
| | bm_f | bm_f.wav | | Delete |

Manage Lessons — 510

| SR NO. | LESSON NAME | STATUS | ACTIONS | | | | |
|---|---|---|---|---|---|---|---|
| | | | 512 | 514 | 516 | 518 | 520 |
| 1 | Deb's Demo Lesson | Published | Clone | Edit | Up | Down | Archive |
| 2 | Doodie Lesson 001 | Published | Clone | Edit | Up | Down | Archive |
| 3 | Doodie Lesson 025E | Published | Clone | Edit | Up | Down | Archive |
| 4 | Doodie Lesson 002 | Published | Clone | Edit | Up | Down | Archive |
| 5 | Doodie Lesson 003 | Published | Clone | Edit | Up | Down | Archive |
| 6 | Doodie Lesson 004 | Published | Clone | Edit | Up | Down | Archive |
| 7 | Doodie Lesson 005 | Status'ed | Clone | Edit | Up | Down | Archive |
| 8 | Doodie Lesson 006 | Published | Clone | Edit | Up | Down | Archive |
| 9 | Doodie Lesson 007 | Published | Clone | Edit | Up | Down | Archive |
| 10 | Doodie Lesson 008 | Published | Clone | Edit | Up | Down | Archive |

1 2 3 4 5 »

Sidebar:
- Dashboard
- Manage Lessons
- Manage School
- Manage User
- Manage Sounds
- Report

| | | | | |
|---|---|---|---|---|
| Go Doodle | 5 | 1 | 3 | ☑ 542e |
| Mighty Match | 5 | 1 | 3 | man can × cat sat × no ban × 542f |
| DOODLE HOUSE ⓘ | | | | |
| Phonemes | 1 ⊕ | 1 | 3 | a × the × on × at × it × as × for × to × 542g |
| Read Words | 2 | 1 | 3 | b × 542h |
| Write Words | 3 | 1 | 3 | cab × tab × nab × lab × nab × lad × 542i |

Redirect Words: pan × fat × fan × hat × van × ban × pat ×

ACTIVITY ⓘ | REWARD CRITERIA ⓘ

| | | |
|---|---|---|
| Flash Doodle | Complete Percent: 25 | |
| | Complete Percent: 50 | Bananas won: 1 |
| Doodle See | Words Completed: 3 | Bananas won: 2 |
| Doodle Do | Words Completed: 3 | Bananas won: 1 |
| Go Doodle | Correct Capitalization: 1 | Bananas won: 1 |
| | Correct Punctuation: 1 | |
| | Correct Spelling: 1 | |

Conditions For Next Lesson
Minimum Correct Answers (%): 65
Lesson Completion Time Limit:
Lesson Start Text: Welcome to Mighty Doodle

FIG. 5B (Cont.)

Completion Routine

Perform fifth interactive exercise
(Request user to write collection of content items)

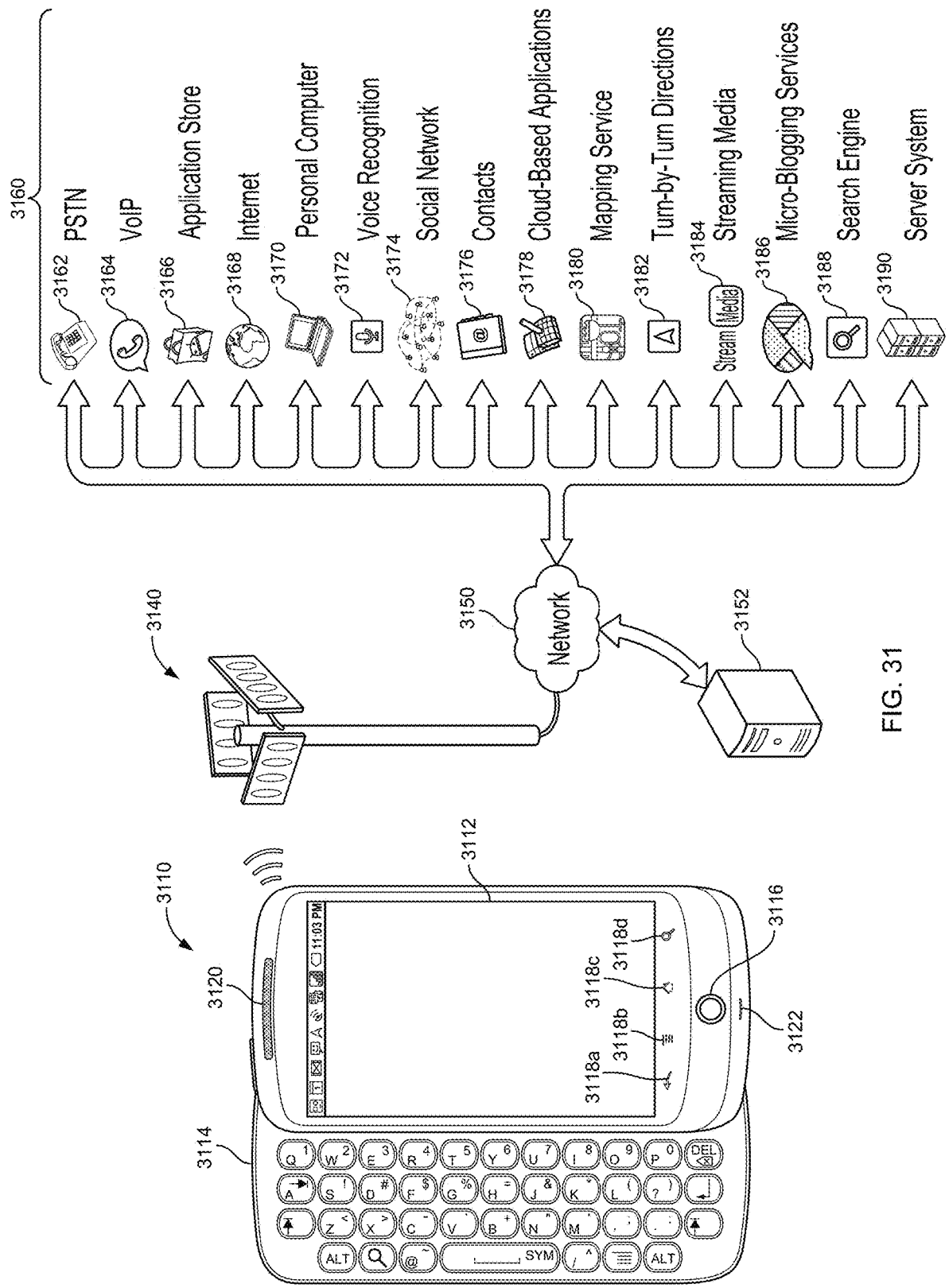

DEFINING AN INTERACTIVE SESSION THAT ANALYZES USER INPUT PROVIDED BY A PARTICIPANT

CROSS-REFERENCE TO RELATED APPLICATION

This application claims the benefit of priority to U.S. Provisional Application No. 62/805,034, filed on Feb. 13, 2019, the disclosure of which is herein incorporated by reference in its entirety.

TECHNICAL FIELD

This document relates to technologies that define an interactive session that analyzes user input.

BACKGROUND

Various web sites and computer programs include content developed to educate or improve skills of users of the respective web sites and computer programs. This content is typically not tailored to the individual user, and the content takes a great amount of user effort to generate. In other words, the process by which users interact with the content is not individualized and there is a significant burden on the author of the content to implement that content in a computer-implemented environment.

SUMMARY

This document describes techniques, methods, systems, and other technologies for defining an interactive session that analyzes user input. The following paragraphs list various implementations of the technologies described in this disclosure, with additional detail regarding those technologies provided in the figures and the detailed description section.

As additional description to the embodiments described below, the present disclosure describes the following embodiments.

First Set of Embodiments

Embodiment 1 is a computer-implemented method for defining and engaging in interactive sessions between computerized devices and participants. The method comprises performing, by a computing system, operations to define at least a first interactive exercise, including by presenting, by the computing system, a first user interface that includes user controls configured to define a plurality of content items. Also by receiving, by the computing system, user input that interacts with the user controls of the first user interface to specify, for each respective content item in the plurality of content items, characteristics of the respective content item, including (a) a text spelling of the respective content item, and (b) an audio recording of the respective content item. Also by presenting, by the computing system, a second user interface that includes user controls configured to define a plurality of interactive exercises that are each arranged to present content items to users. Also by receiving, by the computing system, user input that interacts with the user controls of the second user interface to: (i) select a set of user-selected content items from among the plurality of content items for inclusion as part of the first interactive exercise, and (ii) assign an order to the user-selected content items to produce an ordered set of user-selected content items that are assigned to the first interactive exercise. The method comprises performing, by the computing system, operations to engage in at least the first interactive exercise, including by receiving, by the computing system, a request to engage a participant user in an interactive exercise, and in response, selecting to engage the participant user in the first interactive exercise from among the plurality of interactive exercises. Also by accessing, by the computing system, the ordered set of user-selected content items based on the ordered set of content items being assigned to the first interactive exercise. Also by, for each respective content item, selected one at a time in order from among the ordered set of content items: (i) presenting, by the computing system, the respective content item, (ii) prompting, by the computing system, the participant user to interact with the computing system to input the respective content item, (iii) receiving, by the computing system responsive to the computing system prompting the participant user to interact with the computing system to input the respective content item, participant user input, (iv) determining, by the computing system, whether the participant user input matches the respective content item, and (v) presenting, by the computing system, an indication regarding whether the computing system determined the first participant user input to match the respective content item.

Embodiment 2 the computer-implemented method of embodiment 1, wherein each content item in the plurality of content items comprises a multi-character word.

Embodiment 3 is the computer-implemented method of embodiment 1, wherein the characteristics specified for each respective content item in the plurality of content items by the user input that interacts with the user controls of the first user interface include (c) a user-specified phonetic representation of multiple component sounds of the respective content item.

Embodiment 4 is the computer-implemented method of embodiment 3, wherein the user-specified phonetic representation of the multiple component sounds of the respective content item comprises a text string specified through user interaction with a keyboard.

Embodiment 5 is the computer-implemented method of any of embodiments 3-4, wherein presenting the respective content item includes displaying the text spelling of the respective content item that was specified by the user input that interacted with the user controls of the first user interface. Also receiving the participant user input includes recording a participant audio recording using a microphone of the computing system. Also determining whether the participant user input matches the respective content item includes: (a) providing the participant audio recording to a sound-identifying process that identifies component sounds of the participant audio recording, and (b) determining whether the component sounds of the participant audio recording identified by the sound-identifying process match the user-specified phonetic representation of the multiple component sounds within the respective content item.

Embodiment 6 is the computer-implemented method of any of embodiments 3-5, wherein the user-specified phonetic representation of the multiple component sounds of the respective content item identifies two or more sounds from among a collection of sounds, the collection of sounds including multiple sounds for each of various different alphabetical letters.

Embodiment 7 is the computer-implemented method of embodiment 5, wherein determining whether the component sounds of the participant audio recording identified by the sound-identifying process match the user-specified phonetic representation of the multiple component sounds within the respective content item includes determining that a first component sound of the component sounds of the participant audio recording matches a corresponding component sound of the multiple component sounds within the respective content item. It also includes determining that a second component sound of the component sounds of the participant audio recording does not match a corresponding component sound of the multiple component sounds within the first content item. Also, presenting the indication regarding whether the computing system determined the first participant user input to match the respective content item includes presenting (a) a text representation of the respective content item, (b) an indication that a first letter in the respective content item was spoken satisfactorily, the first letter corresponding to the first component sound, and (c) an indication that a second letter in the respective content item was spoken unsatisfactorily, the second letter corresponding to the second component sound.

Embodiment 8 is the computer-implemented method of embodiment 1, wherein receiving the user input that interacts with the user controls of the second user interface assign the order to the user-selected content items to produce the ordered set of user-selected content items includes displaying, by the computing system, a collection of interface elements that correspond to the user-selected content items. Receiving, by the computing system, user input that interacts with a location at which one interface element from the collection of interface elements is displayed and drags the one interface element to a different location among the collection of interface elements to change an order of the user-selected content items.

Embodiment 9 is the computer-implemented method of embodiment 8, wherein receiving the user input that interacts with the user controls of the second user interface to select the set of user-selected content items includes displaying, by the computing system, the collection of interface elements that correspond to the user-selected content items selected for inclusion as part of the first interactive exercise and an additional interface element that corresponds to an additional content item that is initially selected from among the plurality of content items for inclusion as part of the first interactive exercise. It also includes receiving, by the computing system, user input that interacts with a location at which the additional interface item is displayed to remove the additional content item from the first interactive exercise and leave the user-selected content items as those content items selected for the first interactive exercise.

Embodiment 10 is the computer-implemented method of embodiment 1, wherein presenting the respective content item includes outputting, with one or more speakers, the audio recording of the respective content item that was specified by the user input that interacted with the user controls of the first user interface. Receiving the participant user input includes receiving user input that interacts with a touchscreen to form a freehand line drawing. Determining whether the participant user input matches the respective content item includes: (a) identifying a text representation of the freehand line drawing, and (b) determining whether the text representation of the freehand line drawing matches the text spelling of the respective content item specified by the user input that interacted with the user controls of the first user interface. Presenting the indication regarding whether the computing system determined the first participant user input to match the respective content item includes presenting (a) a text representation of the respective content item, and (b) an indication regarding whether the computing system determined the respective content item to be written satisfactorily, the computing system not presenting the text representation of the respective content item while the computing system was receiving the user input that interacted with the touchscreen to form the freehand line drawing.

Embodiment 11 is directed to a computing system that comprises one or more processors; and one or more computer-readable devices including instructions that, when executed by the one or more processors, cause the computing system to perform the method of any one of embodiments 1 through 10.

Second Set of Embodiments

Embodiment 1 is a computer-implemented method for analyzing the manner in which touchscreen user inputs are generated. The method comprises presenting, by a computing system, a multi-character word and prompting a user of the computing system to write the multi-character word using an input device of the computing system. The method comprises receiving, by the computing system, user input that interacts with the input device of the computing system to generate an user-animated gesture, responsive to the computing system prompting the user to write the multi-character word using the input device, wherein a final form of the user-animated gesture satisfactorily represents the multi-character word. The method comprises identifying, by the computing system, different portions of the user-animated gesture that correspond to different respective characters of the multi-character word. The method comprises, for each respective character in the multi-character word:

(i) accessing, by the computing system, a set of pre-stored animated gestures that represent different techniques for forming the respective character; (ii) determining, by the computing system, a first level of similarity between the portion of the user-animated gesture that corresponds to the respective character and a first pre-stored animated gesture for forming the respective character from among the set of pre-stored animated gestures for forming the respective character, wherein the first pre-stored animated gesture for forming the respective character is designated as representing a satisfactory technique in which to form the respective character; (iii) determining, by the computing system, a second level of similarity between the portion of the user-animated gesture that corresponds to the respective character and a second pre-stored animated gesture for forming the respective character from among the set of pre-stored animated gestures for forming the respective character, wherein the second pre-stored animated gesture for forming the respective character is designated as representing an unsatisfactory technique in which to form the respective character; (iv) identifying, by the computing system, which of the first pre-stored animated gesture and the second pre-stored animated gesture matches the portion of the user-animated gesture that corresponds to the respective character based on which of the first level of similarity and the second level of similarity represents a greatest level of similarity; (v) storing, by the computing system, an indication regarding whether the user-animated gesture formed the respective character using a satisfactory technique, based on which of the first pre-stored animated gesture and the second pre-stored animated gesture the computing system determined to match the user-animated gesture, wherein the computing system identifies that the user-animated gesture formed a first character of the multi-character word using a satisfactory technique and identifies that the user-animated gesture formed a second character of the multi-character word using an unsatisfactory technique; and displaying, by the computing system, an indication that the user-animated gesture formed the second character using an unsatisfactory technique, based on the computing system determining that a portion of the user-animated gesture that corresponds to the second character has a greatest level of similarity with a pre-stored animated gesture that represents an unsatisfactory technique for forming the second character rather than a pre-stored animated gesture that represents a satisfactory technique for forming the second character.

Embodiment 2 is the computer-implemented method of embodiment 1, wherein presenting the multi-character word includes displaying a textual representation of the multi-character word on a touchscreen.

Embodiment 3 is the computer-implemented method of embodiment 1, wherein identifying which of the first pre-stored animated gesture and the second pre-stored animated gesture matches the user-animated gesture based on which of the first level of similarity and the second level of similarity represents a greatest level of similarity includes determining that one of the first level of similarity and the second level of similarity satisfies a designated threshold level of similarity.

Embodiment 4 is the computer-implemented method of embodiment 1, wherein the first pre-stored animated gesture for forming the respective character represents a technique in which the respective character is formed by starting at a first location of the respective character. The second pre-stored animated gesture for forming the respective character represents a technique in which the respective character is formed by starting formation of the respective character starting at a second location of the respective character, the second location being on a different side of the respective character than the first location.

Embodiment 5 is the computer-implemented method of embodiment 1, wherein the method further comprises, for each respective character in the multi-character word, determining, by the computing system, a third level of similarity between the portion of the user-animated gesture that corresponds to the respective character and a third pre-stored animated gesture for forming the respective character from among the set of pre-stored animated gestures for forming the respective character. The second pre-stored animated gesture for forming the respective character represents a first type of unsatisfactory technique in which to form the respective character. The third pre-stored animated gesture for forming the respective character represents a second type of unsatisfactory technique in which to form the respective character. The computing system identifying that the user-animated gesture formed the second character of the multi-character word using an unsatisfactory technique includes the computing system identifying that the user-animated gesture formed the second character using the first type of unsatisfactory technique. The computing system is configured to identify that the user-animated gesture formed the second character using the second type of unsatisfactory technique responsive to the computing system determining that the portion of the user-animated gesture that corresponds to the second character has a greatest level of similarity with the third type of pre-stored animated gesture accessed for the second character.

Embodiment 6 is the computer-implemented method of embodiment 5, wherein the second type of unsatisfactory technique represented by the third pre-stored animated gesture for forming the respective character includes the respective character being formed backwards.

Embodiment 7 is the computer-implemented method of embodiment 1, wherein determining, by the computing system, the first level of similarity includes coordinating, by the computing system, a timing of the portion of the user-animated gesture that corresponds to the respective character and a first timing of the first pre-stored animated gesture for forming the respective character. The determining also includes determining, for each respective time of multiple first coordinated times after the timing and the first timing have been coordinated, a first distance between (a) a location of user input forming the user-animated gesture at the respective time, and (b) a location representing user input forming the first pre-stored animated gesture at the respective time. The determining also includes generating, by the computing system, the first level of similarity based on a combination of the first distances determined for the multiple first coordinated times. Determining, by the computing system, the second level of similarity includes coordinating, by the computing system, the timing of the portion of the user-animated gesture that corresponds to the respective character and a second timing of the second pre-stored animated gesture for forming the respective character. The determining also includes determining, for each respective time of multiple second coordinated times after the timing and the second timing have been coordinated, a second distance between (a) a location of user input forming the user-animated gesture at the respective time, and (b) a location representing user input forming the second pre-stored animated gesture at the respective time. The determining also includes generating, by the computing system, the second level of similarity based on a combination of the second distances determined for the multiple second coordinated times.

Embodiment 8 is the computer-implemented method of embodiment 1, further comprising presenting, by the computing system, a second multi-character word and prompting the user of the computing system to write the second multi-character word using the input device of the computing system. The method includes receiving, by the computing system, user input that interacts with the input device to generate a second user-animated gesture, responsive to the computing system prompting the user to write the second multi-character word with the input device. The method includes identifying, by the computing system, different portions of the second user-animated gesture that correspond to different respective characters of the second multi-character word. The method includes determining, by the computing system through a comparison of the second user-animated gesture to the second multi-character word, that the second user-animated gesture does not match the second multi-character word, and instead matches the second multi-character word with one of (a) an extra letter inserted, (b) a letter missing, and (c) letters ordered incorrectly. The method includes displaying, by the computing system, an indication that the second user-animated gesture formed the second multi-character word with one of (a) an extra letter inserted, (b) a letter missing, and (c) letters ordered incorrectly, based on the comparison of the second user-animated gesture to the second multi-character word.

Embodiment 9 is the computer-implemented method of embodiment 1, wherein the computing system includes a server system, and the server system performs (i) the determining the first level of similarity between the portion of the user-animated gesture and the first pre-stored animated gesture, and (ii) the determining the second level of similarity between the portion of the user-animated gesture and the second pre-stored animated gesture. The presenting the multi-character word involves the server system providing information to a handheld computing device to cause the handheld computing device to present the multi-character word. The receiving the user input involves the server system receiving from the handheld computing device an indication that the user input was provided at the handheld computing device. The displaying the indication that the user-animated gesture formed the second character using an unsatisfactory technique involves the server system providing information to a second computing device to cause the second computing device to display text that specifies that the user of the computing system formed the second character using an unsatisfactory technique.

Embodiment 10 is directed to a computing system that comprises one or more processors; and one or more computer-readable devices including instructions that, when executed by the one or more processors, cause the computing system to perform the method of any one of embodiments 1 through 9.

Third Set of Embodiments

Embodiment 1 is a computer-implemented method of interaction between a computer and user in forming statements, the method comprises presenting, by a computing system through a user interface, a first multi-character word. The method comprises prompting, by the computing system, a user to interact with the computing system to input the first multi-character word. The method comprises receiving, by the computing system responsive to the computing system prompting the user to interact with the computing system to input the first multi-character word, first user input. The method comprises determining, by the computing system, that the first user input does not match the first multi-character word. The method comprises performing, by the computing system after having determined that the first user input does not match the first multi-character word, operations to present the user with a similar or same, second multi-character word, including by presenting, by the computing system, a text representation of the second multi-character word on a display device, and also by, for each respective character of the second multi-character word, in order one at a time: (i) monitoring, by the computing system, an input device for user input that contacts a location at which the display device presents the respective character, (ii) determining, by the computing system, that user input has used the input device to contact the location at which the display device presents the respective character, and (iii) displaying, by the computing system, an indication on the display device that user input has contacted the respective character. The method comprises presenting, by the computing system, an indication that user input has completed contacting all character in the second multi-character word.

Embodiment 2 is the computer-implemented method of embodiment 1, wherein presenting the first multi-character word includes outputting an audible representation of the first multi-character word using one or more speakers. Receiving the first user input includes receiving user input that interacts with a touchscreen to trace a gesture.

Embodiment 3 is the computer-implemented method of embodiment 1, wherein determining that the first user input does not match the first multi-character word includes analyzing the first user input and determining that the first user input satisfactorily represents multiple characters of the multi-character word and that the first user input unsatisfactorily represents a first character of the multi-character word. The method further comprises identifying, by the computing system, the second multi-character word, including by accessing, by the computing system, a plurality of candidate words. Also by parsing, by the computing system, each of the plurality of candidate words to identify a selected word that: (i) is a same length as the first multi-character word, (ii) includes the multiple characters that the first user input satisfactorily represented in same locations within the selected word as the multiple characters are located in the first multi-character word, and (iii) includes a different character that is different than the first character that the first user input unsatisfactorily represented in a same location within the selected word as the first character is located within the first multi-character word, wherein the second multi-character word is same as the selected word and is different from the first multi-character word.

Embodiment 4 is the computer-implemented method of embodiment 1, wherein determining that user input has used the input device to contact the location at which the display device presents the respective character includes determining that user input has tapped the location at which the display device presents the respective character.

Embodiment 5 is the computer-implemented method of embodiment 1, further comprising for each respective character of the second multi-character word, in order one at a time displaying, by the computing system, an interface element marker at a location of the respective character at which user input is to contact the respective character. Also one at a time determining, by the computing system that user input has contacted the location at which the display device presented the interface element marker. Also one at a time receiving, by the computing system, an indication that user input has moved from the location at which the display device presented the interface element marker across the display device in a path that matches a displayed representation of the respective character. Also one at a time moving, by the computing system, a display of the interface element marker along the displayed representation of the respective character as the user input moves across the display device, wherein the computing system is configured to not move the interface element marker away from the representation of the respective character in response to user input moving away from the representation of the respective character. Also one at a time determining, by the computing system, that the user input has traced an entirety of the displayed representation of the respective character, and in response, displaying an indication that the respective character has been completely traced and designating a next character of the second multi-character word for tracing if the respective character is not a last character of the second multi-character word.

Embodiment 6 is the computer-implemented method of embodiment 5, further comprising, displaying, by the computing system a traced portion of the respective character over which the interface element marker has passed in a different manner than an untraced portion of the respective character over which the interface element marker has not passed.

Embodiment 7 is the computer-implemented method of any of embodiments 1-5, further comprising determining, by the computing system, that user input has contacted each character of the second multi-character word. The method also includes displaying, by the computing system after the computing system has determined that user input has contacted each character of the second multi-character word, a second interface element marker at a first location of the display device that is closer on the display device to the first character of the second multi-character word than any other letter of the second multi-character word. The method also includes determining, by the computing system, that user input has contacted the location at which the second interface element is displayed and has moved across the display device towards other letters in the second multi-character word. The method further comprises moving, by the computing system, a display of the second user interface marker across the display device to correspond to a location of user input contacting the display device, wherein the computing system is configured to not move the second user interface marker across the display device responsive to user input contacting a location at which the second interface element marker is not displayed. The method also includes changing, by the computing system, a displayed representation of each character in the second multi-character word on the display device one at a time as user input moves the second interface element marker past the respective character to indicate that the respective character has been selected, until user input has moved the second interface element to a last character in the second multi-character word.

Embodiment 8 is the computer-implemented method of embodiment 7, further comprising outputting, by the computing system, an audio recording of the second multi-character word with one or more speakers while user input moves the second interface element marker across the display device.

Embodiment 9 is the computer-implemented method of embodiment 8, further comprising identifying portions of the audio recording of the second multi-character word that represent respective characters within the multi-character word. The outputting of the audio recording of the second multi-character word includes audibly outputting each portion of the audio recording of the second multi-character word in coordination with user input moving the second interface element marker across the display device, such that movement of the second interface element marker controls timing of the audible output of each portion of the audio recording of the second multi-character word.

Embodiment 10 is the computer-implemented method of embodiment 1, wherein the first multi-character word is part of an ordered collection of multi-character words that the computing system presents one at a time as part of an interactive session between the computing system and the user. The computing system is configured, responsive to the computing system determining that the first user matches the first multi-character word, to skip performance of the operations to present the user with the similar or same, second multi-character word, and instead: (i) present a next multi-character word from the ordered collection of multi-character words through the user interface, the next multi-character word including multiple characters that are different from the first multi-character word, (ii) prompt the user to interact with the computing system to input the first multi-character word, (iii) receive next user input, (iv) determine whether the next user input matches the next multi-character word.

Embodiment 11 is directed to a computing system that comprises one or more processors; and one or more computer-readable devices including instructions that, when executed by the one or more processors, cause the computing system to perform the method of any one of embodiments 1 through 10.

The details of one or more implementations are set forth in the accompanying drawings and the description below. Other features, objects, and advantages will be apparent from the description and drawings, and from the claims.

DESCRIPTION OF DRAWINGS

FIGS. 3A-B show user interfaces for defining content items.

FIGS. 5A-B show user interfaces for defining interactive sessions and interactive exercises.

FIGS. 29A and 29C show user interfaces for analyzing user interaction during the interactive exercises.

FIG. 29B shows cards that identify content items that a participant incorrectly input.

FIG. 31 is a conceptual diagram of a system that may be used to implement the systems and methods described in this document.

Like reference symbols in the various drawings indicate like elements.

DETAILED DESCRIPTION

Figure 1:
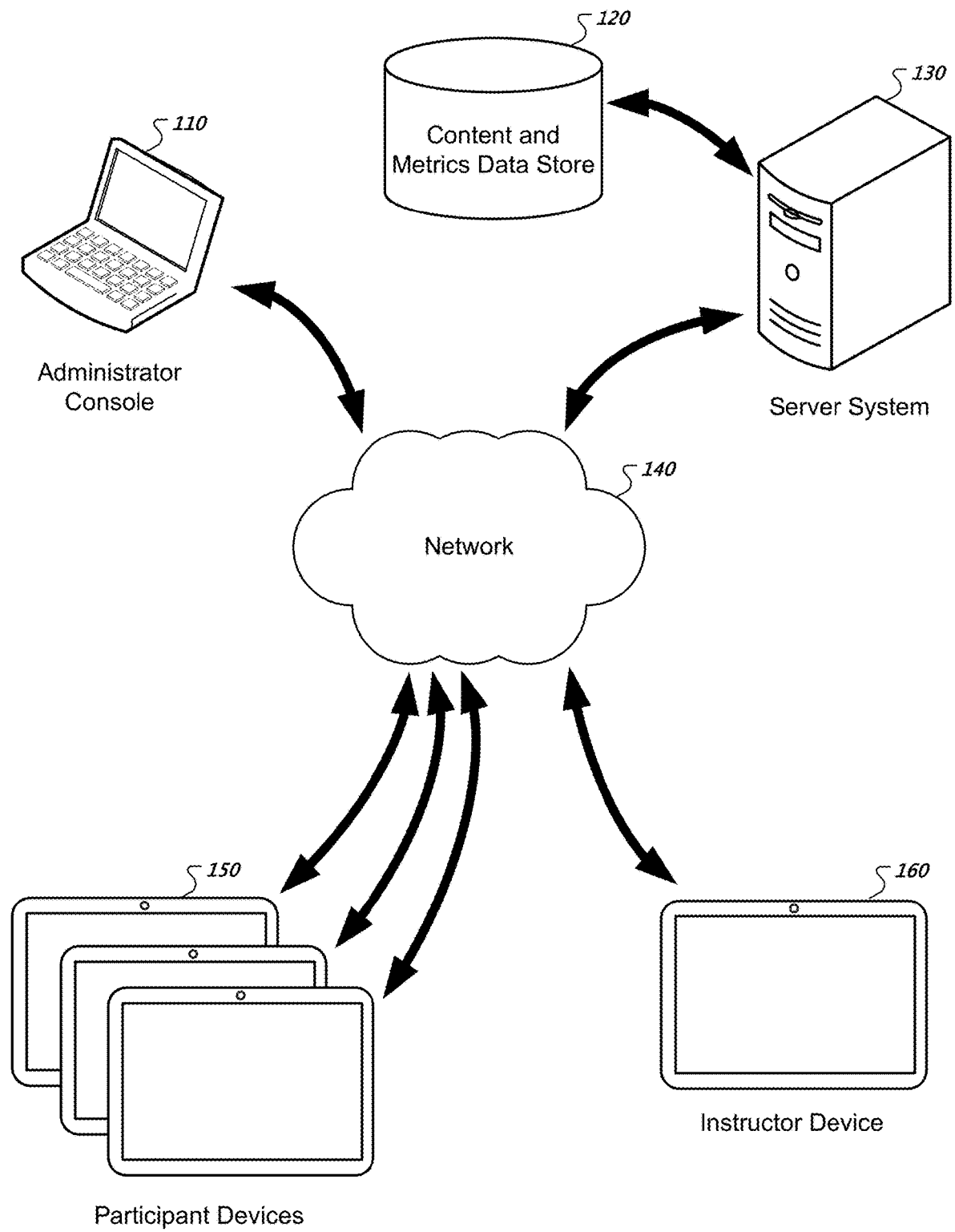
FIG. 1 shows a computing system for defining an interactive session that analyzes user input and engaging in the interactive session.

This document describes technologies to define an interactive exercise that analyzes user input. The interactive sessions described in this disclosure involve a computing system outputting information to a participant user, and the computing system prompting the participant to respond by supplying input back to the computing system. In some examples, the information is audibly output (e.g., one or more speakers may play a recording of a letter, a word, or a sentence). In response, the computing system can display an input field on a touchscreen device into which the participant can write a graphical representation of the audible output, for example, with a stylus or finger. In other examples, the information is graphically output on a display device and the participant is prompted to repeat the information back to the computing system by speaking the information into a microphone of the computing system. The computing system can record the participant's spoken response.

The computing system analyzes the participant's written or spoken response to determine whether the response matches the system output. In those situations in which the computing system output the information graphically and the participant responded by providing a spoken response, the computing system may separate the recording of the participant-spoken response into its component sounds and may then compare those component sounds to a list of component sounds that represent the system output, as previously specified by an administrator that during a process that defined various different characteristics of the content output by the computing system.

In those situations in which the computing system output the information audibly and the participant responded with a written response, the computing system may initially compare the written response to the system output to determine whether the participant's written response matches the system output. The computing system can further process the participant's written response by separating an animated gesture that forms the participant's written response into component animated gestures that represent each component character of a word represented by the participant-written response. The computing system can then compare each component animated gesture to a collection of pre-stored animated gestures for each respective character of the word or sentence audibly output by the computing system to determine which pre-stored animated gesture is a best match. The identification of the best-matching pre-stored animated gesture enables the computing system to determine a technique in which the participant wrote each respective character. The system can indicate to the participant or another user of the computing system the techniques that the participant uses to write various characters and whether those techniques represent satisfactory techniques for forming various characters.

Each portion of information that the computing system outputs to a participant is termed a content items in this disclosure, and the collection of content items that form the basis for interactive sessions between the computing system and participants is specified by a user with authorization to define interactive sessions (e.g., an administrative user). Such a user may select not only which content items form the basis of each interactive session, but also may define an order in which the content items are to be provided to participants during the interactive sessions, and the order in which the computing system is to provide multiple interactive sessions to participants.

Prior to a user with appropriate authorization creating an interactive session, that user can define the characteristics of various content items in the collection of content items from which users can populate interactive sessions. For example, a user adding a new content item to the collection, such as the word "house," can specify (i) a text representation of the new content item, (ii) an audio recording that represents the new content item, and (iii) a phonetic representation of the new content item, for example, a text string that defines each sound within the new content item.

FIG. 1 shows a computing system for defining an interactive session that analyzes user input and engaging in the interactive session. The computing system includes various different computing devices, including devices 110, 130, 150, and 160. Devices 150 represent tablet computing devices used by participants to engage in interactive sessions where the computing devices display or audibly output content items, and participants are prompted to respond by speaking or writing the content items back to respective computing devices 150.

Device 110 represents a laptop computing device at which a user is able to define characteristics of content items, create and edit interactive sessions, and/or view metrics of participants that have engaged in the interactive sessions. Device 160 represents a tablet computing device 160 at which an individual that is instructing participants can access the computing system to create accounts for participants, identify progress of participants, and view metrics for participants that are assigned to the that individual instructor.

Devices 110, 150, and 160 communicate over a network 140 (e.g., the Internet) with a server system 130 that interacts with the devices, for example, under a client-server model or providing responses to queries sent by the devices. For instance, devices 110 and 160 may present content in web pages that are hosted by the server system 130, and devices 150 may include application programs that engage users of the devices 150 in the interactive sessions and send queries to the server system 130 for content, with the server system 130 responding to the queries by providing the content back to the devices 150 for presentation by the application programs.

Although the above description indicates that devices 110 and 160 present content related to the interactive sessions in web pages, and devices 150 present content related to the interactive sessions in application programs, any of the devices may present such content in web pages and any of the devices may present such content in application programs. Server system 130 may access the content and metrics data store 120 to select information to send to the devices 110, 150, and 160. The contents and metrics data store 120 represents one or more different mechanisms for storing information (e.g., one or more databases or data files).

Devices 110, 130, 150, and 160 work together as a computing system, and various references in this disclosure to a computing system performing various operations can involve various different levels of interaction between the devices. As an example, reference to the computing system presenting content can involve a participant device 150 presenting content on a display of the device 150 or the server system 130 providing information for receipt by the participant device 150 to cause the participant device to present the content on the display of the device 150. Similarly, reference to the computing system determining whether user input matches content previously output by the computing system can include the participant device 150 performing the matching determination itself or requesting that the server system 130 to perform the matching determination and receiving back from the server system 130 an indication regarding whether there the server system 130 determined there to be a match. As such, the amount of processing performed locally on devices 110, 150, and 160 (and conversely the amount of processing performed remote at the server system 130) varies depending on the implementation.

Moreover, although the device 110 is illustrated as a laptop and devices 150 and 160 are illustrated as tablet computers, each of these devices can be other types of computing devices, such as smartphone computing devices, tablet computing devices, laptop computing devices, desktop computing devices, or similar types of portable or non-portable computing devices that include components to output content to users and receive user input in response.

The computing system described in this disclosure provides various benefits, including allowing an author of content to define interactive sessions in an efficient manner and to offload the responsibility for providing content that forms the basis of those interactive sessions to semi-automated computing processes. The efficiencies borne by the system are partially due to the ability of the administrator to define a library of content items that are re-usable among different types of interactive sessions.

Additional details of the computing system discussed in this disclosure are provided with reference to FIGS. 2 through 32, which include flowcharts that identify operations of the computing system and screenshots that illustrate example user interfaces output by devices 110, 150, and 160.

Definition of Content Items and Interactive Sessions

Figure 2:
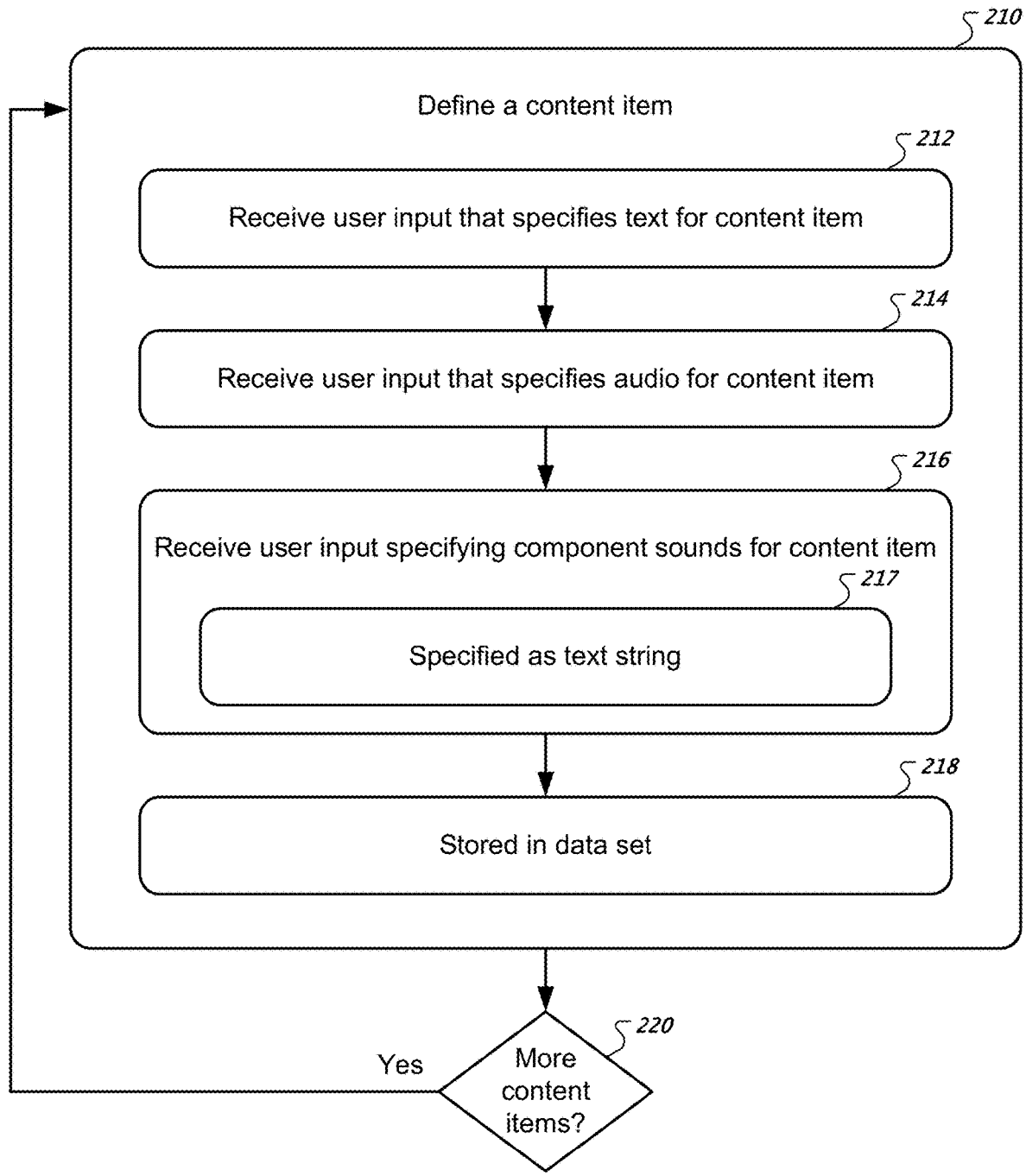
FIG. 2 shows a flowchart of a process for specifying a collection of content items for interactive sessions.

FIG. 2 shows a flowchart of a process for specifying a collection of content items for interactive sessions. This process may be performed through interaction between the computing system described herein and a person with administrative and/or instruction credentials once that person has logged into the computing system.

Figure 3A:
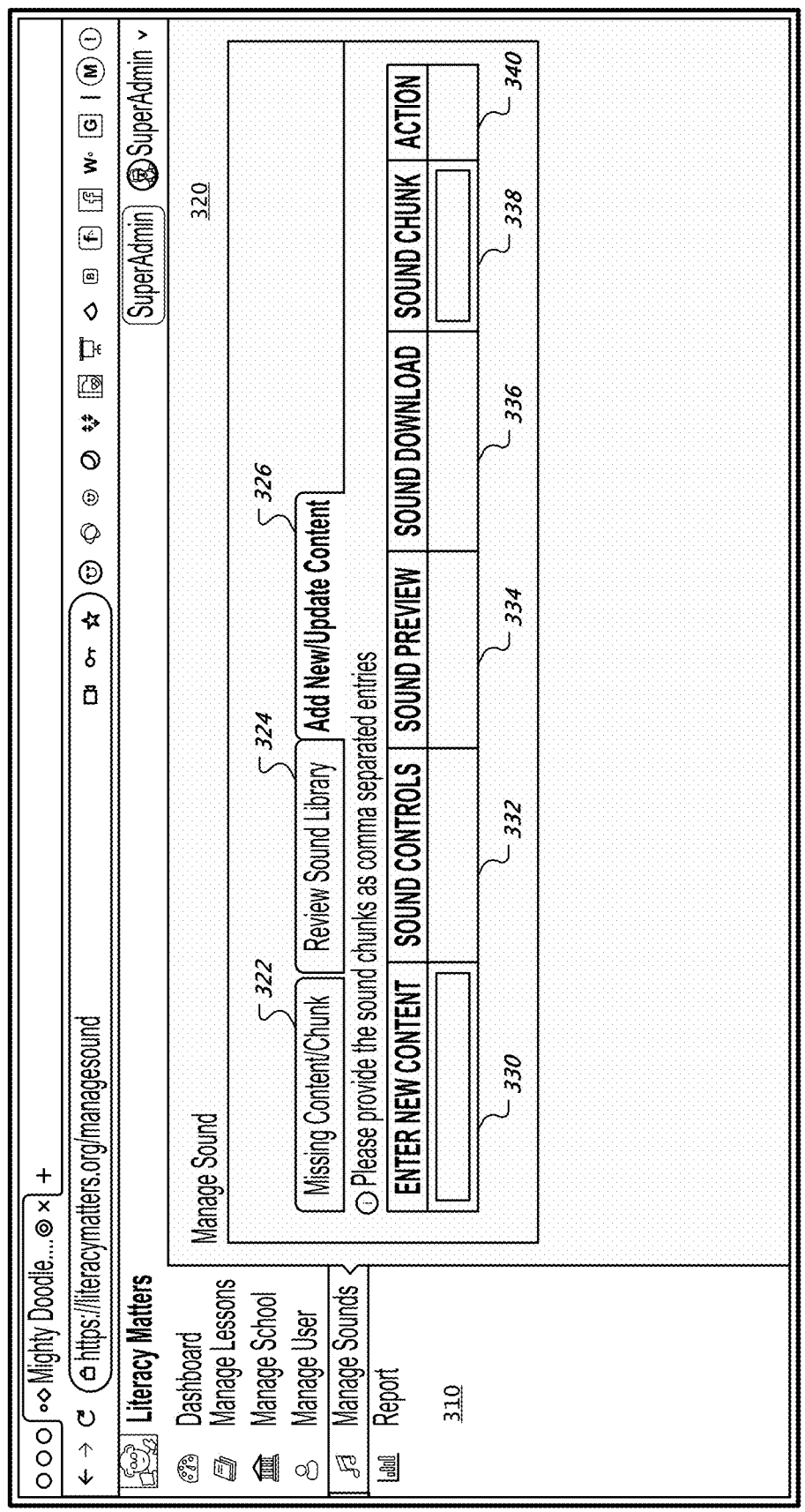

As background before describing details of the process for specifying the collection of content items, a person with administrative credentials may sit down at the computer 110 (FIG. 1), use a web browser to navigate to a web page administered by the server system 130, and enter a username and password. The server system 130 may authenticate the user, determine that the user has an administrator or instructor role, and provide the user interface that is shown in FIG. 3A. The FIG. 3A user interface includes a left pane 310 that includes various interface element tabs, and FIG. 3A shows that the user has selected the "Manage Sounds" tab. Accordingly, the main portion 320 of the user interface that is shown to the right of the left pane 310 includes interface elements with which the user can manage content items (which various user interfaces shown in the figures refer to as "sounds"), including a "Missing Content/Chunk" interface element 322, a "Review Sound Library" interface element 324, and an "Add New/Update Content" user interface element 326.

The "Add New/Update Content" interface element is selected in FIG. 3A, and it is through interaction with fields 330 through 340 with which user input is able to specify characteristics of a new content item. User selection of the "Review Sound Library" interface element 324 causes the computing system to switch from the FIG. 3A user interface to the FIG. 3B user interface. The user interfaces of FIG. 3A and FIG. 3B are similar, except that the FIG. 3A user interface allows a user to create a new content item, while the FIG. 3B user interface allows a user to view a list of existing content items and edit the characteristics for those content items.

Referring now to the flowchart of FIG. 2, at box 210 the computing system defines a content item. As mentioned above, a content item may be defined either through the user interface of FIG. 3A (creating a new content item) or through the user interface of FIG. 3B (editing an existing content item).

At box 212, the computing system receives user input that specifies text for a content item. For example, a user may select input field 330 (FIG. 3A) and type the letters of the word "tap" using a virtual or physical keyboard. As another example, a user may select the cell in the first row of column 352 (FIG. 3B) to edit the text for the corresponding content item to read "tap" (assuming that the text was previously different). These user inputs illustrate various ways to define the user-specified text for a content item.

At box 214, the computing system receives user input that specifies audio for the content item. For example, through interaction with interface elements 332, 334, and 336, a user may upload a sound recording for a content item. Element 332 may include controls to record audio, so that a user record audio that corresponds to the text "tap" without using a separate audio-recording application program. The computing device at which the user is sitting would use a microphone to record the audio and would store a digital representation of an audio waveform as an audio file.

The controls may also include an option to upload a previously-recorded audio file that includes audio that corresponds to the text "tap." The user can interact with interface element 334 to preview the sound recording, and can select interface element 336 to download the sound recording. Similar functionality is provided in the "editing" user interface of FIG. 3B. In particular, the a user may select controls in the first row in column 354 to play, download, or change the audio recording for the "tap" content item.

At box 216, the computing system receives user input specifying component sounds for the content item. The "Add New" user interface (FIG. 3A) includes a "Sound Chunk" field 338 for specifying this information. A similar field in the "Edit" user interface (FIG. 3B) is represented by the entries under the "Chunk" column 356. The Chunk entry for the "tap" interface element is the string "t,a_short,p" in FIG. 3B. This text string identifies the three phonetic components for the content item "tap", namely: (1) "t", (2) short "a", and (3) "p."

The computing system may store, in data store 120, information for each of the forty-four sounds in English including for each sound: (i) data identifying how to identify the respective sound within user-generated audio, and (ii) a text representation of the sound. FIG. 3B shows that the text representation of the sound "t" is simply "t", that the text representation of the sound of a short "a" is "a_short", and that the text representation for the sound "p" is also simply "p".

Fields 338 (FIG. 3A) and 356 (FIG. 3B) allow a user to specify the component sounds that as a whole comprise a content item, in this example as a text string with commas separating each portion of text that represents each respective sound (box 217). The string in the FIG. 3B example does not include spaces, but in other examples spaces may be permitted. Also, the computing system could present a user with a list of component sounds and the user may select those sounds from the list that represent how the content item is stated. The user selection of the sounds may involve clicking with a mouse or tapping with a finger those interface elements that represent the sounds in an order that represents the spoken output of the respective content item.

At box 218, the computing system stores the characteristics defined for the content item data store 120. As described above, the stored information may include at least (1) a text representation of the content item, (2) an audio recording for the content item, and (3) information that identifies the various sounds that as a whole comprise the content item, and an order in which those sounds are audibly output to represent the content item. Although the number sounds that comprise the content item can be the same as the number of letters (e.g., three sounds for three letters, as with the word "tap"), the number of sounds and letters can be different. The computing system may access the information stored for a content item when a user defines an interactive session, and when the computing system engages in an interactive session that presents the content item, as described in more detail below.

FIGS. 3A and 3B include additional interface elements not yet mentioned. The interface elements in the table cells under column 350 show the interactive sessions (termed "lessons" in the figures) into which the content item has been added. The interface elements in the table cells under column 358 allow a user to delete respective content items from the collection of content items. At the top of columns 350, 352, 354, 356, and 358 are filter fields that allow users to input text to filter the list of content items to a subset of content items that match the input text that. And the "Missing Content/Chunk" interface element 322 shows the content items that are missing both audio and "chunk" information.

Figure 4:
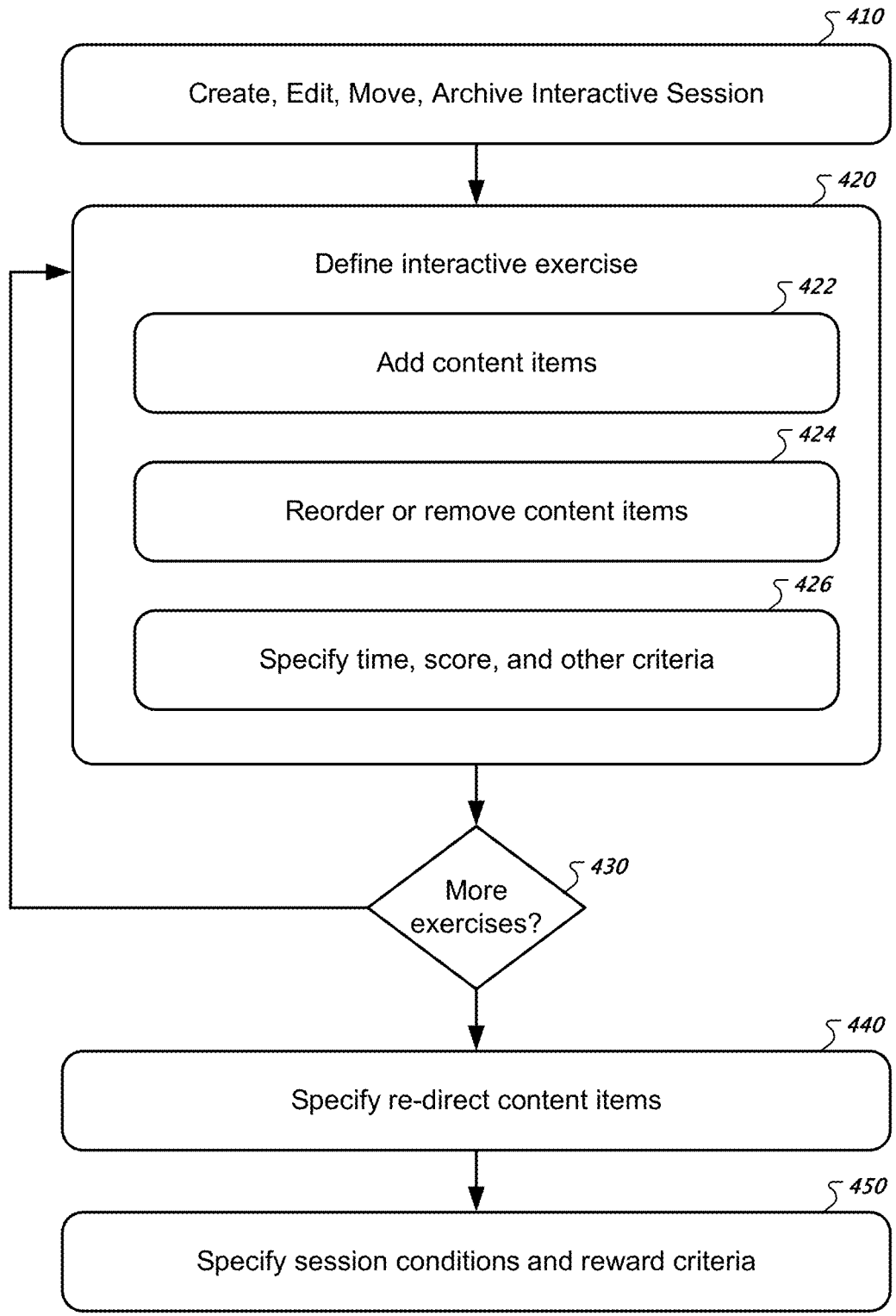
FIG. 4 shows a flowchart of a process for defining an interactive session.
Figure 5B:
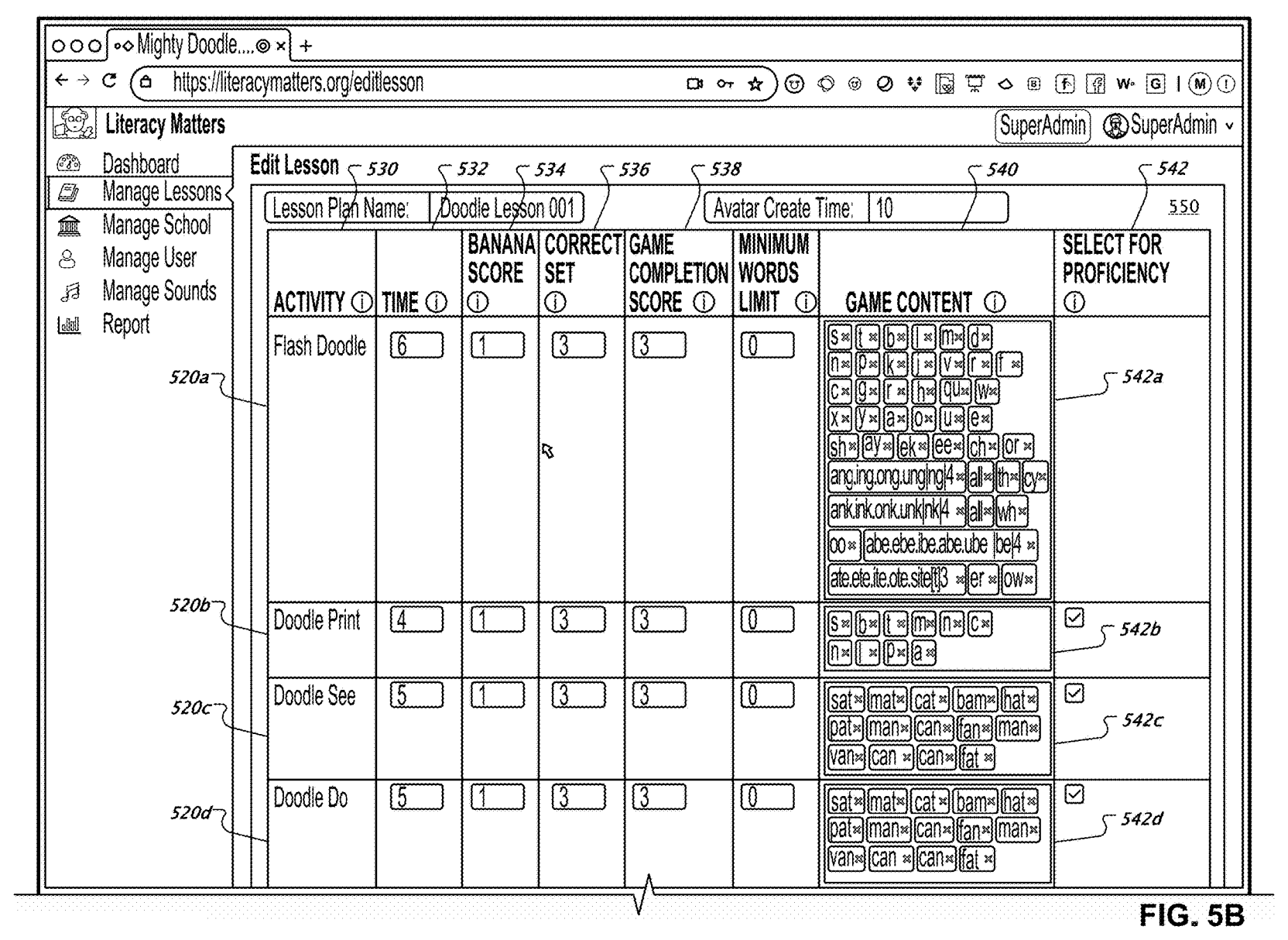

FIG. 4 shows a flowchart discussing processes related to the "Manage Lessons" user interfaces of FIGS. 5A-B. Through interaction with these user interfaces, an individual that has logged into the computer system using administrative and/or instruction credentials can define an interactive session, as the flowchart of FIG. 4 describes.

At box 410, a computing system creates, edits, moves, and/or archives an interactive session responsive to user input. An example interface for performing such actions is shown in FIG. 5A, which shows a table 502 that includes ten rows that include interface elements for ten respective interactive sessions. These are ten interactive sessions that the user or other users with administrative and/or instructor credentials have already created and, as discussed in detail later, the computing system is designed to provide the interactive sessions to participant users in order, for example, so that after a participant user has participated in "Doodle Lesson 002" and finished that lesson, the computing system would then engage the participant user in "Doodle Lesson 003."

The FIG. 5A user interface includes various different interface element controls that enable users to interact with and edit the interactive sessions. For example, a user can select a clone interface element 512 to create a copy of an interactive session. A user can select an up interface element 516 to move the corresponding interactive session up, and can select a down interface element 518 to move the corresponding interactive session down. A user can select an archive interface element 520 to move the interactive session to a different user interface (e.g., as an alternative to permanently deleting the interactive session). Particularly relevant to the discussion below, a user may select a create lesson interface element 510 to create a new interactive session, or may select an edit interface element 514 to edit an already-created interactive session.

Selection of the edit interface element 514 causes the computing system to present the user interface that is shown in FIG. 5B. The FIG. 5B user interface includes a table 550 that includes seven rows 520a-g for seven respective interactive exercises that together comprise the interactive session. The table 550 includes eight columns 530 through 542 that each include fields and controls to define characteristics of the interactive exercises.

For example, the first row 520a in table 550 is for the interactive exercise "Flash Doodle", as specified by the words "Flash Doodle" in column 530 (labelled the "Activity" column). At Box 420, a user can interact with the controls in the cells of row 520a to define the content and operation of the "Flash Doodle" interactive exercise. As will be illustrated in detail below, an interactive exercise involves a computing system interacting with a participant to perform a series of tasks based on content items selected for the interactive exercise by an administrative user. The content items that form the basis for these participant-performed tasks are defined in the cells of the "game content" column 542.

At box 422, an administrative user adds content items to the Flash Doodle interactive exercise by interacting with the game content cell 542a. In this example, a user selects blank space within the game content cell 542a, for example, with a mouse click or finger tap. Responsive to the user selection of the blank space, the computing system presents a dialog box (not shown) that includes a list of candidate content items. The list of candidate content items may include all content items from the library of content items (e.g., all items in the "sound library" shown in FIG. 3B). User selection of a content item from the list may cause the computing system to add the selected content item to the list of content items shown in the game content cell 542a. The selected content item may remain available for inclusion in other interactive exercises.

The game content cell 542a shows a list of a couple dozen different content items. At box 424, the computing system may receive user input that reorders or removes content items. For example, the computing system may receive user input that selects the interface element for one of the content items in the game content cell 542a and drags the selected interface element to a different location within the game content cell 542a, changing the order of the interface elements and therefore also the order in which the computing system will present the content items during the corresponding interactive exercise. The computing system may also receive user input that selects the "x" mark at the right side of the interface element for each content item to remove the respective content item from the corresponding interactive exercise. The order and selection of content items represented within the game content cell 542a is important because the computing system may present the content items in the order specified in the game content cell 542a during an actual performance of the interactive exercise.

At box 426, the computing system receives user input that specifies the time, score, and other criteria for an interactive exercise. For example, a user may change the maximum time value (in minutes) in a cell under the "time" column 532, to change the maximum time (in minutes) for an interactive exercise before the computing system moves to the next interactive exercise. As previously described, each interactive exercise may involve presenting a collection of content items one at a time to a participant user and asking the participant user to respond to the presentation of each content item by either saying the content item or writing the content item. Upon expiration of a timer, the system may either immediately end the interactive exercise, or permit the participant user to complete the task for the currently-presented content item before ending the interactive exercise.

As another example, the cells under the "banana score" column 534 allow a user to specify the score that a participant user can earn when completing a certain number of tasks correctly. The cells in the "correct set" column 536 allow a user to specify the number of tasks that a participant must perform correctly in order to earn the score that is specified in the banana score column. The cells in the "game completion score" column 538 allow an administrative user to specify the score that a participant user earns upon completing the corresponding interactive exercise. The check boxes in the "select for proficiency" column 542 allow an administrative user to select whether or not metrics for the respective interactive exercise are provided for review by an instructor user.

The discussion provided above explains how an administrative user may define the characteristics of a single interactive exercise—the Flash Doodle interactive exercise, corresponding to row 520a in this example—and an administrative user may repeat this process for each of the other six interactive exercises illustrated in table 550 in FIG. 5B (as indicated by the "More exercises" decision box 430 in the FIG. 4 flowchart). An exception is that the "Doodle House" row 520g includes three sub-rows for "Phonemes," "Read Words," and "Write Words." This is because the Doodle House interactive exercise is actually a combination of different exercises that read and write phonemes and words. As such, the administrator is able to separately specify which phonemes are involved in that interactive exercise, which words are to be read, which words are to be written, and the scoring and various other metrics for each sub-portion of the Doodle House interactive exercise.

At box 440, the computing system receives user input that specifies re-direct content items. The re-direct content items are represented in FIG. 5B in field 560. These are content items that are used for the first and second correction routines that are described with respect to FIGS. 16a-b and 20a-b. An administrative user can select and order these re-direct content items in the same manner as described with respect to the cells in the game content column 542.

The fields in the reward criteria table 570 specify the score that the computing system awards a participant user upon completing various interactive exercises if criteria are satisfied. The values specified in table 570 show that the computing system awards a participant user a single banana if that participant completes the Flash Doodle interactive exercise with 25% of the tasks correctly performed, and two bananas if the participant user completes the same interactive exercise with 50% of the tasks correctly performed. Similarly, if the user completes the Go Doodle interactive exercise while providing the correct capitalization for every content item (e.g., sentences), the computing system awards the user a single banana.

Participation in Interactive Sessions

Figure 6A:
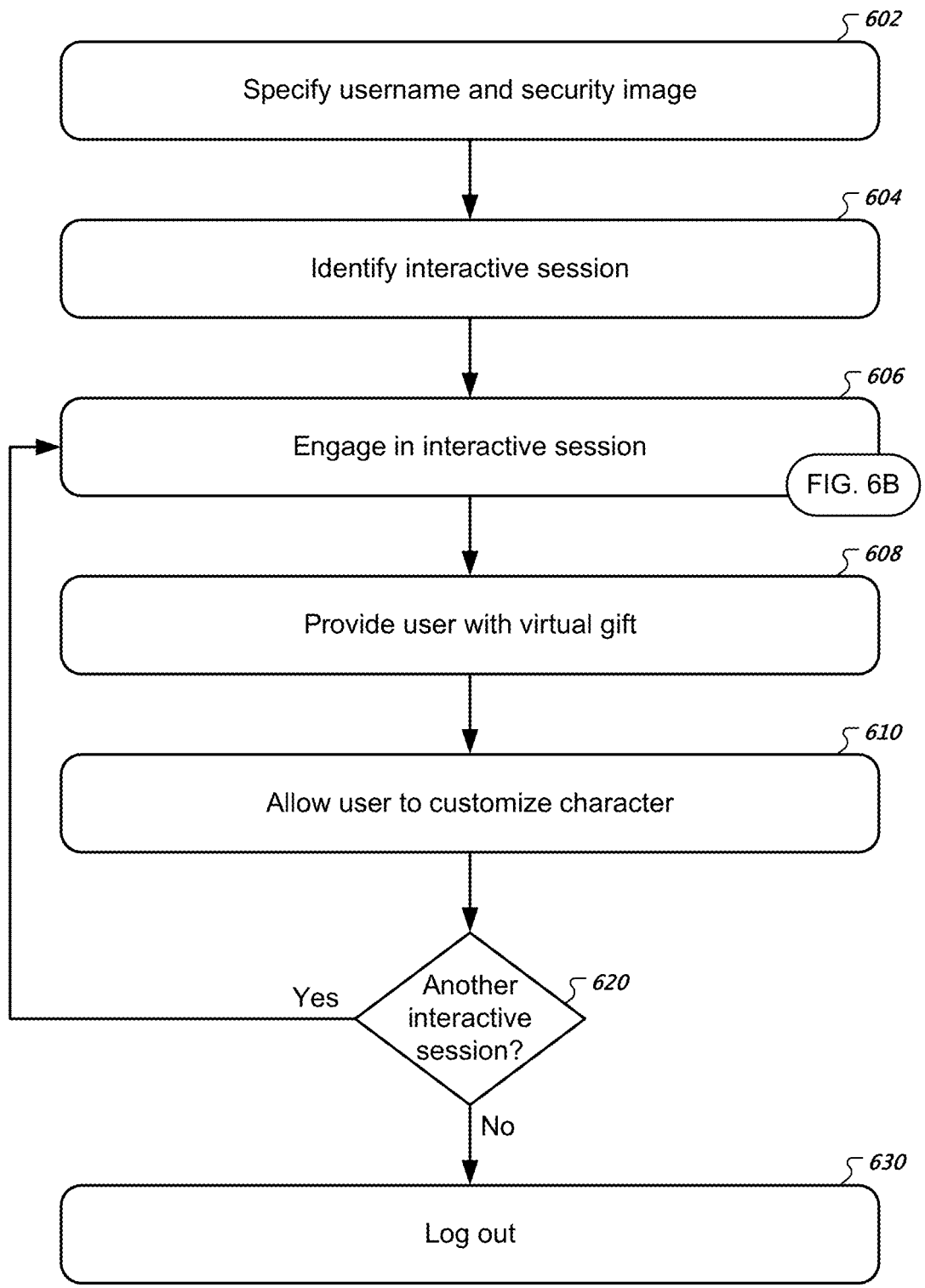
FIG. 6A-B show a flowchart of a process for engaging in an interactive session.

FIG. 6A shows a flowchart of the overall process for a computing system engaging in one or more interactive sessions with a participant. As an illustration, a participant may pick up a tablet computing device 150 and select an icon for an application program that allows the user to participate in an interactive session.

At box 602, the computing system receives user input that specifies a username and a security image. For example, after the participant has selected the application icon, the computing system may present a list of usernames. The application program may have been set up or otherwise configured on the tablet computing device 150 by an individual that is serving as an instructor to multiple participants, that instructor may have created a collection of user accounts for participants in his or her classroom, and the list of usernames presented by the tablet computing device 150 may represent user accounts of the participants in that classroom. Responsive to the participant selecting his or her username, the computing system may present a collection of images (e.g., nine clip art drawings, including for example, one of a house, one of a car, and one of a cat), and the participant may provide input to select one of the images in the collection.

The combination of the username and the selected security image may serve as credentials for the participant user, and the computing system may compare the user-selected security image to determine whether it matches a security image that the participant previously selected, in order for the computing system to determine whether to provide the participant access to an interactive session queued up for the individual represented by the selected username. The authentication process may be relatively straightforward here (e.g., not requiring a text password and only requiring selection of a correct one of multiple displayed security images) because participants may not be fully literate and may be trying to login to increase a level of their literacy.

At box 604, the computing system identifies an interactive session queued up for the participant user. In the situation in which the participant user has not previously logged into the system, that interactive session may be the first interactive session shown in table 502 of the FIG. 5 user interface. If the participant user has completed some of those interactive sessions, the computing system may select the next interactive session in table 502. In some implementations, the participant is able to select an interactive session, from among a collection of interactive sessions presented by the computing system, in which the participant would like to participate.

At box 606, the computing system performs a process for engaging in the interactive session with the participant user. This process is described in more detail with reference to FIG. 6B, which shows the set of seven interactive exercises that the computing system will step through with the participant user (illustrated with boxes 650, 652, 654, 656, 658, 660, and 662).

Figure 6B:
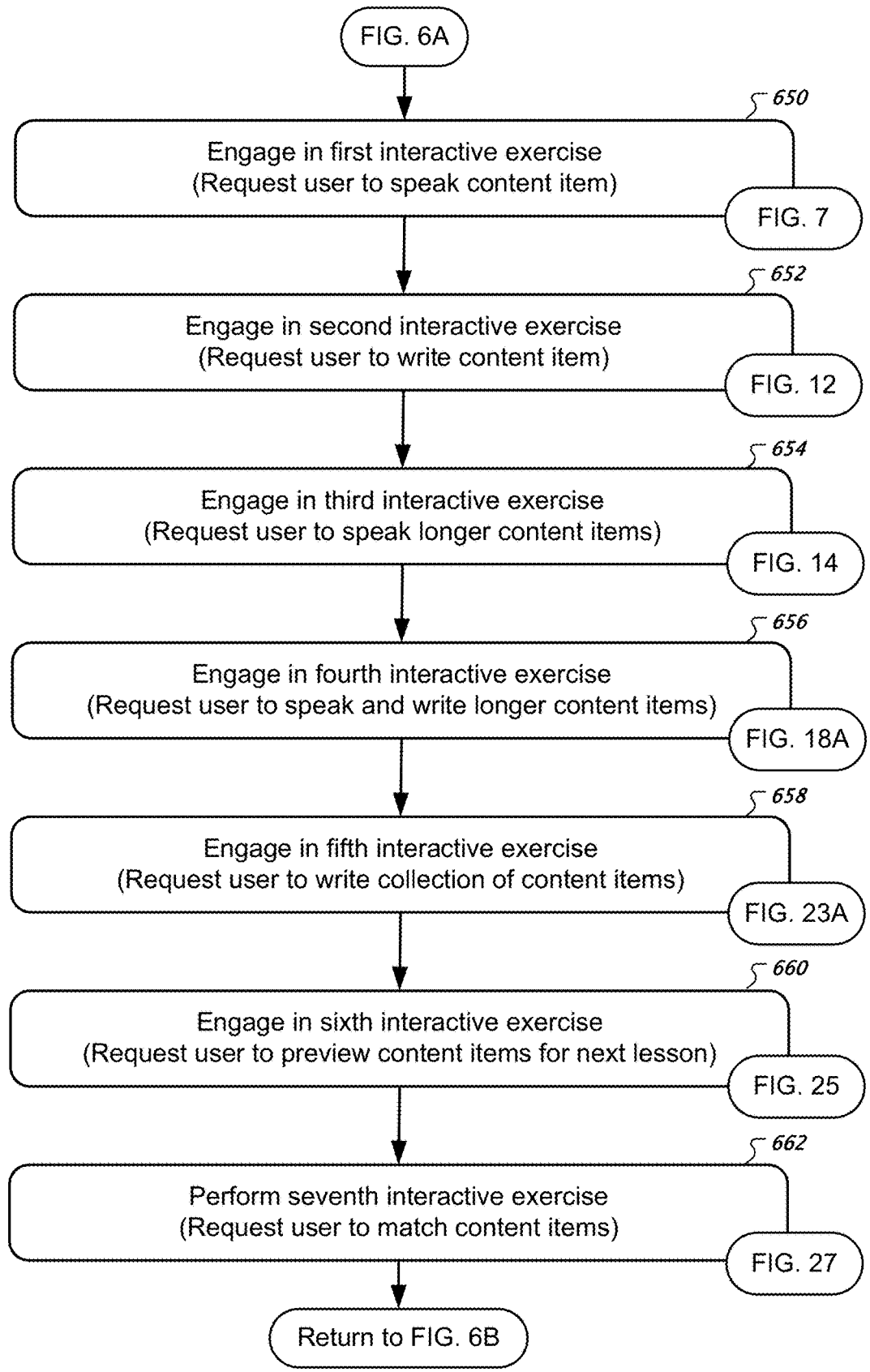

Turning now to FIG. 6B, at box 650, the computing system engages in a first interactive exercise with the user, which involves presenting content items to a participant and requesting that the participant respond by speaking each of the content items. Operations for this first interactive exercise, termed "Flash Doodle" are described with respect to the flowchart of FIG. 7 and the user interfaces of FIGS. 8A-D.

Figure 7:
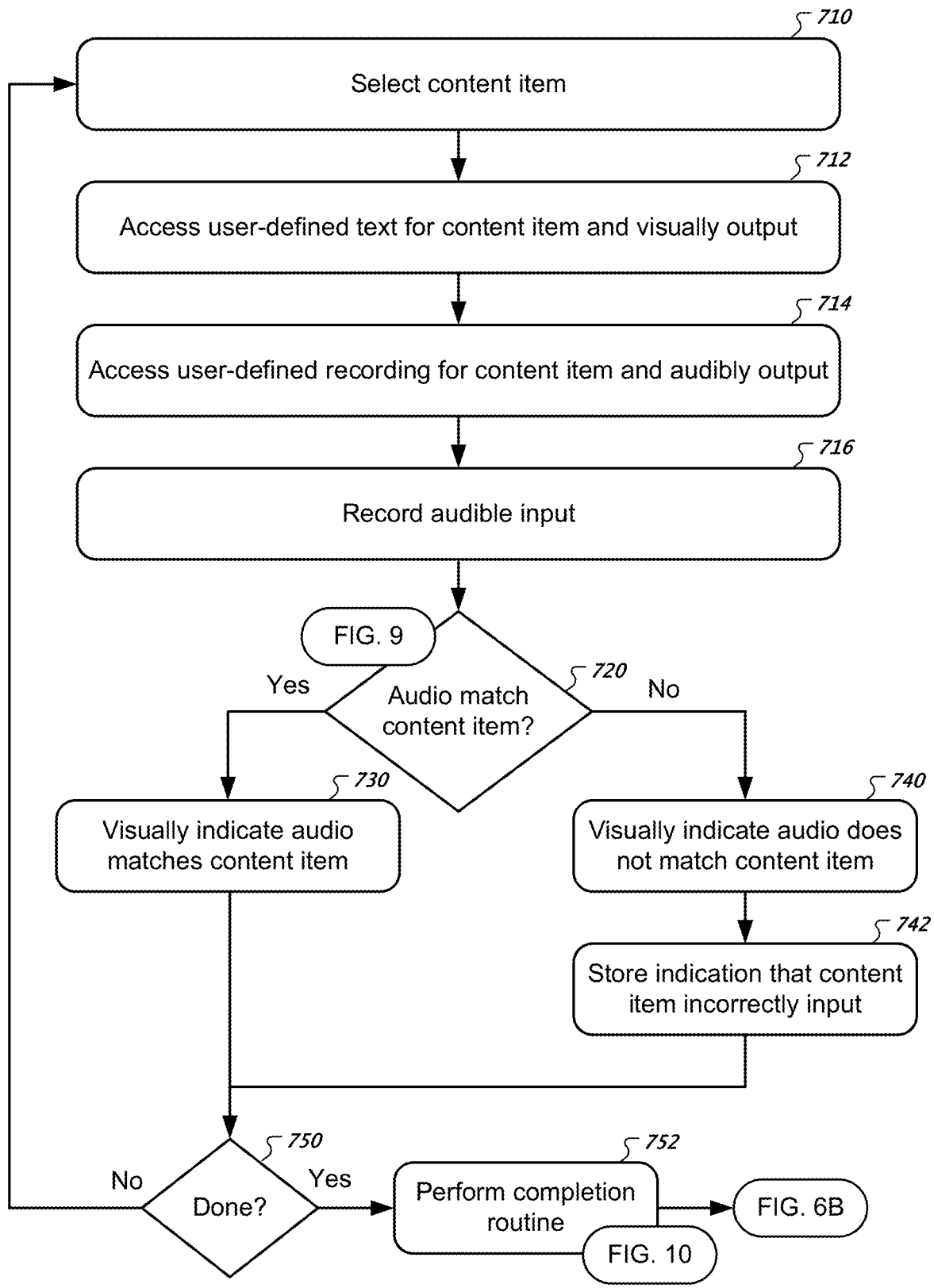
FIG. 7 shows a flowchart of a process for performing a first interactive exercise.
Figure 8A:
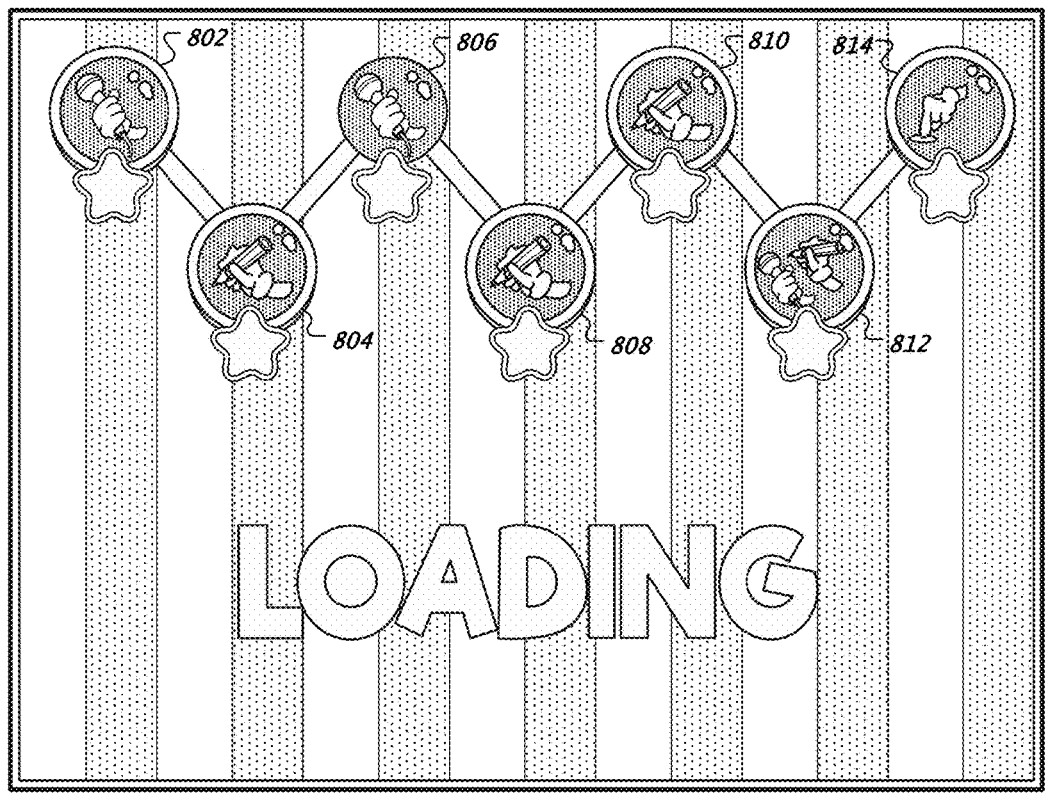
FIGS. 8A-D show user interfaces for performing a first interactive exercise.

Referring now to FIGS. 7 and 8A-D, the computing system begins the first interactive exercise by showing the splash screen user interface of FIG. 8A, which includes seven graphical representations 802-814 of the seven, respective interactive exercises, and indicates which of those seven interactive exercises are complete. In this illustration, no interactive exercise is yet complete and therefore none of the "star" interface elements are shaded.

Figure 8B:
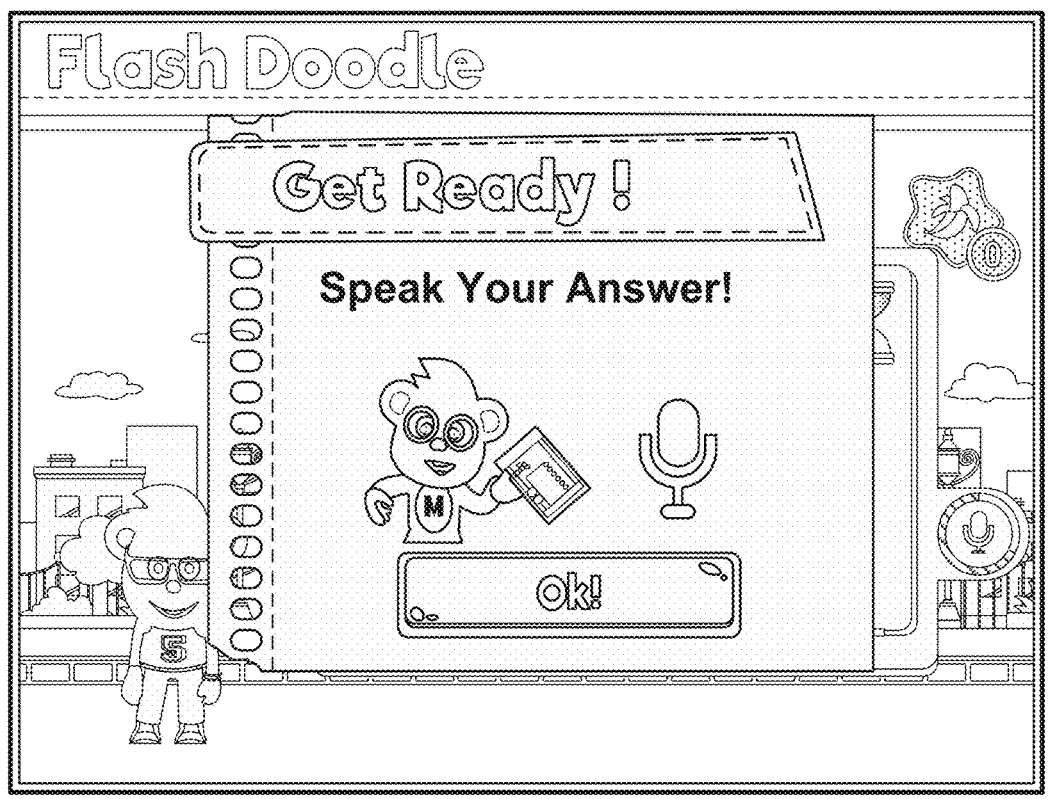

After the computing system presents the FIG. 8A user interface, the computing system presents the introductory user interface of FIG. 8B, which introduces the participant user to the name of the interactive exercise ("Flash Doodle") and informs the participant user of the type of interaction involved with the interactive exercise ("Speak Your Answer!"). The computer system presents a similar splash screen and introductory user interface before all seven of the interactive exercises, but this description only discusses these user interfaces here with respect to the first interactive exercise.

Turning now to the FIG. 7 flowchart, at box 710, the computing system selects a content item. The content item is selected from among the content items specified for the first interactive exercise by the administrative user (or other authoring user, such as the instructor) in box 422 of the FIG. 4 flowchart, as illustrated within cell 542a of table 550 of the FIG. 5B user interface. The content item is selected in order. As such, if the participant user is beginning the exercise, the computing system selects the first content item from the list. If the participant repeating the operations of box 710 for a second time after having completed the operations of the FIG. 7 flowchart once, then the selected content item is a second content item from the list of content items. In this illustration, the selected content item is the letter "t".

Figure 8C:
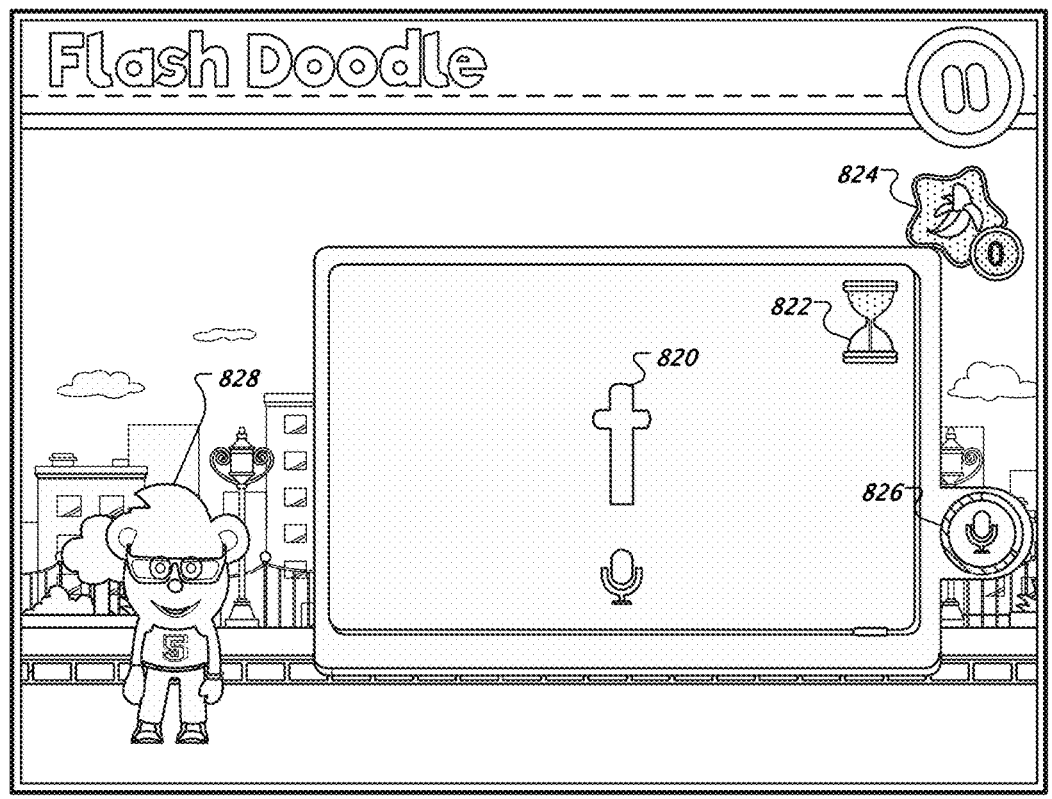

At box 712, the computing system accesses user-defined text for the content item and visually outputs the content item. For example, the server system 130 (FIG. 1) accesses information for the selected content item from the content and metrics data store 120. The accessed information includes the information that the administrator defined for the content item at boxes 212, 213, and 216 of the FIG. 2 flowchart, including the "text" for the content item, which in this illustration is the single character "t." As such, the computing system visually adds the letter "t" to a template display into which the computing system is configured to render text representations of content items. An example illustration of the template display with a representation of the letter "t" 820 inserted therein is shown in FIG. 8C. The FIG. 8C user interface also includes a timer 822, which indicates an amount of time left to complete the interactive exercise. Also shown is a score indicator 824, which shows how many points (bananas) the user has scored during the current interactive exercise. The FIG. 8C user interface also includes a microphone button and timer 826, which counts down an amount of time that the participant user is permitted to select the button 826 in order to record a response to the system prompt.

At box 716, the computing system records an audible input. For example, the participant may have selected the microphone button 826 to activate the computing system to record audio with a microphone of the computing system (e.g., a microphone of the tablet 150). The participant may then have spoken, and the computing system then records the spoken audio using the microphone and converts the recording to a digital representation of the spoken audio.

Figure 9:
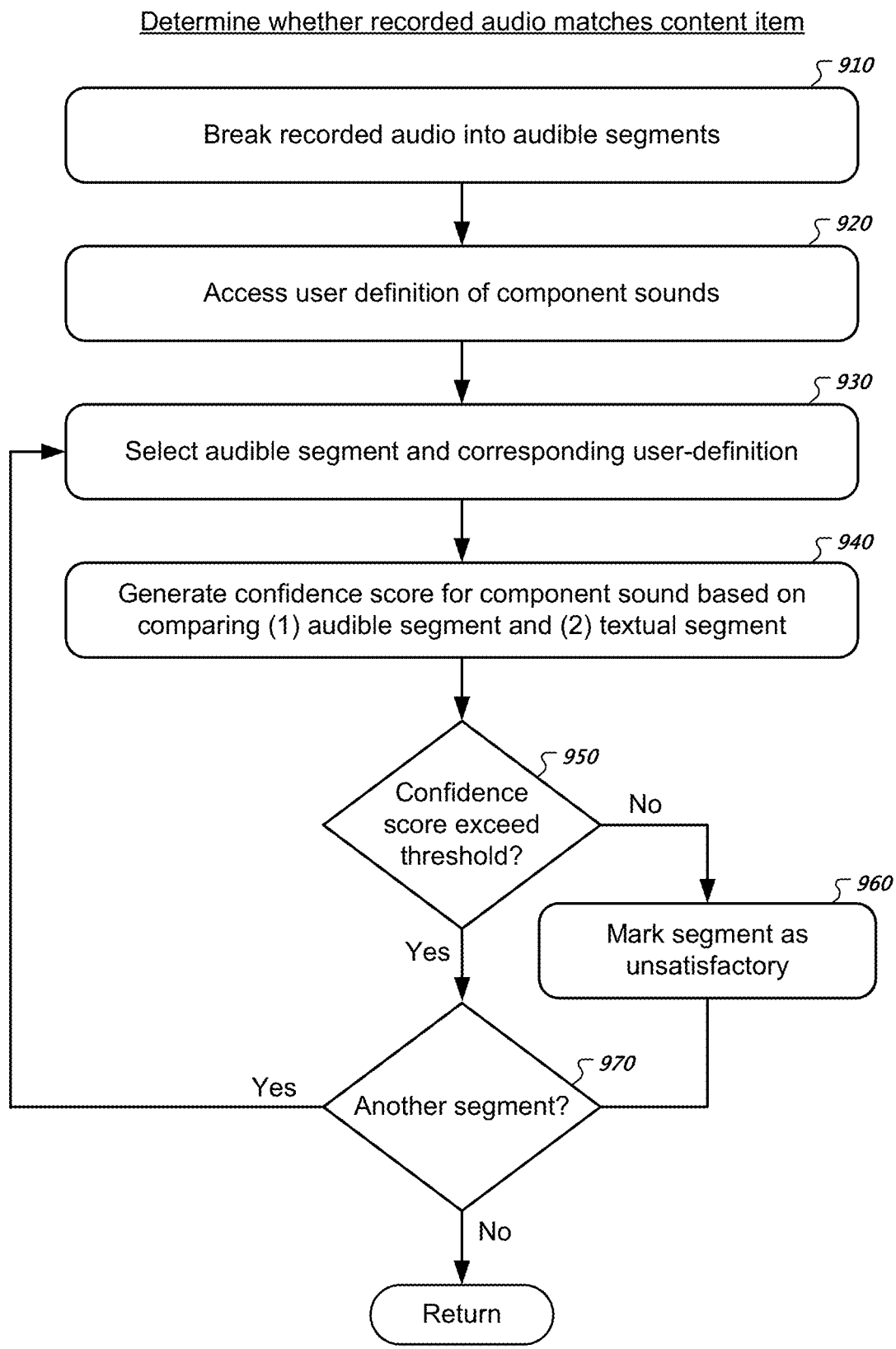
FIG. 9 shows a flowchart of a process for determining whether recorded audio matches a content item.

At box 720, the computing system determines whether the recorded audio matches the content item, the process for doing so being described in additional detail with reference to a flowchart in FIG. 9, to which this description will now turn before returning to the operations of the FIG. 7 flowchart.

At box 910, the computing system breaks the recorded audio into audible segments. The breaking of the recorded audio into segments involves an audio segmenting process by which a spoken content item (e.g., an audio recording of a word) is broken into its constituent sounds, which enables the computing system to separately analyze each component sound. In the situation in which the content item is a single character (e.g., just a "t" as illustrated with respect to FIGS. 7 and 8C), then the computing system either may skip the audio segmenting process, or may perform the audio segmenting process with the audio segmenting process returning the same audio that was provided to the process (although potentially with "empty" portions of the recording before and after the sound of the "t" removed).

In the situation in which the content item has multiple letters (e.g., "sat" as is illustrated with respect to FIGS. 14 and 15A), the audio segmenting process analyzes the audio to identify each different sound in the recorded audio. The process may actually split the recording into multiple audio files, or may simply maintain the same recording but generate pointers that identify where each component sound begins and ends. As an illustration, the audio segmenting process could analyze audio of a participant speaking the word "sat" and identify the portion of the recording that corresponds to the "s" sound, the portion of the recording that corresponds to the "a" sound, and the portion of the recording that corresponds to the "t" sound. The computing system may perform this audio segmenting process itself, or send the audio to a remote computing system for performance of the audio segmenting process.

At box 920, the computing system accesses the user definition of component sounds for the content item. For example, the computing system accesses the text string specified by the administrator at box 216 in the FIG. 2 flowchart, through user interaction with the appropriate field in column 356 of the FIG. 3 user interface. In the example in which the content item is a "t," the user-defined information is simply the text "t." In the example of the content item "sat", the user-defined information may be the text string "s,a_short,t". The presence of one or more separators in the text string (e.g., one or more commas or spaces) indicates that the content item includes multiple component sounds that are separated by the one or more separators.

At box 930, the computing system selects the audible segment and the corresponding user segment. For the illustration in which the word "sat" is being processed, the computing system would select both a portion of the recorded audio for the letter "s" and would also select the text "s" from the string "s,a_short,t".

At box 940, the computing system generates a confidence score for the component sound based on comparing the audible segment and the corresponding text segment. For example, the computing system may provide the selected audio and text segments to an audio analysis engine. The audio analysis engine can use data libraries and/or algorithms to determine whether a portion of recorded audio matches a sound specified by the text input. For example, receipt of the audio analysis engine of an input of recorded audio and also the text "s" can cause the audio analysis engine to run pre-configured routines to determine whether the portion of recorded audio represents a user speaking the sound "s". The audio analysis engine can return a confidence score (e.g., a number from 0.00 to 1.00) indicating a likelihood that the recorded audio matches the text.

At box 950, the computing system determines whether the confidence score exceeds a pre-designated threshold (e.g., 0.80). If the confidence score does not exceed the threshold, at box 960, the computing system marks the segment as incorrect or unsatisfactory, for example, by storing information in content and metrics database 120 that indicates that the participant incorrectly spoke a component sound ("s" in this example).

At box 970, responsive to either a "positive" result from the determination of box 950 or upon completion of box 960, the computing system determines whether the audio includes another segment. In the illustration in which the system is processing the word "sat," there is another segment after "s," so the computing system would return to box 930. Once at box 930, the computing system may select the next audible segment (e.g., audio for "a" in "sat") and the corresponding portion of the text string (e.g., "a_short" in the text string "s,a_short,t"). The computing system then repeats the operations of boxes 940, 950, and if appropriate 960, to generate a confidence score for the next sound and determine whether the participant correctly spoke the next sound. This process cycles until all component sounds of the content item have been analyzed, and the computing system then returns to the calling process.

Returning the FIG. 7 flowchart, now at box 720, the computing system determines whether the recorded audio matches the content item output by the computing system. This determination may be performed by analyzing whether each component sound analyzed with the process of the FIG. 9 flowchart exceeded the pre-designated threshold. In this illustration the content item included a single component sound (i.e., the sound "t"), and therefore the analysis would be whether the audio analysis engine returned a satisfactory confidence score for a comparison of the audio recording to the letter "t."

At box 730, responsive to a "positive" result to the determination of box 720 (indicating that the participant correctly spoke the content item), the computing system modifies the user interface that is shown in FIG. 8C to (1) change the shading of the text representation of the content item to indicate a match (e.g., change the letter "t" from white to blue), (2) add a filled-in, colored star above the content item, and (3) animate character 828 in a reinforcing manner (e.g., with a dance).

At box 740, should the computing system determine that the audio did not match the content item (the "negative" branch in FIG. 7), the computing system modifies the user interface that is shown in FIG. 8C to change the shading of the text content item indicate that there is no match (e.g., changing the letter from white to yellow), or does not change the shading of the text content item, and potentially adds some other indication that there is no match (e.g., a star that is not filled in or colored).

At box 742, responsive to a "negative" result to the determination of box 720 (indicating that the participant did not correctly speak the content item), the computing system stores an indication that the participant incorrectly input the content item. For example, the computing system may store, in the content and metrics data store 120, an indication that the participant incorrectly responded when prompted to speak the content item "t".

At box 750, the computing system determines whether it is done with the first interactive exercise, or whether to perform the operations of boxes 710 through 742 for another content item. The computing system may be done with the first interactive exercise in either of at least two situations. First, the timer 822 in the FIG. 8C user interface may have expired, with an initial value of the timer 822 being specified by an administrator through user interaction with the appropriate cell in column 532 in the FIG. 5B user interface. Second, the system may have cycled through all available content items specified by the administrative user for the first interactive exercise. If the timer has not expired and additional content items remain, the process repeats beginning with the operation at box 710. If the system is done, it proceeds to perform the completion routine at box 752, which is described in additional detail with respect to the flowchart of FIG. 10 and the FIGS. 11A-B user interfaces. After performance of the completion routine, the computing system returns to the main interactive session process flow at FIG. 6B. This discussion now turns to FIG. 10, which shows a flowchart of the completion routine.

Figure 11A:
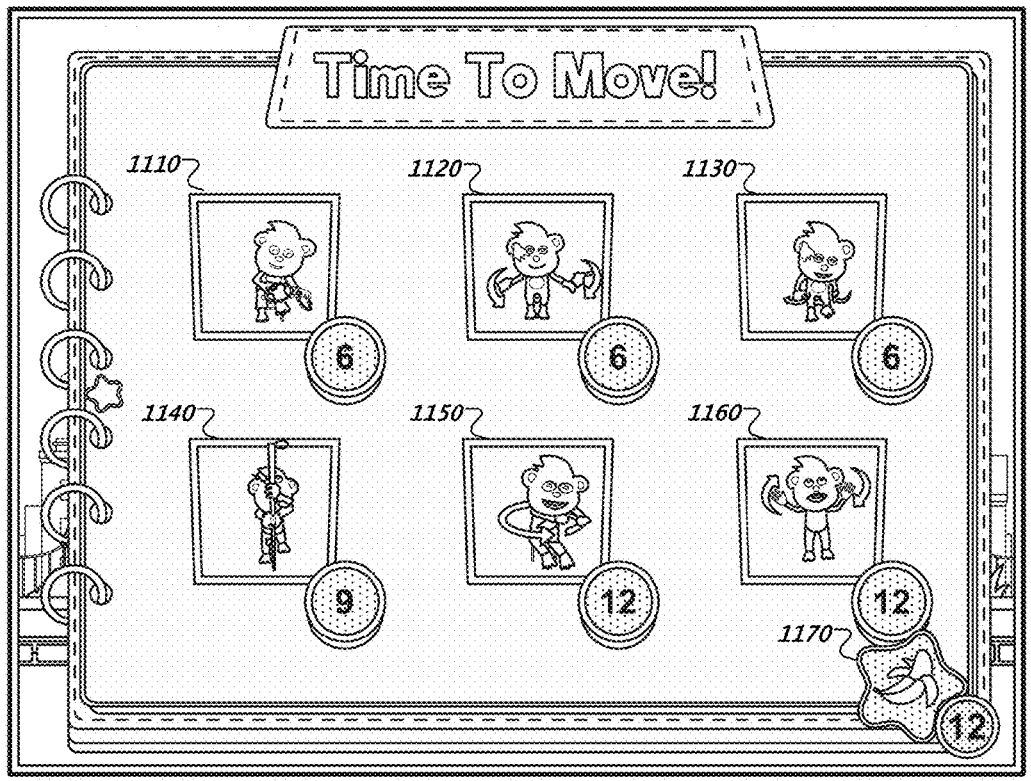
FIGS. 11A-B show user interfaces of the completion routine.

At box 1010, the computing system visually identifies multiple activities. For example, the computing system can present the user interface that is illustrated in FIG. 11A, which includes six interface elements 1110-1160 representing six different activities. At the bottom right of the FIG. 11A user interface is an indication of the current score 1170, which is twelve bananas in this illustration. Each of the different activities requires a different score to select the associated activity, with the required score represented by the number at the bottom-right of each of the six interface elements 1110-1160. All activities are available in this illustration because the participant user has earned twelve bananas, which is enough to select any of the activities. Should the participant user have only earned nine bananas, for example, the system would have shown interface elements 1150 and 1160 as unavailable (e.g., by shading them gray).

At box 1020, the computing system receives user input that selects one of the multiple activities. For example, the tablet computing device 150 may receive an indication that a finger or stylus contacted a touchscreen of the tablet computing device 150 at a location of the top-left interface element 1110.

Figure 11B:
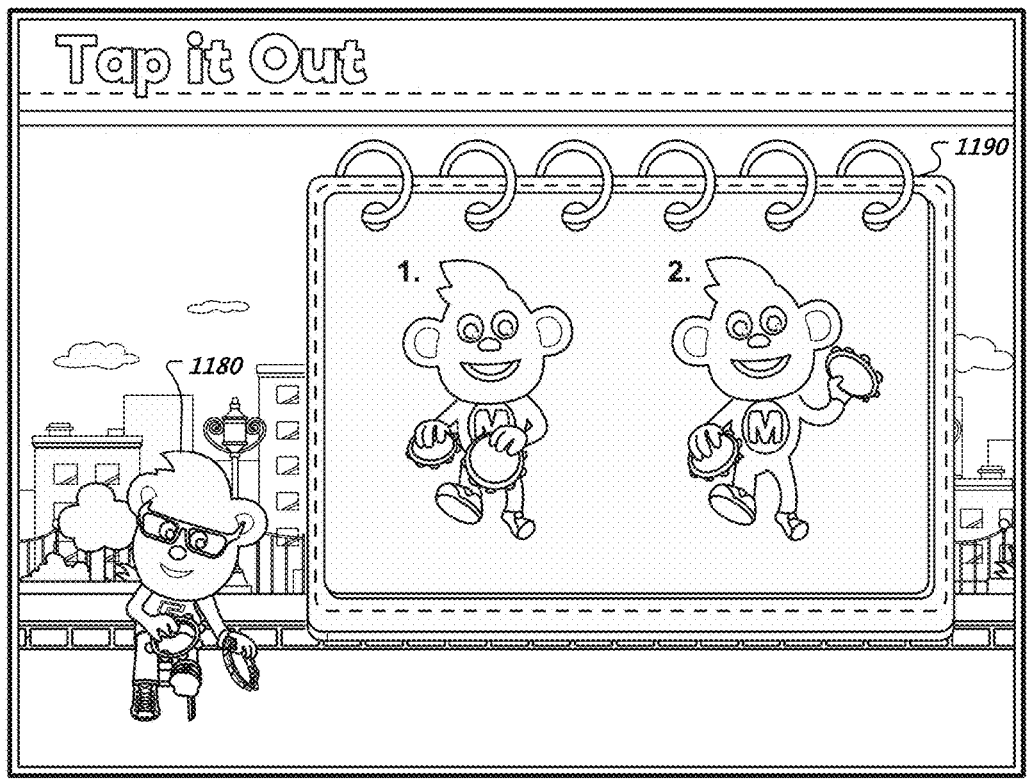
Figure 12:
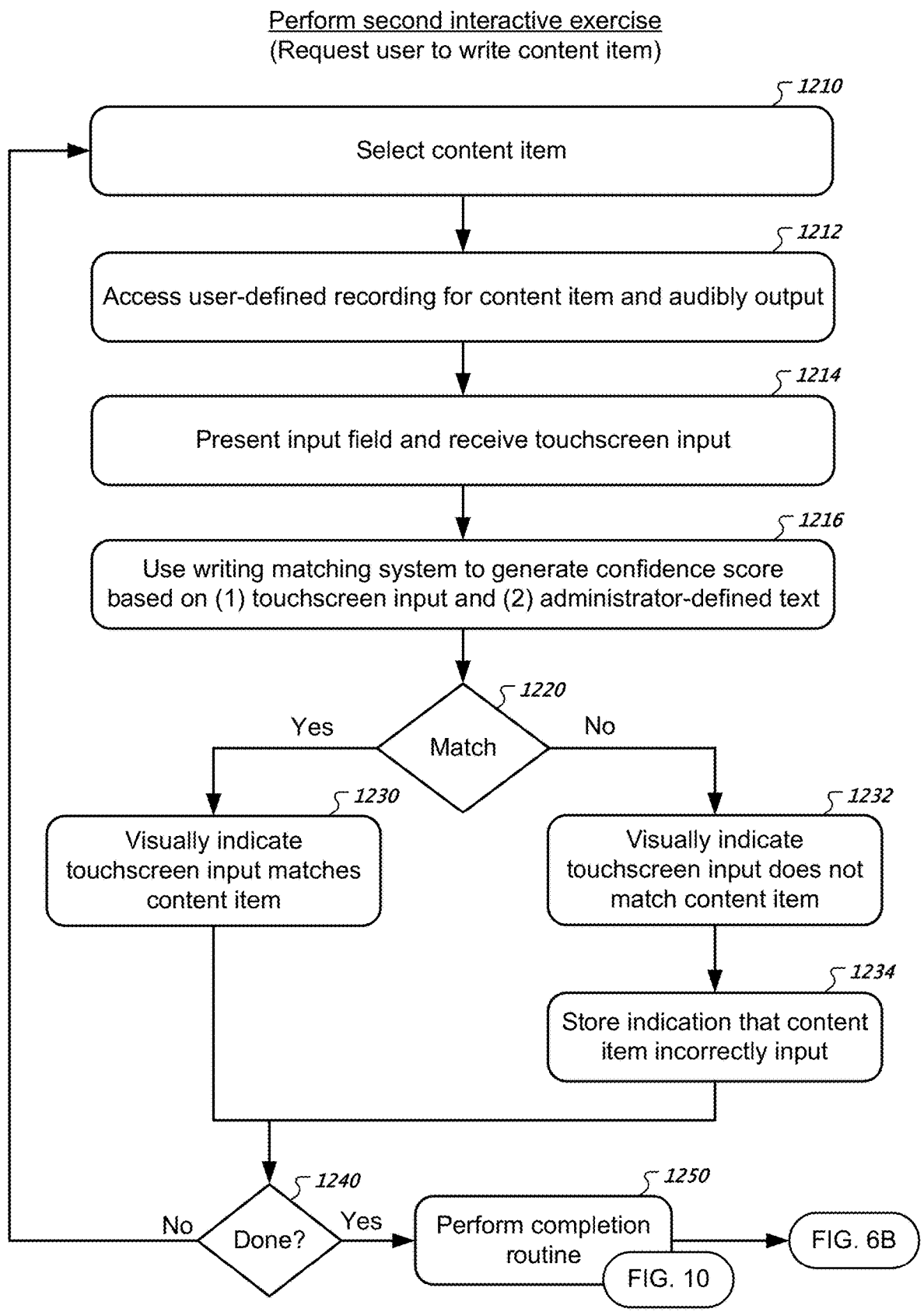
FIG. 12 shows a flowchart of a process for performing a second interactive exercise.

At box 1030, responsive to the user having selected the top-left interface element 1110, the computing system transitions to the user interface presented in FIG. 11B, which shows an animated character 1180 banging tambourines on his knees, with a central portion of the display showing two still images that illustrate how the participant is to join in the activity with the animated character 1180.

Figure 8D:
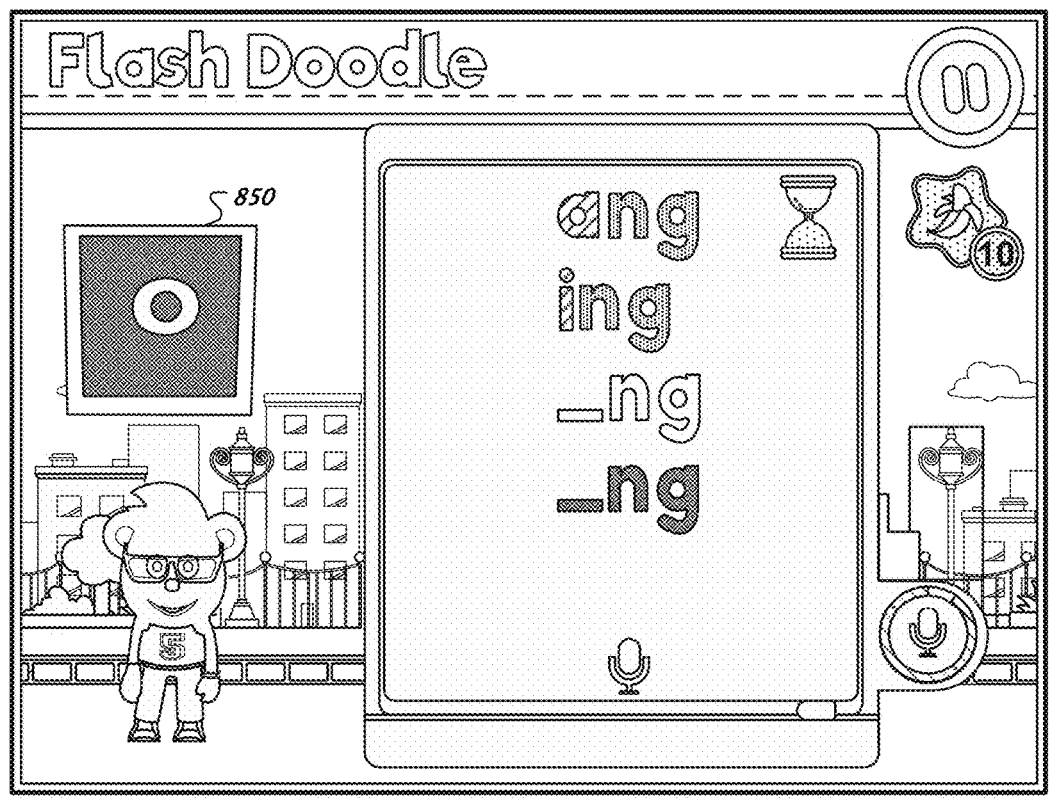

FIG. 8D shows a unique type of content item that includes four sub-content items that all end with the same set of characters. The computing system displays the four content items with only the same set of characters at the end of each content item presented, and an introductory portion of each content item that differs replaced with an empty space represented by an underline. The computing system presents, one-at-a-time, a textual representation of the correct beginning for each content item in presentation field 850 on the left side of the screen, prompting the participant to speak a content item that begins with the character in field 850 and ends with the characters repeated in the center of the user interface. In this illustration, the participant has already correctly spoken "ang" and "ing," and is currently prompted by the presentation of "o" in field 850 to speak "ong." After successfully speaking "ong", the box 850 will change to show an "e" to prompt the participant to speak "eng." The processing of each sub-content items is similar to the processing that the computing system performs for a single content item, as described with respect to the flowchart of FIG. 7.

Returning now to the FIG. 6B flowchart, which shows the main process flow for the interactive session, with the first interactive exercise (box 650) complete the process moves to the second interactive exercise (box 652). This second interactive exercised is termed "Doodle Print" and involves the computing system requesting a participant to write a content item rather than speak the content item, as was case with the first interactive session. The operations of the second interactive session are described in detail with reference to the flowchart of FIG. 12, to which this discussion now turns.

At box 1210, the computing system selects a content item. For example, the computing system would select the initial content item defined by an administrative user in cell 542*b* in the FIG. 5B user interface. In this illustration, the initial content item selected is a "b".

At box 1212, the computing system accesses a user-defined recording for the content item and audibly outputs that user-defined recording. For example, the server system 130 may access the content and metrics data store 120 to retrieve a recording that an administrative user had uploaded for the selected content item, in this case a recording represented in column 354 of the FIG. 3B user interface for the content item "s". The computing system may then play that audio file over one or more speakers of the computing system (e.g., a speaker of the tablet computing device 150). For example, the tablet computing device 150 may audibly output "Write 's'", with the word "Write" being a template recording and the computing system appending the administrative user-defined recording to the end of the template recording.

Figure 13A:
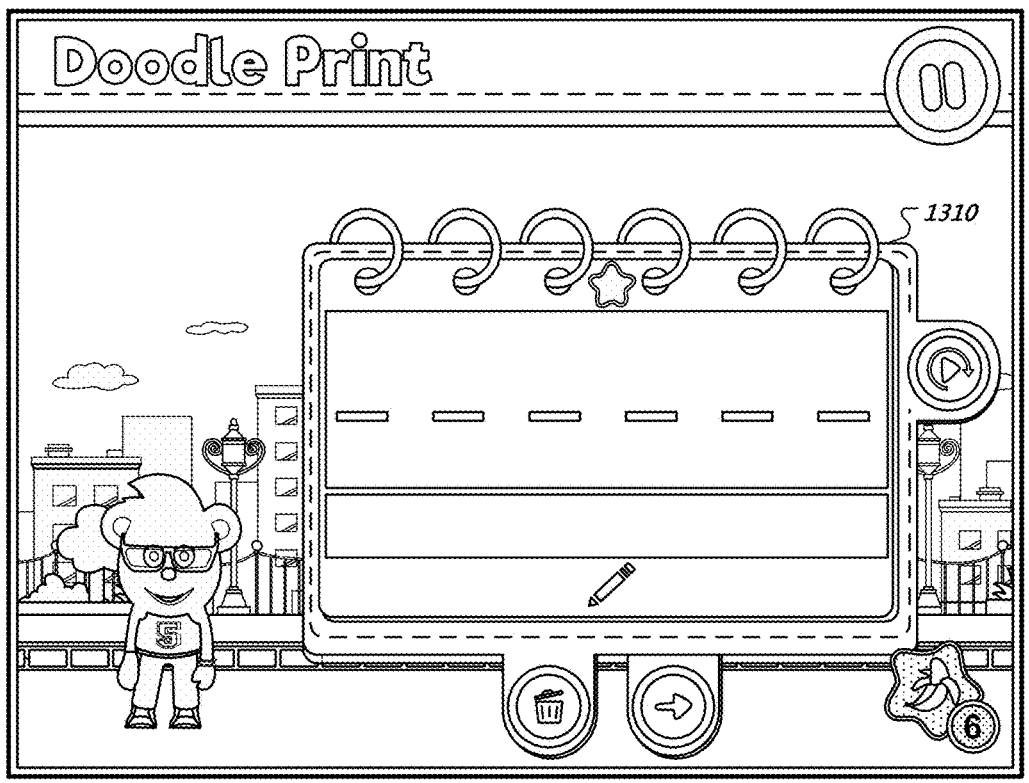
FIGS. 13A-C show user interfaces for performing the second interactive exercise.
Figure 13B:
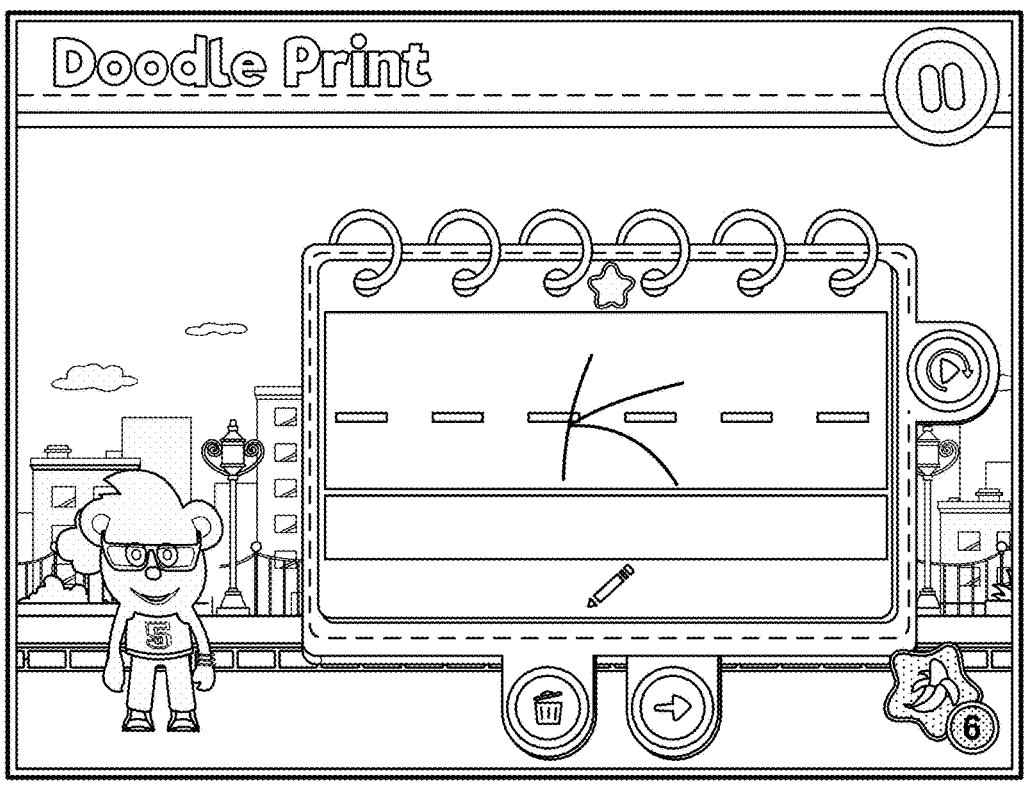

At box 1214, the computing system presents an input field and receives touchscreen input through interaction with that field. For example, the computing system may display the user interface shown in FIG. 13A, which includes such an input field in the center of the user interface. In some examples, the computing system audibly prompts the user to write the content item (as discussed above) while presenting the user interface that is shown in FIG. 13A. The participant can respond by using his or her finger or a stylus to write the content item into the field (or at least the user's best attempt to write the content item). The computing system can record the user input as an animated gesture, by creating an animation or some other type of data that indicates the locations of the user finger/stylus on the touchscreen at different times, such that the computing system stores a timing and a manner in which the input was formed and not just a final representation of the traced line drawing. The FIG. 13B user interface shows that the user has traced the letter "K", which is different than the system request to write "s".

In some examples, the computing system receives input that writes the content item by analyzing user movement in free space, for example, user movement of a controller or their hand in free space, through computing system analysis of motion sensors inside of the controller or through video or analysis to identify how a user is moving their hands in free space. Such techniques may be used in implementations in which the computing system interacts with the participant using a virtual or augmented reality experience, in which the content items are displayed by goggles that the participant wears or a large monitor placed in front of the participant, and the participant provides written input by moving their hands in free space. Such technologies may be used in place of the use of touchscreens discussed through this document.

At box 1216, the computing system uses a writing matching system to generate a confidence score based on the touchscreen input and the administrator-defined text for the content item. For example, the computing system may provide the touchscreen input and the text "s" to a writing matching engine, and the writing matching engine may return a confidence score that indicates a similarity between the handwritten letter and the administrator-defined text for the content item. In some implementations, the writing matching system only analyzes a final representation of the user input and does not analyze an animated gesture representative of the user input (which a different analysis system may analyze, as described later). Here, the content item is an "s" but the user drew a "K" and the writing matching system would therefore return a low confidence score, for example, 0.15 out of 1.00.

In some implementations, the computing system identifies not only whether the content item was input correctly, but what the participant input if the content item was incorrectly input. For example, in addition to returning the confidence score of 0.15 for the character "s", the writing matching system may return a confidence score of 0.95 for the character "K". The writing matching system can also determine whether characters in the written input are slanted forward or backward, whether characters are larger or smaller than a size designated by the input field (e.g., whether lower-case characters improperly extend above the dashed line in the input field or whether upper-case characters do not extend above the dashed line in the input field). The writing matching system can also determine whether the spacing between letters is too large, too small, or inconsistent between letters.

At box 1220, the computing system determines whether the handwritten content item matched the text for the content item. The matching process may be based on whether the confidence score exceeds or otherwise satisfies a pre-designated threshold, such as 0.8. In this situation, the confidence score of 0.15 does not exceed the threshold of 0.8. As such, the computing system performs the operations of box 1232, whereas had there been a match the computing system would have performed the operations of box 1230.

Figure 13C:
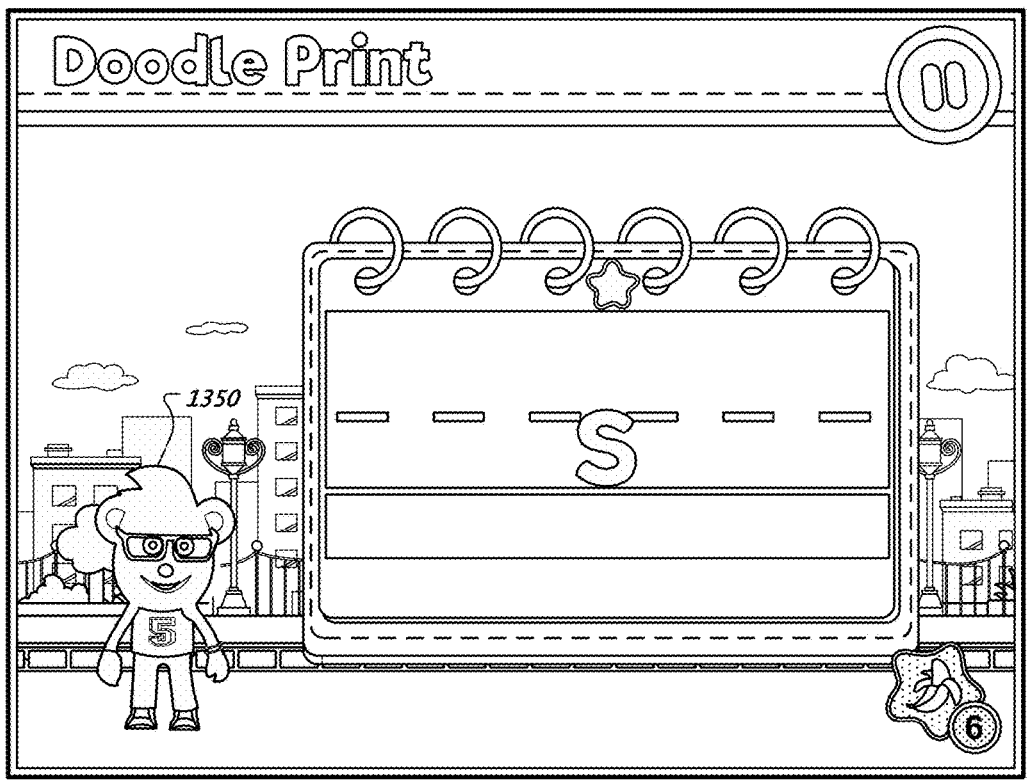

At box 1232, responsive to a "negative" result to the determination of box 1220, the computing system visually indicates that the touchscreen input does not match the content item. For example, the user interface shown in FIG. 13C shows a text representation of the correct content item ("s", not "k"), and includes a gray-shaded star above the correct content item rather than a yellow-shaded star, which the computing system would have presented had the participant written the correct content item.

At box 1234, the computing system stores an indication that the participant input the incorrect content item, for example, in the contents and metrics data store 120. The stored indication may specify the participant user, the interactive exercise in which the user input the incorrect content item, the content item that the user input incorrectly, and a character or word that the user input instead. The computing system may also store indications of any determinations by the writing matching system that the written input was unsatisfactory, such as the characters being too big or small, the spacing between letters being too big or too small and the other similar types of determinations discussed above with respect to the writing matching system.

At box 1240, the computing system determines whether to end the second interactive exercise or whether the second interactive exercise should repeat for another content item. As described above with respect to the first interactive exercise, the process may continue to repeat until either time runs out or the system cycles through all content items specified by an administrative user for the second interactive exercise.

At box 1250, the computing system performs the completion routine (described in detail with reference to FIG. 10), before returning to FIG. 6B upon completion of the second interactive exercise.

Returning now to the flowchart in FIG. 6B, with the second interactive exercise (box 652) complete, the process moves to the third interactive exercise (box 654), termed "Doodle See," which involves the computing system prompting a participant to speak a longer content item. The operations of the third interactive exercise are described in detail with reference to the flowchart of FIG. 14 and the user interfaces shown in FIGS. 15A-B, to which the discussion now turns.

At boxes 1410, 1412, 1414, and 1420, the computing system selects a content item, accesses text for the content item and visually outputs that text (audibly outputting the content item in some implementation), records the participant's spoken response, and determines whether the recorded audio matches the content item. These operations are similar in many respects to the operations of boxes 710, 712, 726, and 720 of the FIG. 7 flowchart, except that the content items are longer (e.g., multi-letters words rather than single-letter sounds), and that the characteristics specified for the third interactive exercise by the administrator are different based on the specifications of row 520c in the FIG. 5B user interface (e.g., the time, score, content items, etc. for the third interactive exercise).

Because the content items are longer, the audio-matching operations described with respect to the FIG. 9 flowchart may be different than when the audio-matching process is performed with a single-character content item. Indeed, as described above with reference to the FIG. 9 flowchart, when audio recorded for a multi-character content item is analyzed, that audio is broken into component audible segments and each component of the audio is compared to a phonetic description of the content item.

When the participant correctly speaks the content item, prompting the operations of box 1430, the user interface and operations are similar to the operations of box 730 in the FIG. 7 flowchart. For example, the FIG. 15A user interface shows how the computing system indicates that a user has correctly spoken the content item "sat".

Figure 14:
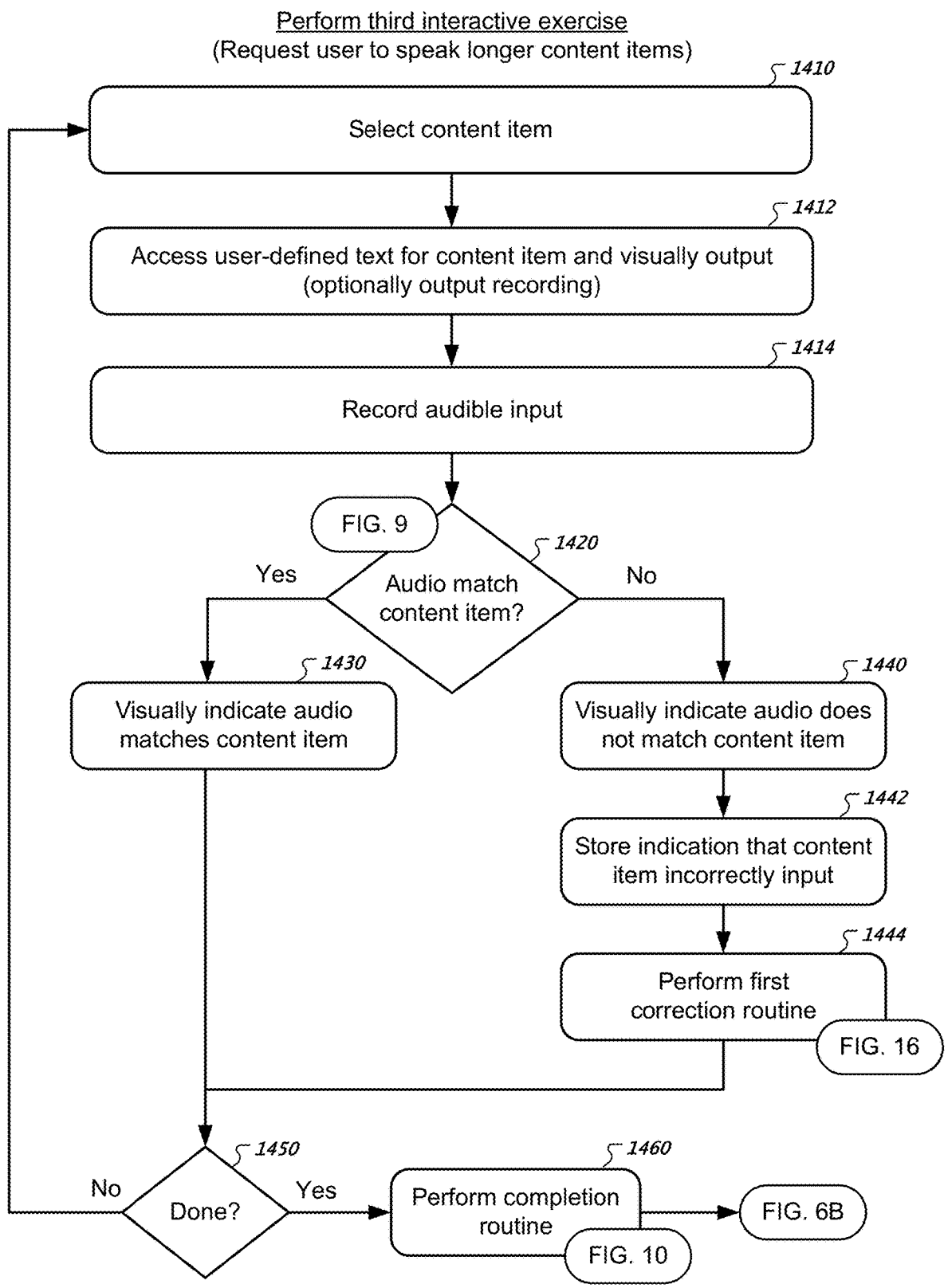
FIG. 14 shows a flowchart of a process for performing a third interactive exercise.
Figure 15A:
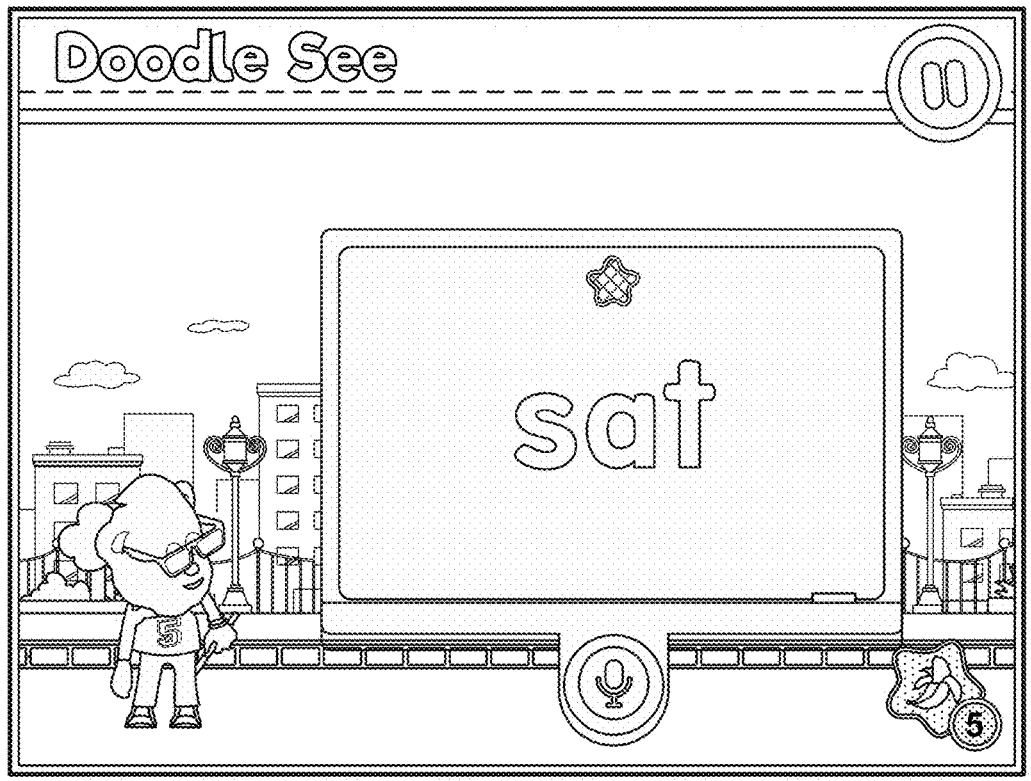
FIGS. 15A-B show user interfaces for performing the third interactive exercise.
Figure 15B:
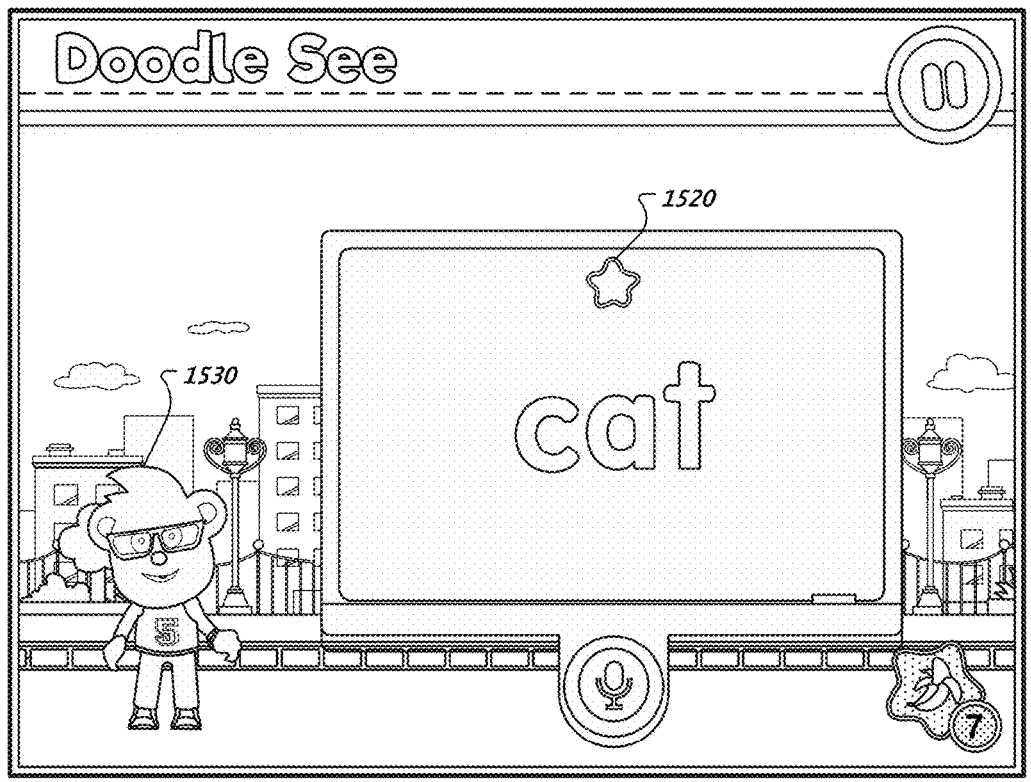

However, when the participant user incorrectly speaks the content item, the operations along the "negative" branch of the FIG. 14 flowchart (boxes 1440, 1442, and 1444) are different in some respects than the operations performed for the "negative" branch during the first interactive exercise.

At box 1440, the computing system visually indicates that the recorded audio does not match the content item. As an illustration, suppose that the content item is the term "cat" but that the participant spoke the word "bat." In response to this incorrect entry, the computing system may show the user interface of FIG. 15B, which shows the star 1520 unshaded to indicate that the user entry was incorrect. (Also, note that the animated character 1530 is not smiling.) In some embodiments, the user interface indicates which portion of the content item the user misspoke, with the computing system having access to such information through the process described by the FIG. 9 flowchart. In these embodiments, the computing system may present the misspoken portion in a different manner than a reminder of the content item (e.g., one of the three letters may be shaded differently to indicate that the user misspoke that one letter).

At box 1442, the computing system stores an indication that the content item was incorrectly input, similar to the operations that the computing system performed at box 740 in the FIG. 7 flowchart. A difference is that the computing system may not only store an indication that the content item was incorrectly spoken, but can also store an indication of the portion of the content item that was incorrectly spoken (e.g., an indication that the first letter in the three-letter content item was incorrectly spoken).

At box 1444, also different from the first interactive exercise, the computing system performs a first correction routine. The first correction routine uses one of the re-direct content items 560 that the administrative user specified in the FIG. 5B user interface to expose the participant to content items that are similar to or the same as the content item that the user misspoke. The first correction routine is described in additional detail with reference to the flowchart shown in FIGS. 16A-B and the user interfaces of FIGS. 17A-D, which are introduced below.

At box 1450, the computing system has completed operations for the task that involving presenting the first content item and analyzing a participant response to that presentation, and the computing system now determines whether the operations of the third interactive exercise should be repeated for another content item (e.g., based on whether time has run out or whether there are other content items through which to cycle). If the third interactive exercise is to finish, the computing system performs the completion routine of box 1460 (described in additional detail with reference to FIG. 10), and then returns to the process flow of interactive exercises illustrated by the flowchart of FIG. 6B.

Figure 16A:
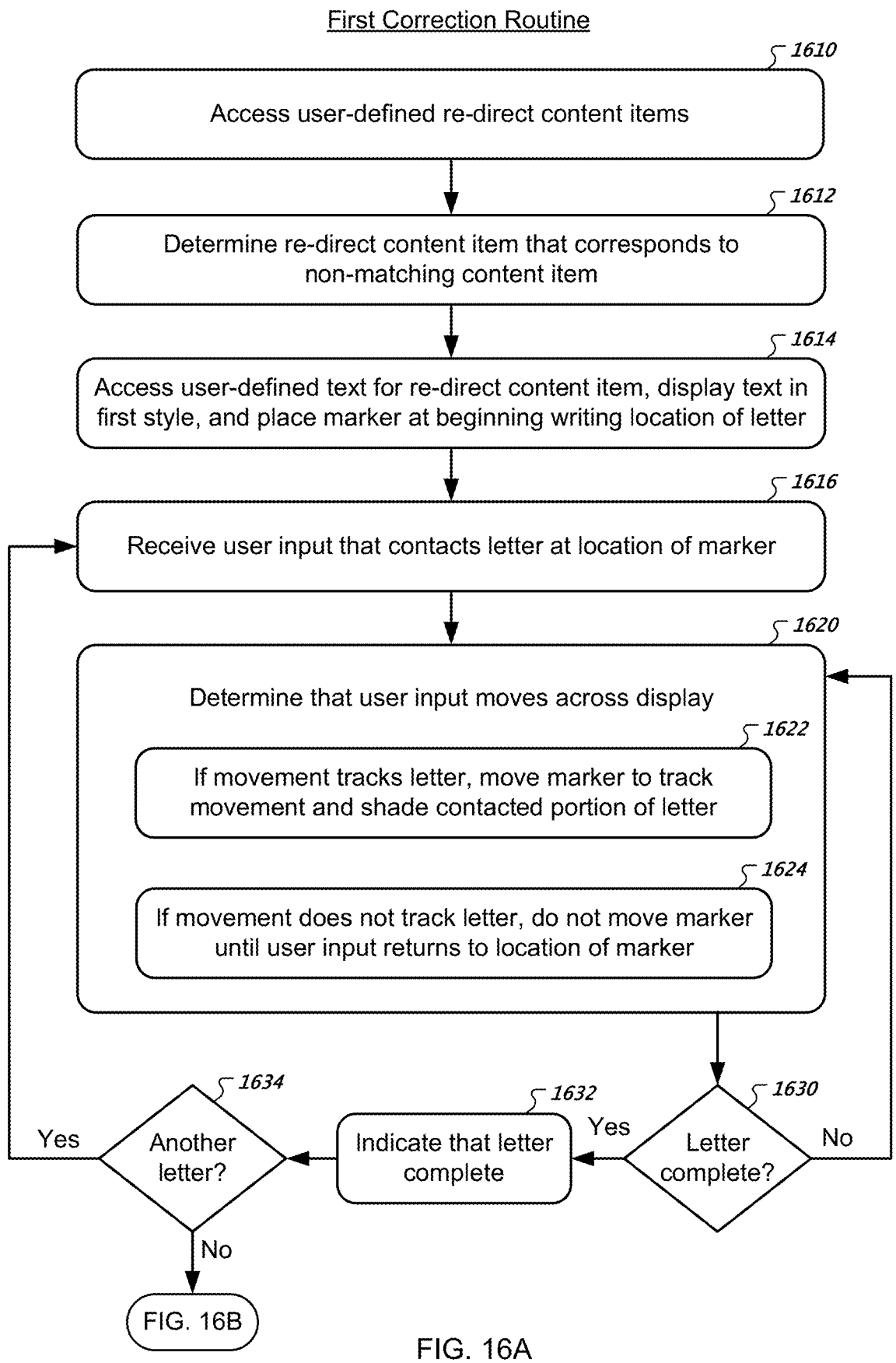
FIGS. 16A-B show a flowchart of a process for performing a first correction routine.
Figure 16B:
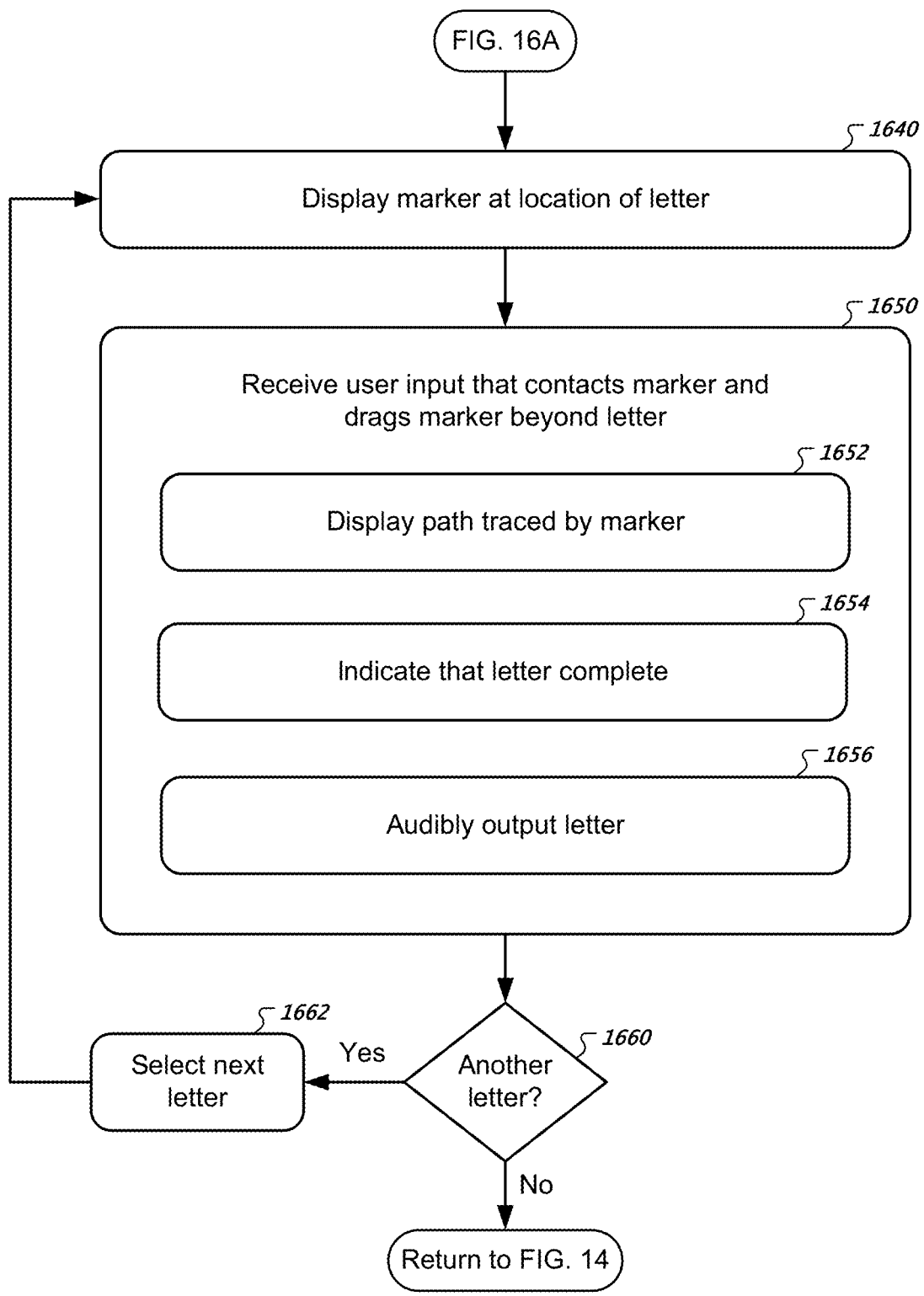

FIGS. 16A-B show a flowchart of a process for performing the first correction routine, while FIGS. 17A-D show user interfaces associated with the first correction routine.

At box 1610, the computing system accesses user-defined re-direct content items. For example, the computing system can access the re-direct content items 560 that an administrative user specified for the correction routines.

At box 1612, the computing system determines one of the re-direct content items that corresponds to the non-matching content item. In this illustration, the participant incorrectly spoke the word "cat" and the computing system identifies one of the re-direct content items that matches the word "cat." In some examples, the computing system identifies which portion of the content item the participant input incorrectly and/or which portion of the content item the participant input correctly, and uses that information to select the re-direct content item. In this illustration, the user spoke "sat" instead of "cat", and the computing system therefore finds another word that ends with the two characters "at" that the participant spoke correctly to engage the participant in additional exercises using content items that are similar to but different from the content with which the participant had difficulty. This illustration assumes that the re-direct content items include a word "mat" and therefore the computing system will select the word "mat."

If the user had stated "cap" instead of "cat," the computing system may have selected a re-direct content item that included the letters "ca" at the beginning of the content item, and therefore may have selected the content item "cab". In some implementations, the computing system simply selects the same word that the user incorrectly input (e.g., the content item "cat" here), which is what is illustrated in this example and in the user interfaces of FIGS. 17A-B.

At box 1612, the computing system accesses user-defined text for the re-direct content item, displays text for that content item in a first style, and places a graphical marker at a beginning writing location of a first letter of that text. For example, the computing system may display the user interface of FIG. 17A. That user interface may include a display of the text "cat" due to the administrator having previously entered this text (with the text presented in a first style, such as gray but with the first letter in slightly-darker gray indicating that the first letter is activated for user tracing), and a display of a graphical marker such as star 1710 at a beginning writing location of the "c". The computing system may store, for each letter in the alphabet, information that indicates a satisfactory tracing of that respective letter (e.g., where the graphical star 1710 should be placed on the letter to start a tracing).

At box 1614, the computing system receives user input that contacts the letter at a location of the marker. For example, the computing system may receive an indication that a user has touched a touchscreen at a location at which the touchscreen is presenting the graphical star 1710.

At box 1620, the computing system determines that the user input moves across the display. For example, the computing system may determine that the user contact with the touchscreen remains in contact with the touchscreen after having touched the graphical start 1710, and has moved across the touchscreen without the user contact lifting from the touchscreen.

Figure 17A:
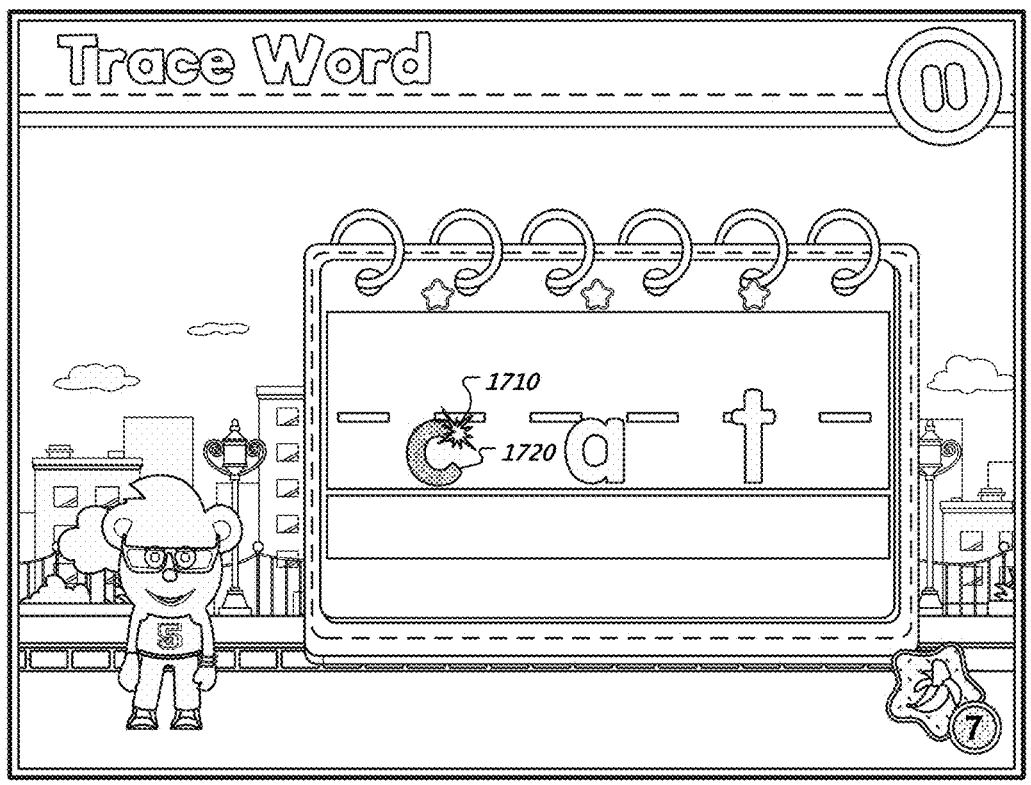
FIG. 17A-D show user interfaces for performing the first correction routine.
Figure 17B:
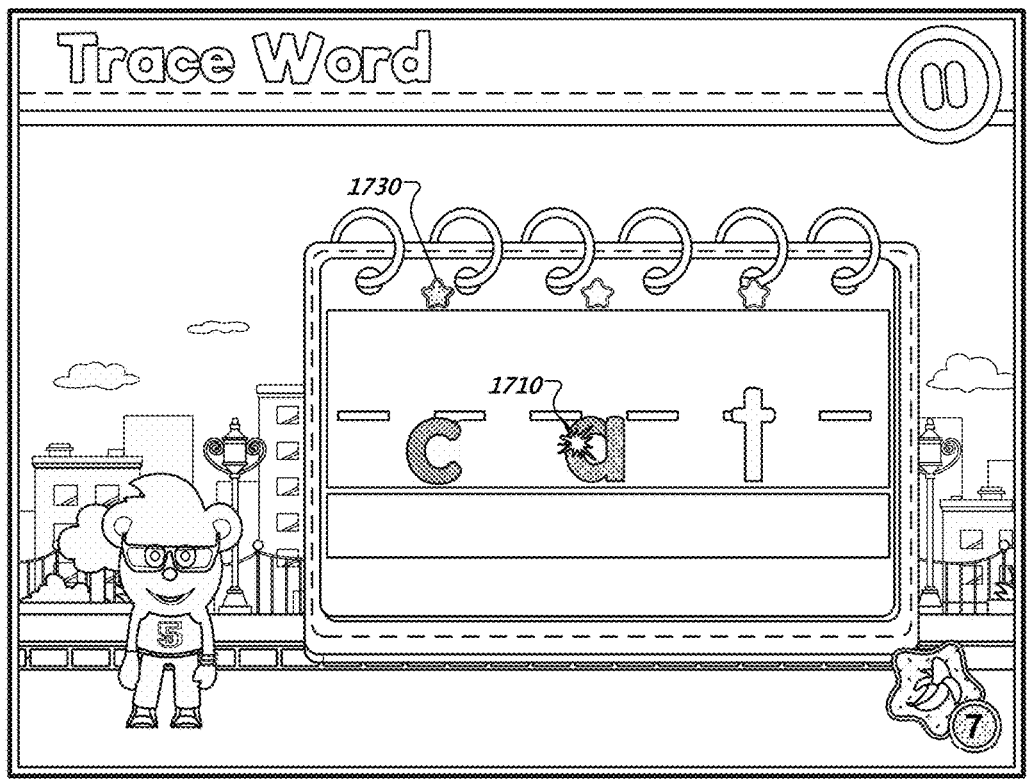
Figure 17C:
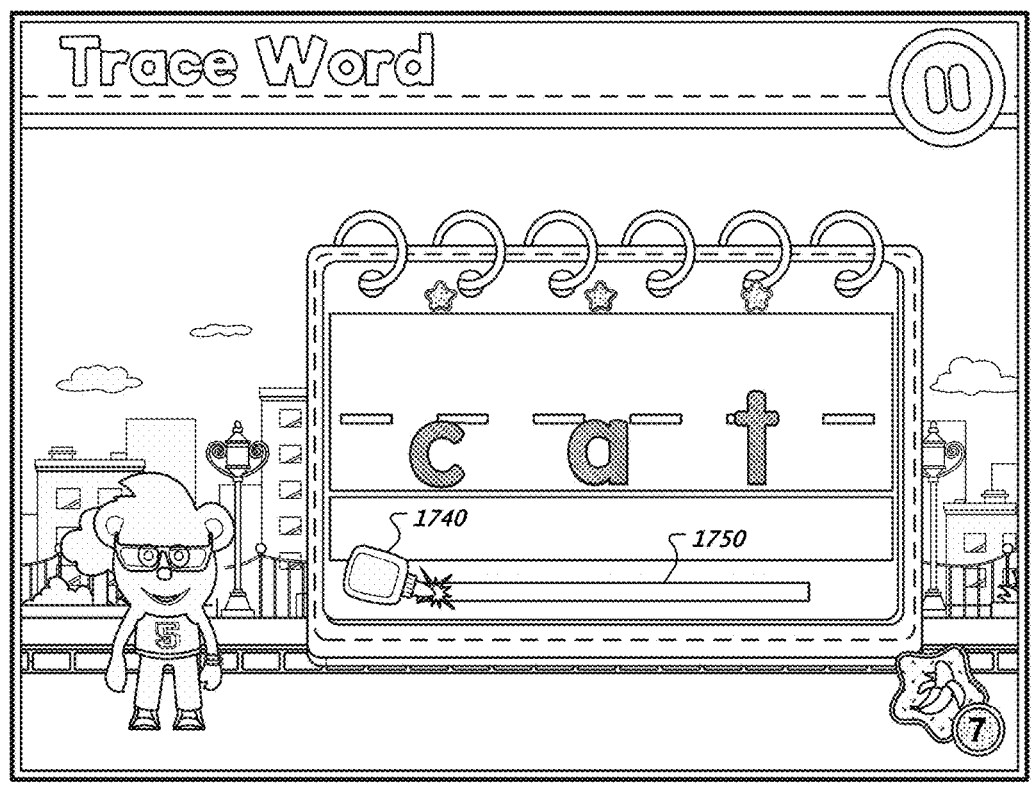
Figure 17D:
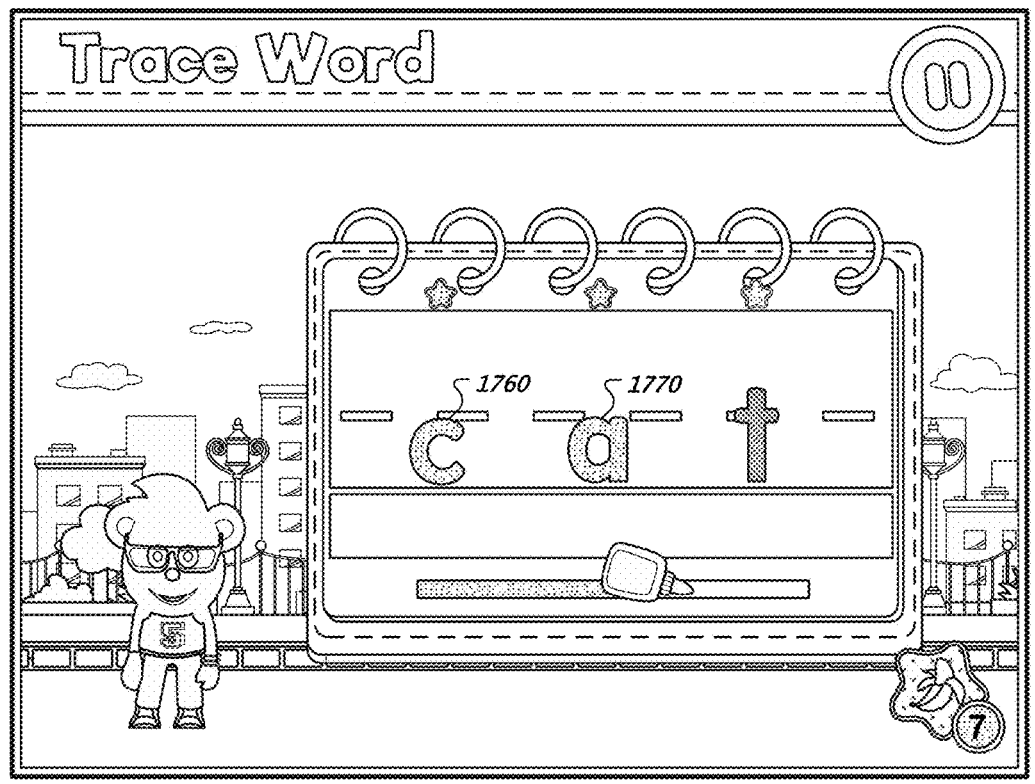
Figure 18A:
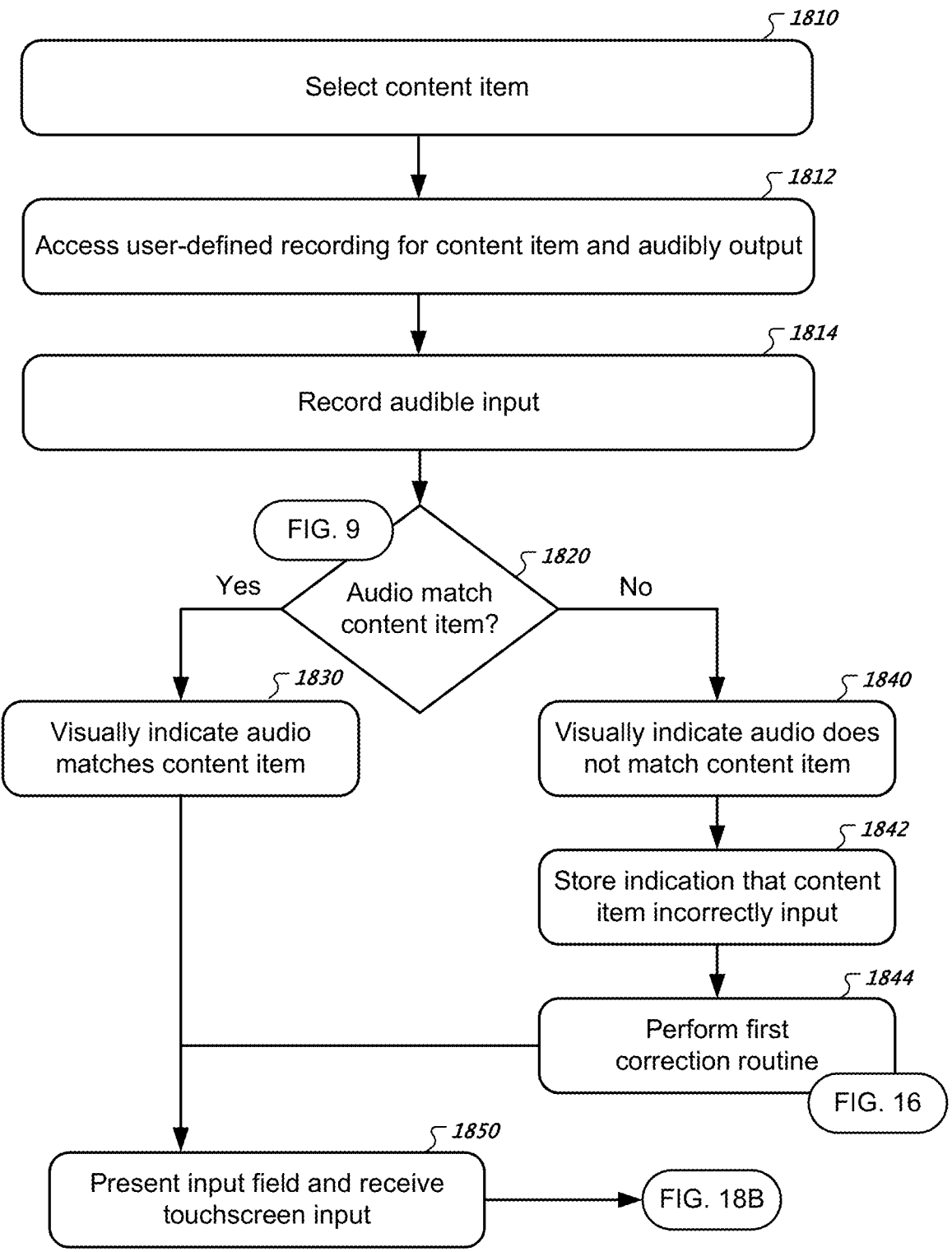
FIGS. 18A-B show a flowchart of a process for performing a fourth interactive exercise.
Figure 18B:
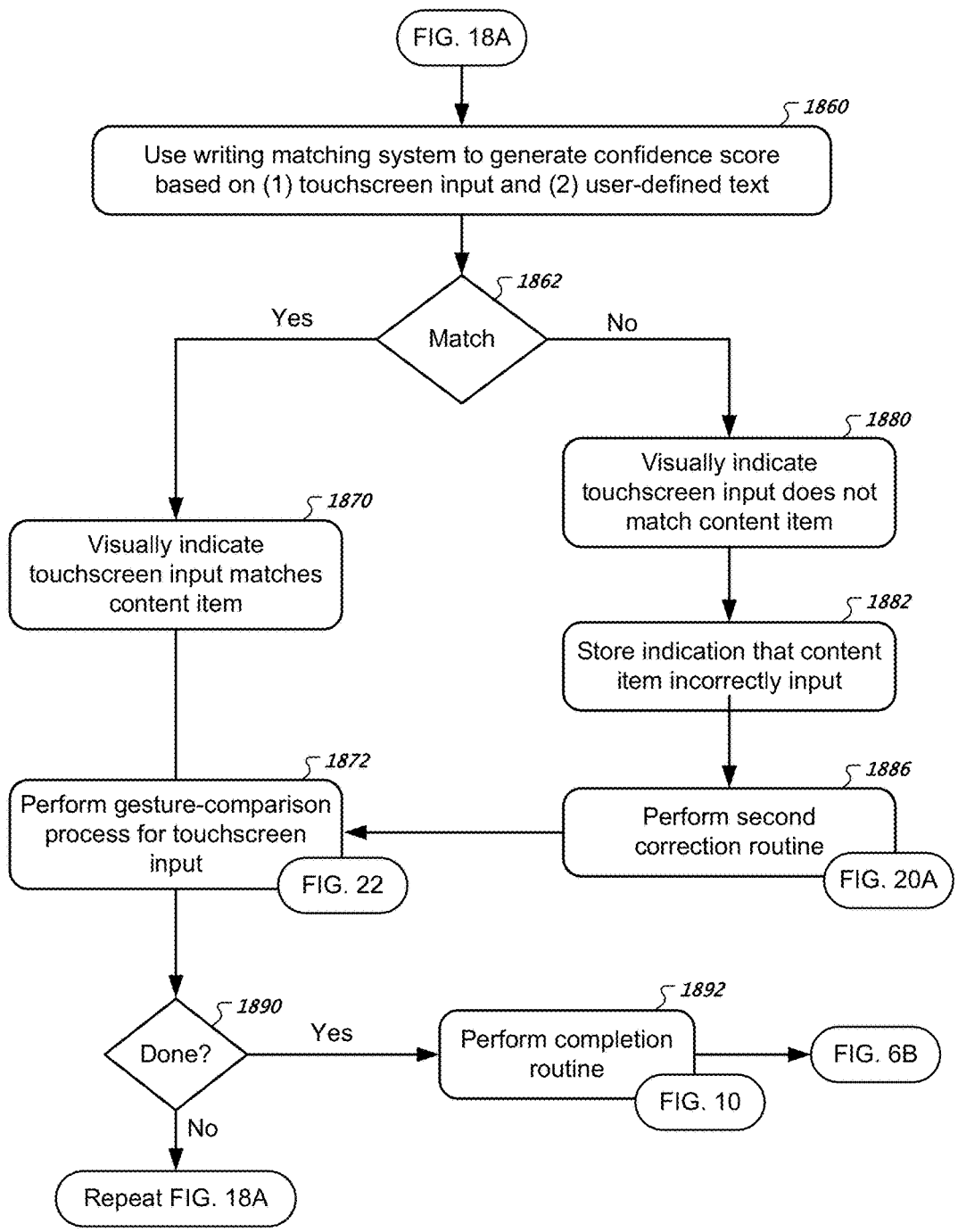

At box 1622, the computing system determines that the user movement tracks the displayed letter, and in response moves the marker to track the user movement and shades the contacted portion of the letter. For example, the computing system may determine that the user contact traced part way around the "c" and therefore the computing system may move the graphical star 1710 to correspond to the movement of the user contact and follow the tracing a portion of the way around the "c." The computing system may change a shading of the traced portion of the character, as FIG. 17B illustrates with a traced portion of the character "a" being shaded differently than an untraced portion of the character "a".

At box 1624, the computing system determines that the movement does not track the displayed letter, and in response the computing system does not move the marker until user input returns to the location of the marker. For example, if the user had touched the graphical star at the top of the "c" and dragged upward rather than around the letter, the computing system would not have moved the marker from the location at the top of the "c." The user input may have had to return to contacting the graphical star and begun tracing the letter "c" before the computing system would move the marker and shade the traced portion of the letter.

At box 1630, the computing system determines whether the letter is complete. For example, the computing may repeatedly determine whether the user contact has dragged the marker 1710 to an ending trace location of the letter (e.g., ending location 1720), in which case the computing system would have changed the shading of the entire letter. If the user has not completed tracing the letter, the computing system continues to track whether the user input has moved across the display (box 1620) and either moves the graphical star (box 1622) or does not move the graphical star (box 1624) based on the characteristics of the user movement.

At box 1632, the computing system has determined that the letter is complete, and indicates that the letter is complete. For example, the computing system may change the shading of an interface element 1730 (e.g., a star) above the letter to indicate that the letter has been correctly traced.

At box 1634, the computing system determines whether the content item includes another letter. In this illustration, the content item "cat" includes another letter after the letter "c" and the computing system move the graphical marker to a starting tracing position of the next letter, and repeats the process of boxes 1620 through 1634 for that next letter. In some examples, the letters may have to be traced in order. If all letters have been fully traced, the computing system moves to the operations of box 1640 (FIG. 16B).

At box 1640, the computing system displays another marker at a location of a letter in the content item. This is the first iteration of box 1640, so the marker would be displayed at the location of the first letter. For example, the computing system may present the user interface shown in FIG. 17C, and add the interface element 1740 to the display centered below the location of the first letter in the content item "cat". The interface element 1740 may be located in other locations in which the interface element 1740 is closer to the first letter in "cat" than any other letter in "cat" (e.g., above the first letter or touching the first letter). The interface element 1740, in this illustration, is a glue bottle, and the computing system outputs the audio "Glue it together!" to prompt the user to contact the glue bottle and drag it rightward across the touchscreen. In this illustration, the computing system also adds the line 1650 to the display to indicate a direction in which to move the glue bottle.

At box 1650, the computing system receives user input that contacts the marker and drags the marker beyond the letter. For example, the computing system may determine that user input contacted the touchscreen of the interface element 1740 and dragged the interface element 1740 rightward past a location of the letter "c" to a location of the letter "a".

At box 1652, the computing system displays a path traced by the marker. For example, the computing system shades a portion of the line 1750 to the left of the interface element 1740 to indicate the portion of the line 1750 that has been traced.

At box 1654, the computing system indicates that the letter is complete. For example the computing system may change a shading of the letters "c" and "a" as the user drags the marker 1740 past those letters.

At box 1656, the computing system audibly outputs the letter. For example, as the user drags past each letter in the content item "cat," the computing system may output an audio representation of that portion of the content item. For example, the computing system may play an audio recording of the content item "cat" in pieces, playing "c" as the user drags past the "c", and then playing "a" as the user drags past the "a."

To be able to match portions of an audio recording of the content item "cat" to the position of the user dragging, the computing system may identify the different portions of the recording of the content item that correspond to the different letters, using the process described with respect to box 910 of the FIG. 9 flowchart. The computing system can match the each segment of the segmented audio to the different text letters being presented on the display, and therefore play/pause the audio recording of the content item to correspond to the speed of the user input that "glues it together." In some implementations, the computing system alternatively or additionally records audio of the user speaking the content item as the user "glues it together," and provides an indication regarding whether the user correctly spoke the content item as a whole and/or each portion of the content item.

With the third interactive exercise complete, the computing system returns to the main process flow of interactive exercises illustrated by the flowchart of FIG. 6B, and at box 656 moves onto the fourth interactive exercise, which presents text for a multi-character content item, prompts the participant to speak the content item, and then prompts the participant to write the content item. The fourth interactive exercise is described in additional detail with respect to the flowchart of FIGS. 18A-B and the user interfaces of FIGS. 19A-B, to which this description now turns.

The operations of boxes 1810 through 1844 represent a first portion of the fourth interactive exercise. The operations in this first portion of the fourth interactive exercise are similar to those performed with respect to the third interactive exercise and boxes 1410 through 1444 of the FIG. 14 flowchart, with the computing system displaying text for a content item, prompting a user to speak the content item, and then providing feedback regarding whether the user correctly spoke the content item. The computing system may, during the audio playing of the content item and the recording of the user response, display the user interface that is presented in FIG. 19A.

As discussed below, the second portion of the fourth interactive exercise involves writing the content item. Before discussing the writing portion of the fourth interactive exercise, however, this disclosure will discuss some alternatives to this first portion of the interactive exercise. For example, the computing system may not perform the first correction routine described with respect to box 1844 if a participant misspeaks a content item, as is the case with the third interactive exercise. Also, an alternative implementation involves the computing system selecting the content item and playing an audio recording of the content item (boxes 1810 and 1812), but then skipping to box 1850 and the writing portion of the interactive exercise, without recording audible input and analyzing the audible input (boxes 1814 through 1844). In other words, the computing system may only perform the second portion of the fourth interactive exercise.

Figure 19A:
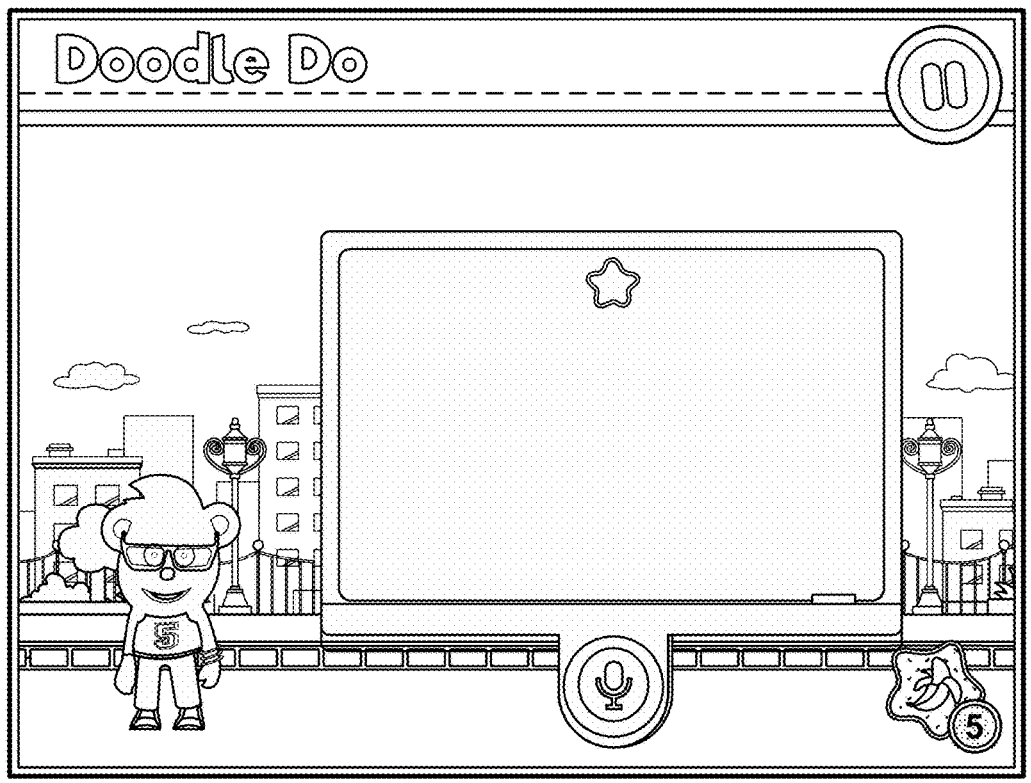
FIG. 19A-B show user interfaces for performing the fourth interactive exercise.
Figure 19B:
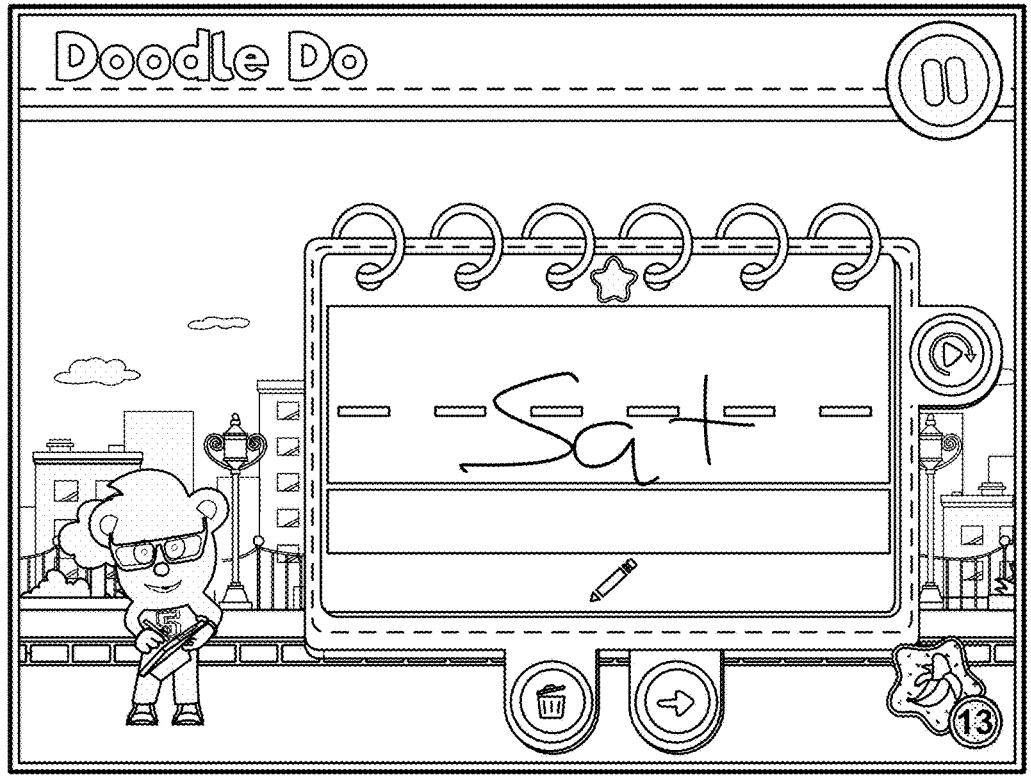

At box 1850, now discussing the second portion of the interactive exercise, the computing system presents an input field and receives touchscreen input. For example, the computing system may present the user interface that is shown in FIG. 19B and receive user input that writes the word "sat" on the screen.

At box 1860, the computing system uses a writing matching system to generate a confidence score based on comparing the touchscreen input to user-defined text for the content item. For example, the computing system may perform the operations previously described with respect to box 1216 of the FIG. 12 flowchart to determine whether the touchscreen input matches the content item, for example, returning a confidence score indicating a likelihood of a match between the written content and the content item that the participant user was prompted to write. The writing matching system can return a confidence score for each letter that the user wrote, indicating which one or more letters the user wrote incorrectly and which one or more letters the user wrote correctly. The writing matching system can also indicate if there are other unsatisfactory characteristics of the user input, as described with respect to the FIG. 12 flowchart At box 1862, the computing system determines whether the written input matches the content item, for example, by determining whether the confidence score exceeds a threshold value.

At box 1870, responsive to determining that the touchscreen input matches the content item, the computing system visually indicates that the touchscreen input matches the content item. The computing system may do this by replacing the written content illustrated in FIG. 19B with a text representation of the content, similar to that shown in FIG. 13C, but with the star at the top of the display shaded to indicate a correct match (and the animated character 1350 smiling).

At box 1880, responsive to determining that the touchscreen input does not match the content item, the computing system visually indicates that the touchscreen input does not match the content item. For example, the computing system may replace the written content illustrated in FIG. 19B with a text representation of the content, similar to that shown in FIG. 13C, but in this "negative result" scenario, to indicate that the result was not correct, the star at the top of the display may not be shaded, the animated character 1350 may not smile, and the computing system may highlight one or more letters that the computing system determined the participant to incorrectly input.

At box 1882, the computing system can store an indication that the participant incorrectly input the content item. For example, the server system 120 may store information identifying the content item, the fourth exercise, and which one or more letters the user wrote incorrectly in the content and metrics data store 120.

At box 1886, the computing system performs a second correction routine, which engages the participant in additional actions to expose the participant to the content item that the participant incorrectly wrote, or similar content items. The operations of the second correction routine are discussed below with respect to FIG. 20A, but this disclosure first describes the last few boxes of the flowchart of FIGS. 18A-B.

At box 1872, regardless whether the user correctly or incorrectly wrote the content item, the computing system performs a gesture-comparison process on the touchscreen input. This process analyzes how the user wrote the content item, rather than just whether the written input ultimately matched the content item, which was a focus of box 1860. The operations of this gesture-comparison process are described below with respect to FIG. 22, but this disclosure first describes the last few boxes of the flowchart of FIG. 18A-B.

At box 1890, the computing system determines whether the fourth interactive exercise is complete. As discussed with the other interactive exercises, the interactive exercise may be complete when the allocated time has completed or the system has cycled through all the content items specified by the administrator for the interactive exercise. If the interactive exercise is not complete, the system returns to box 1810 to repeat the operations of the FIG. 18A-B flowchart for a next content item. If the interactive exercise is complete, the system performs the operations of box 1892 to perform the completion routine (described with reference to FIG. 10), and then returns to the main interactive exercise process flow of FIG. 6B.

Figure 20A:
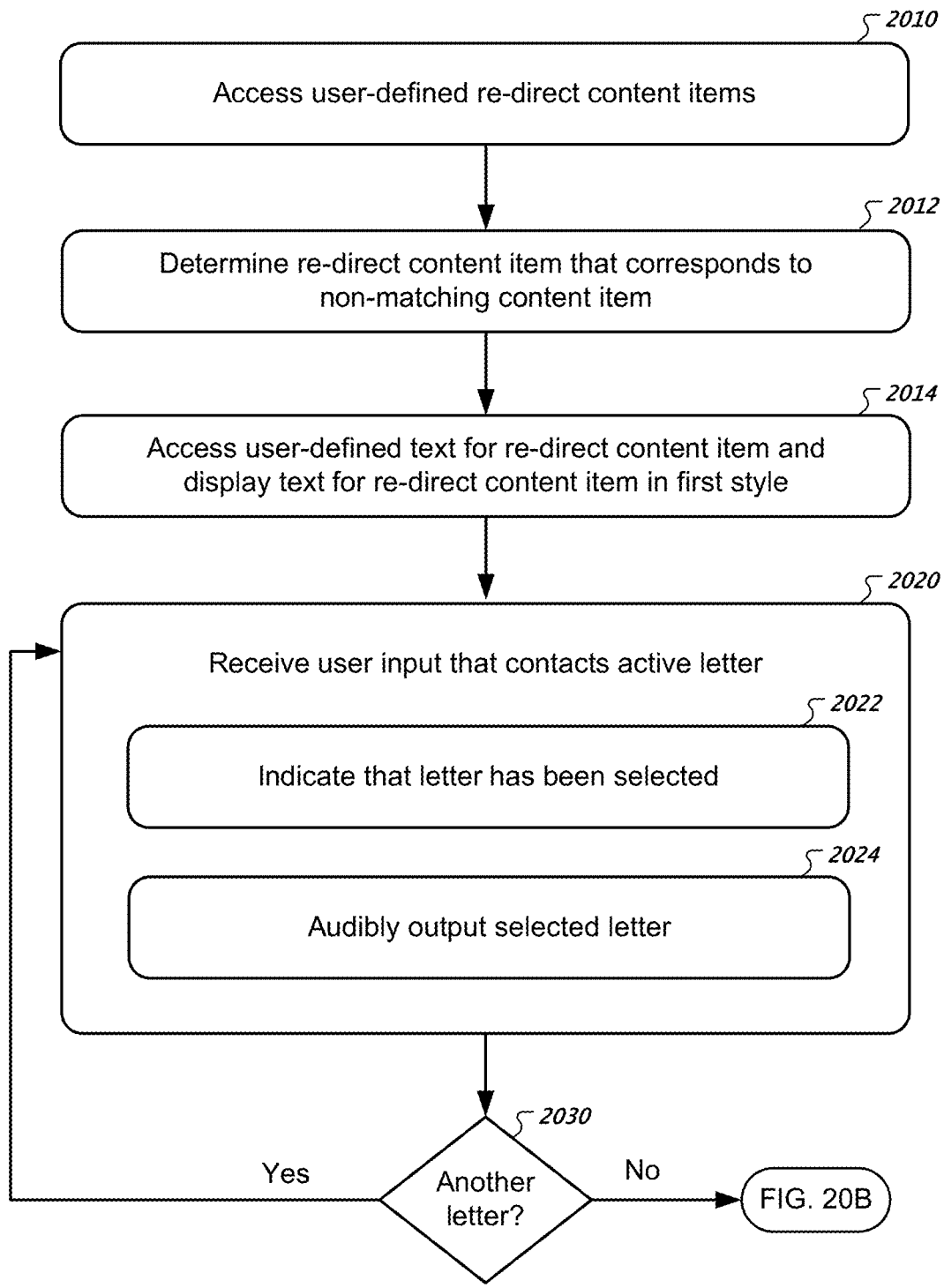
FIGS. 20A-B show a flowchart of a process for performing a second correction routine.
Figure 20B:
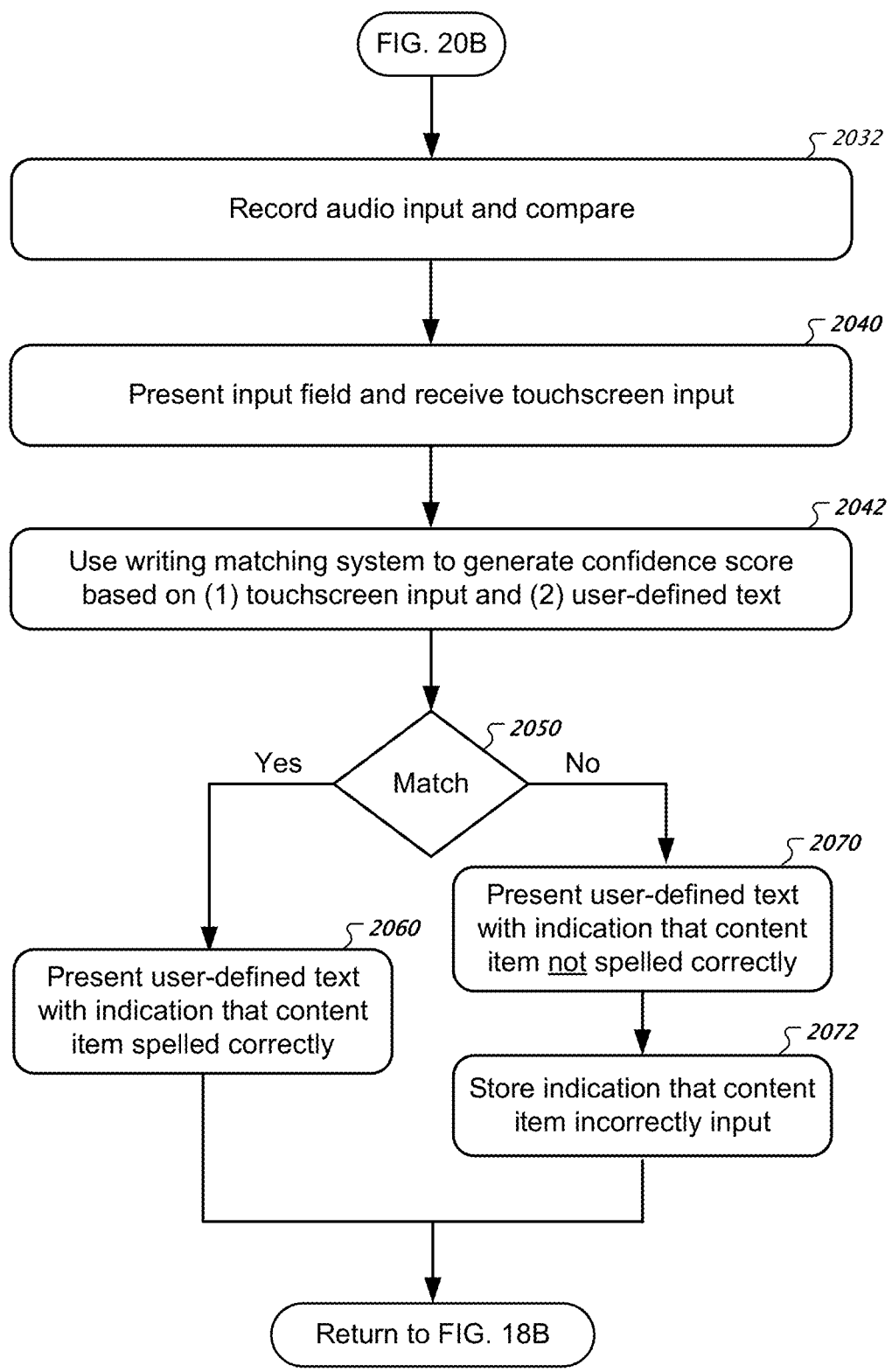

This description turns now to the flowchart of FIGS. 20A-B and the user interfaces of 21A-F, which describe the second correction routine, which the computing system requests at box 1844 when a participant incorrectly writes a content item, and which exposes a participant to the same or similar content items.

At box 2010, the computing system accesses the user-defined re-direct content items. For example, the computing system can access the re-direct content items 560 shown in the FIG. 5B user interface, as specified by an administrator during a process for defining the interactive session. This collection of re-direct content items may be the same as that from which the first correction routine of FIGS. 16A-B pulls.

At box 2012, the computing system determines a re-direct content item that corresponds to the non-matching content item. Similar to the operations of box 1612 in the FIG. 16A flowchart, the computing system may have identified which one or more letters the participant incorrectly wrote and which one or more letters the participant correctly wrote. The computing system may search through the collection of re-direct content items 560 to identify a content item that includes the same letters in the same position that the user correctly wrote, for example, identifying a word that is similar to the word that the participant spelled incorrectly but that swaps out the one or more letters that the user misspelled with different one or more letters. If the system does not find such a word within the collection of content items 560, the computing system may pick a word that includes as many similar characters as possible, or selects the content item that the participant incorrectly wrote. Alternatively, the system does not select one of the re-direct content items 560 and simply uses the content item that the participant incorrectly wrote.

At box 2014, the computing system accesses user-defined text for the re-direct content item and displays text for the re-direct content item in a first style. For example, the server system 130 may access the content and metrics data store 120 to select the text that the administrator defined for the content item when creating or editing the content item via the user interfaces of FIGS. 3A-B. The computing system may then display that text in a first style. The computing system at this point may prompt the user (e.g., by audio or with text) to "Tap to Spell" the letters.

At box 2020, the computing system receives user input that contacts an active letter. For example, the computing system may activate the first letter in FIG. 21A (i.e., the letter "c") by shading that letter in a color or pattern that is different than other of the letters. The computing system may then determine that the user has tapped the activated letter, for example, by determining that user input touched the touchscreen at a location at which the activated letter is displayed.

At box 2022, the computing system may indicate that the user has selected the letter. For example, the computing system may (1) change the shading for that letter, (2) highlight a "star" interface element above the letter, and (3) activate a next letter in the content item by changing the shading of that next letter. Should the computing system receive user input that selects a non-activated letter or a region of the display not associated with the activated letter, the computing system may not perform the above-described operations to indicate that a user has selected a letter.

At box 2024, the computing system may audibly output the selected letter. For example, after the computing system determines that user input has selected the letter "c", the computing system may not only shade that letter, highlight the star above that letter, and activate the next letter, but the computing system may also play a recording of the letter, for example, by playing a recording of the letter "c" with speakers. This recording may be one specific to the letter, and may not be a segmented portion of a recording of the entire word, as may be the case with the "Glue it Together" operations described with respect to boxes 1640 through 1662 of the FIG. 16B flowchart, which describes the first correction routine. Alternatively, the computing system may parse a recording of the entire word into its component portions and output each portion, as described with respect to box 1656 of the FIG. 16B flowchart.

At box 2030, the computing system determines whether the content item includes another letter. For example, if the participant has tapped all letters and the computing system has audibly output all letters, the computing system takes the "negative" path branching off box 2030. If the participant has not selected all letters yet, the computing system takes the "positive" path branching off box 2030 to perform the operations of boxes 2020 through 2030 until the participant has selected every component/letter of the content item.

At box 2032, the computing system prompts the user to speak the content item letter-by-letter, records audio input, and indicates whether the user spoke the content item correctly. For example, the computing system may present the user interface shown in FIG. 21C, and as the user speaks each letter in order, the computing system may change the shading of each respective letter until the user has spoken each letter. This is similar to the above-described "tap each letter to spell," except that it involves speaking each letter. In some implementations, the computing system does not prompt the user to speak each letter one at a time, thereby skipping box 2032.

Figure 21A:
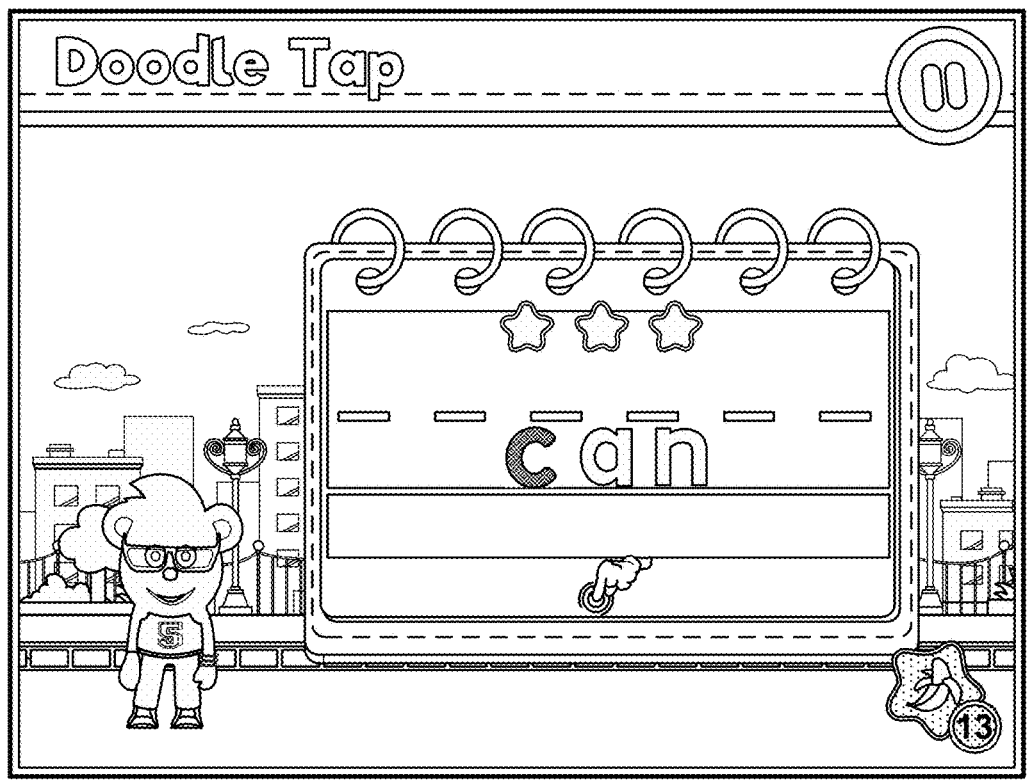
FIGS. 21A-F show user interfaces for performing the second correction routine.
Figure 21B:
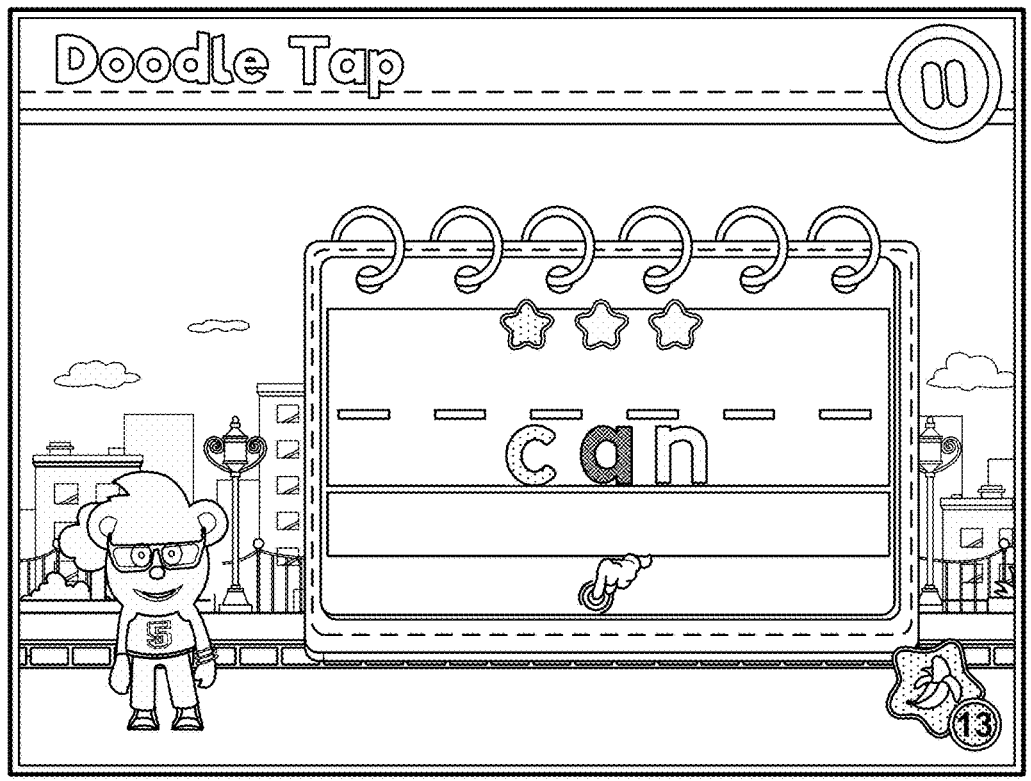
Figure 21C:
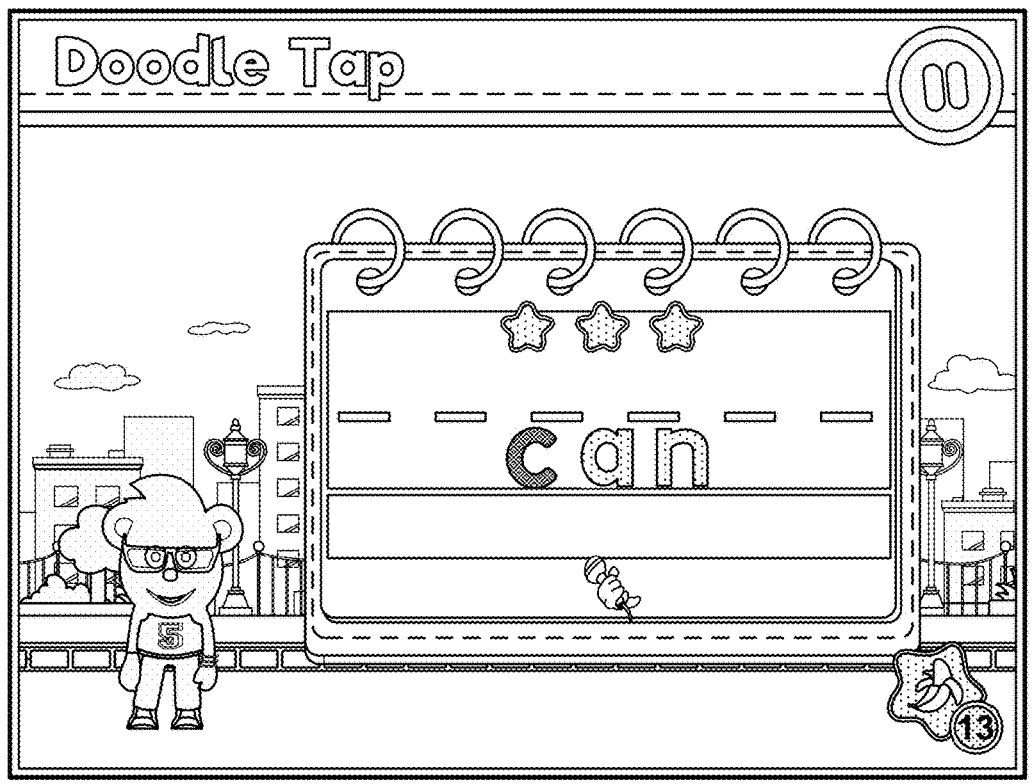
Figure 21D:
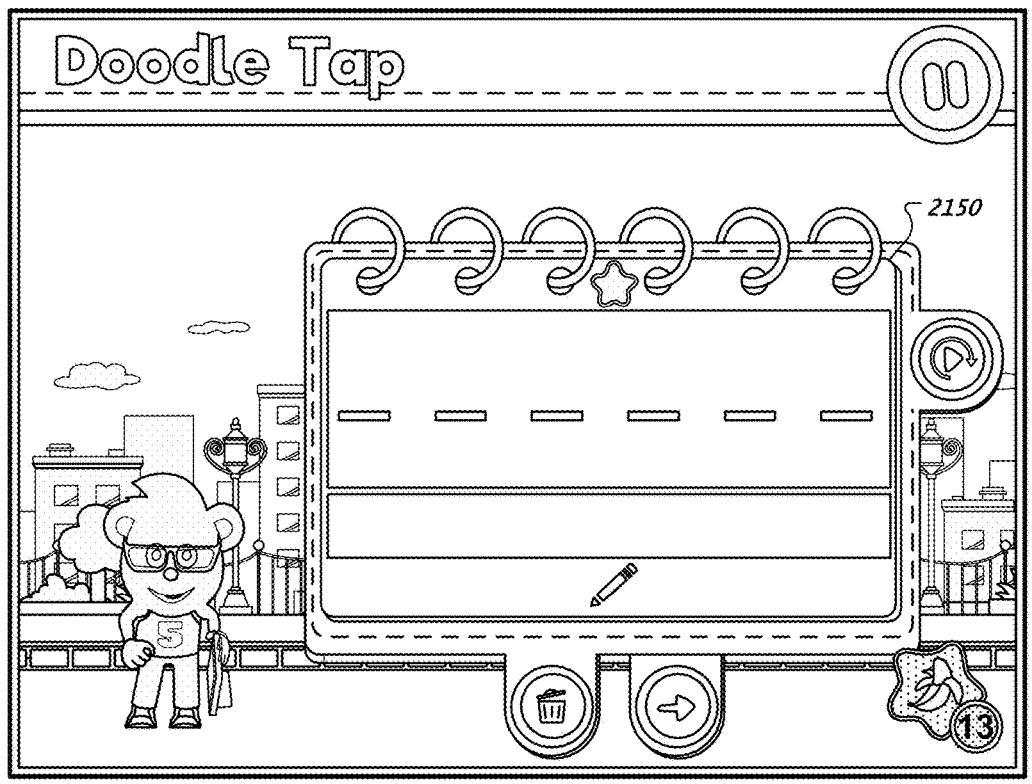
Figure 21E:
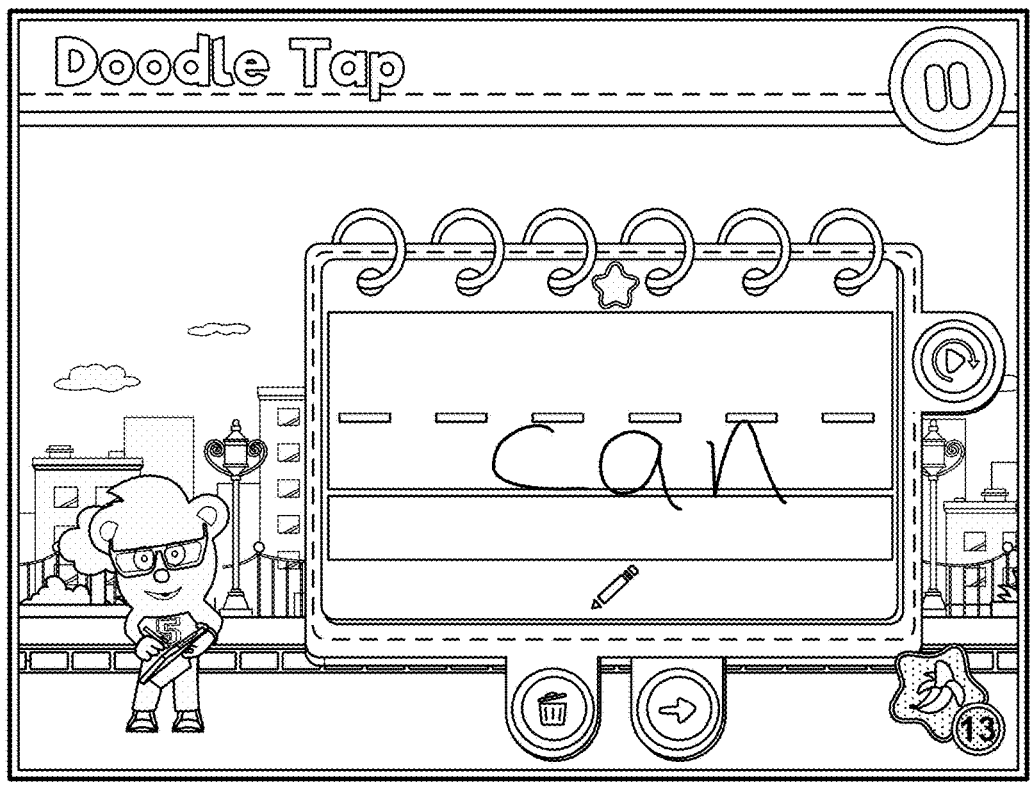

At box 2040, the computing system presents an input field and receives touchscreen input. For example, the computing system may present the user interface that is shown in FIG. 21D. The participant, having familiarized himself or herself with the spelling of the content item, at this point is to write the content item within the input field 2150. FIG. 21E shows the user interface after the computing system has received the handwritten user input and displayed that writing in the input field.

At box 2042, the computing system uses the writing matching system to generate a confidence score based on the touchscreen input and the user-defined text. For example, as described with respect to box 1216 of the FIG. 12 flowchart and box 1860 in the FIG. 18B flowchart, the computing system may send, to a writing matching engine, both the content that was written into the text field (potentially without an animation showing how the input was written in real-time) and the text for the content item, and the writing matching engine may return (1) an overall confidence score for the entire content item, (2) a confidence score for each individual letter of the content item, or (3) both an overall confidence score and a confidence score for each letter.

At box 2050, the computing system determines whether the written input matches the content item, for example, by determining whether the overall confidence score exceeds a threshold value, or whether the confidence score for each letter exceeds a threshold value.

Figure 21F:
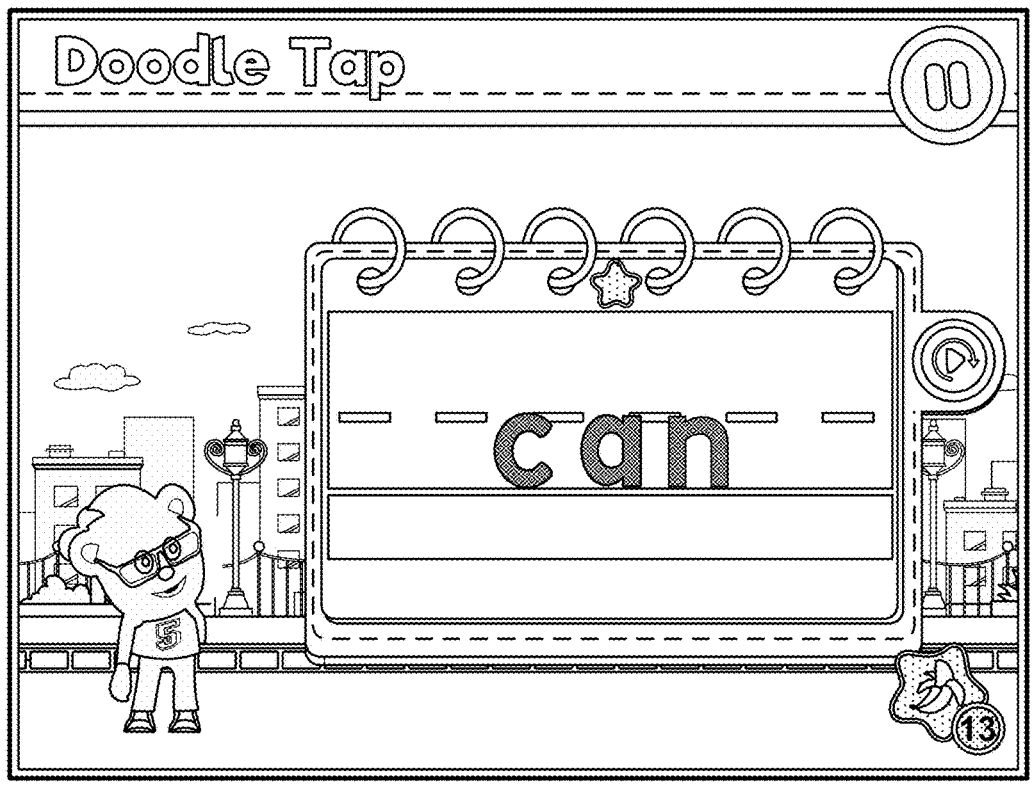

At box 2060, responsive to a "positive" result to the determination of box 2050, the computing system presents the user-defined text with an indication that the content item was spelled correctly. For example, the computing system may replace the user interface that is shown in FIG. 21E (showing the participant-written content item "can") with the user interface that is shown in FIG. 21F (showing machine-generated text for the content item "can", and filling in a star at the top of the input field).

At box 2070, responsive to a "negative" result to the determination of box 2050, the computing system presents the user-defined text with an indication that the content item was not spelled correctly. For example, the computing system may show the user interface of FIG. 21F, but without filling in the star at the top of the input field, which indicates that the content item was not input by the participant correctly.

The above-discussed first correction process (see FIGS. 16A-B) and second correction processes (see FIGS. 20A-B) serve to re-direct a participant if the computing system has determined that the participant provided an unsatisfactory input. The re-direction may occur after a participant has provided an unsatisfactory input one or more times (e.g., three times in some examples), and the re-direction provides the participant additional exposure to content with which the participant is having difficulty, rather than simply moving the student to the next content item in the queue.

In some implementations, the computing system can escalate the participant to different re-direction routines if the participant continues to provide unsatisfactory input.

One example other type of re-direction routine can involve a mindfulness exercise in which the computing system provides the participant with relaxing sounds and/or a relaxing visual environment. Another example re-direction routine can involve a mobility exercise, for example, that described with respect to the completion routine (see FIG. 10). Another example re-direction routine can involve the computing system engaging the participant in reading, writing, and/or speaking exercises involving single-letter content items. As mentioned above the computing system can change the type of re-direction routine provided to a participant if the participant continues to provide unsatisfactory inputs.

Figure 22:
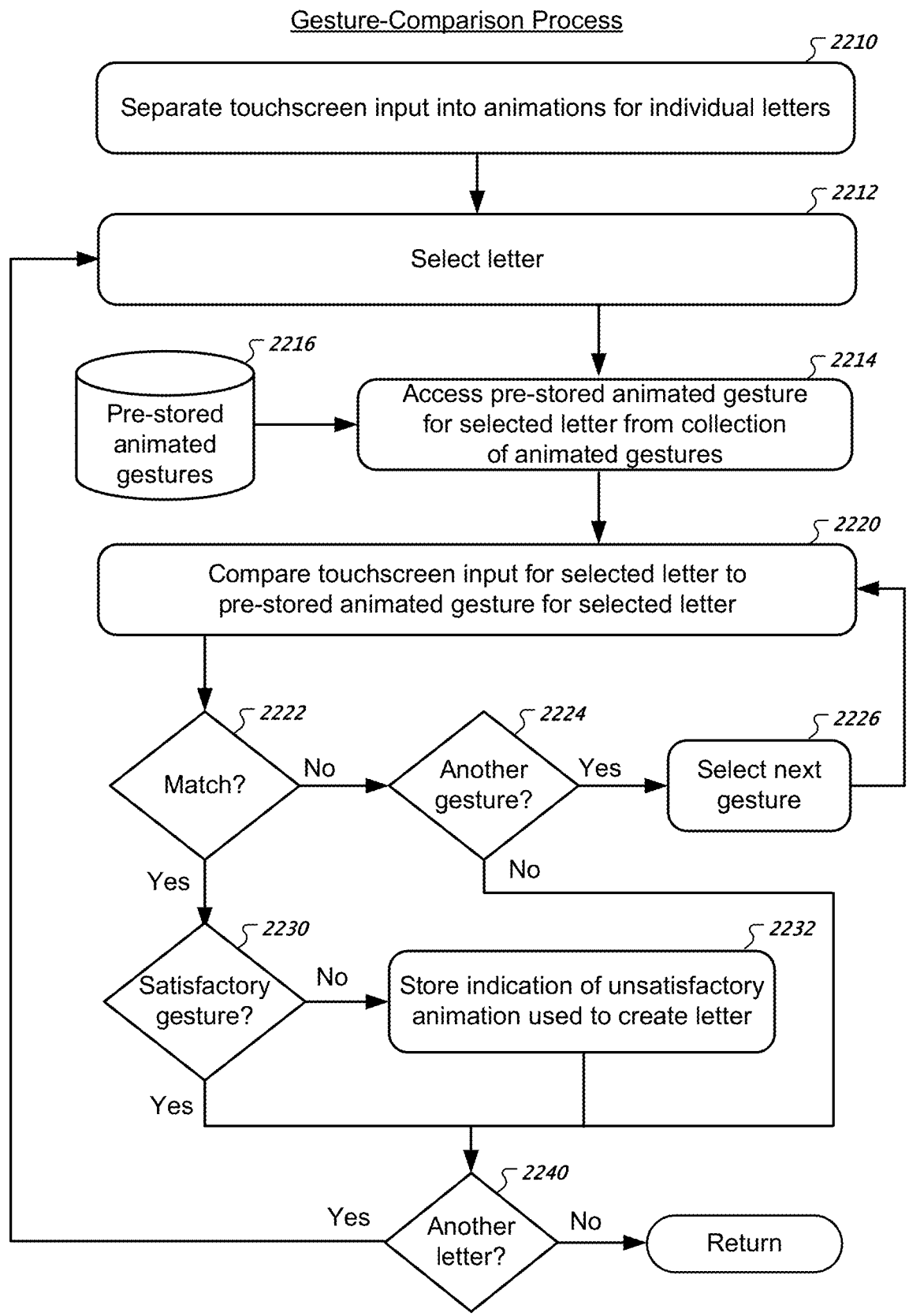
FIG. 22 shows a flowchart of a gesture-comparison process.
Figure 23A:
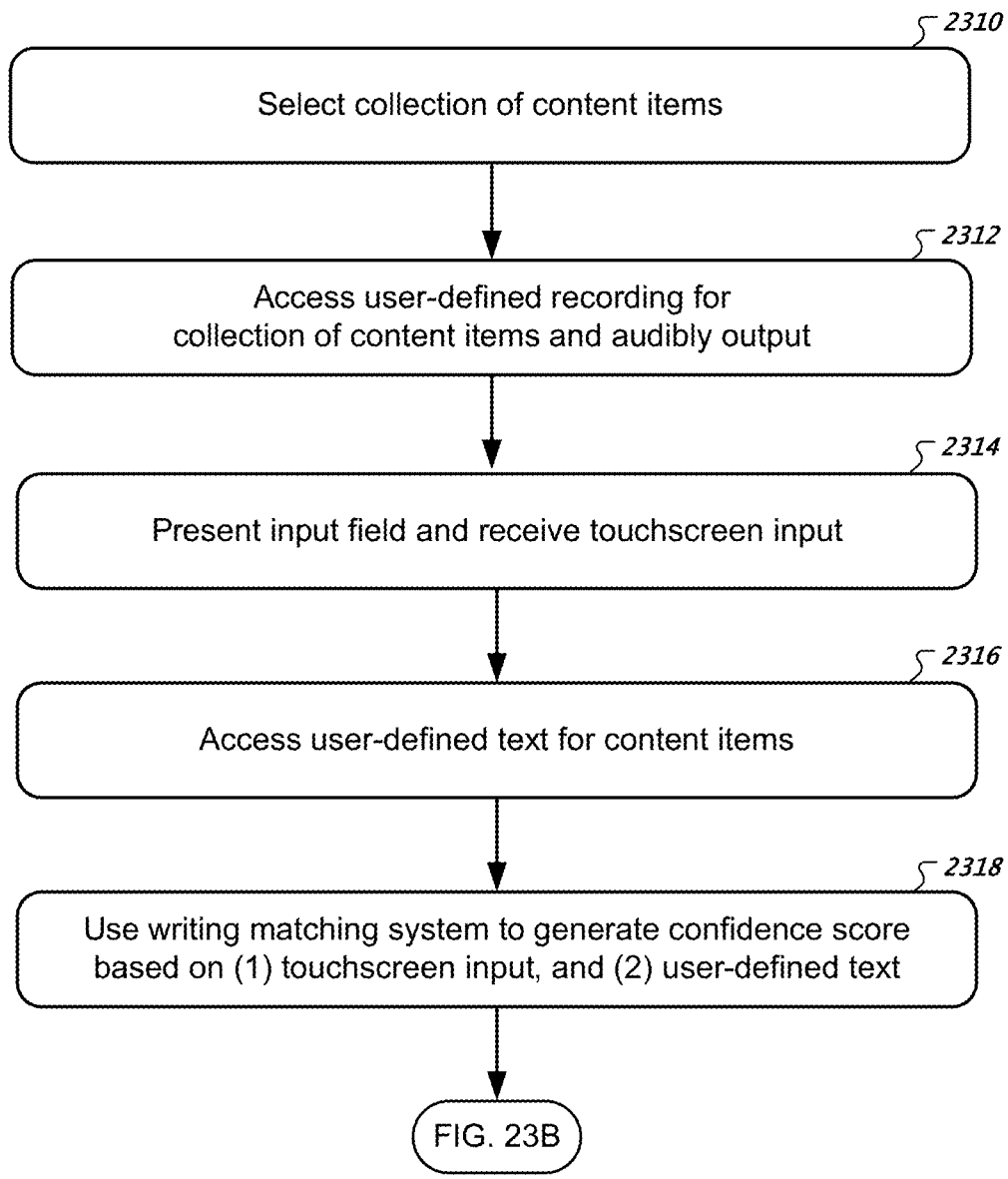
FIGS. 23A-B show a flowchart of a process for performing a fifth interactive exercise.
Figure 23B:
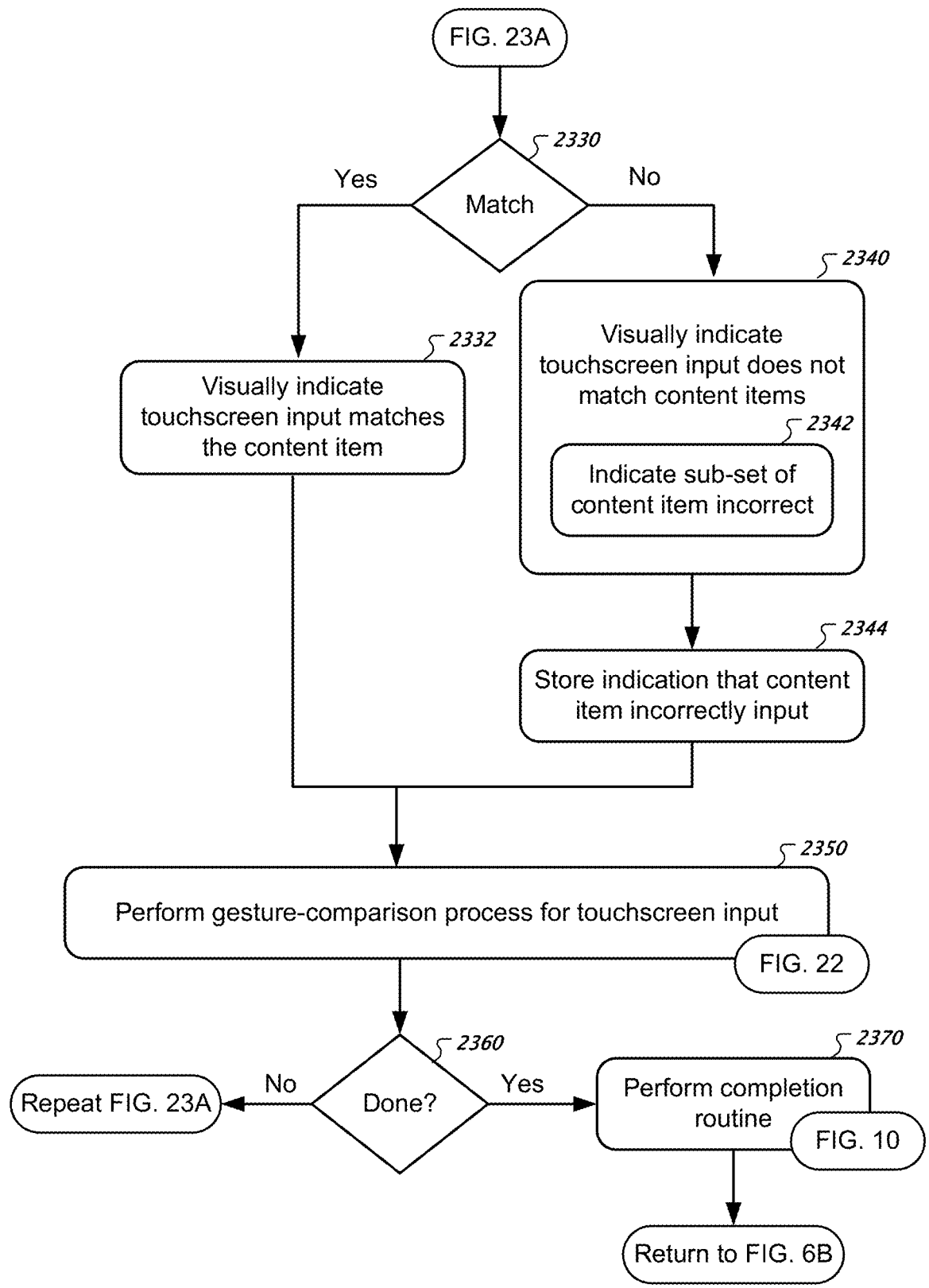

This discussion now turns to a gesture-comparison process, the operations of which are shown in the flowchart of FIG. 22. This process was introduced above during the discussion of the fourth interactive exercise, and is requested at box 1872 in the FIG. 18B flowchart. In some implementations, the gesture-comparison process may be performed after every handwritten participant input, for example, also during the second interactive exercise (see FIG. 12) and during the fifth interactive exercise, as described below.

At box 2210, the computing system separates the touchscreen input into animated gestures for the individual letters. The computing system may initially access an animated gesture that represents the movement of a participant-written input entering multiple characters. As discussed above, the term animated gesture is used for clarity and does not require that the computing system store a video animation of the user input, but rather stores any form of data that indicates the location of the user input at different points in time, in contrast to a static image that simply shows the final result of the user-traced input. A single animated gesture can represent user input lifting from the touchscreen and coming back into contact with the touchscreen and does not require that the user input be a continuous line. The computing system may then run or request that another process identify the portions of the participant-generated animated gesture that correspond to each letter. In some implementations, the separation process creates a separate animated gesture representing each character within the original gesture. In some implementation, the separation process creates pointers that identify the beginning and ending times or locations of each letter in the original animated gesture.

At box 2212, the computing system selects an initial letter. The selected letter may be a text representation of the first letter written by the participant, even if the first-written letter was incorrect. In other words, the accessed information may be an output of the writing matching system 1860, which can generate a textual representation of the user input even if the user input incorrectly writes the first letter.

At box 2214, the computing system accesses a set of pre-stored animated gestures for the selected letter from among a plurality of animated gestures stored for multiple different letters. The set of animated gestures are represented in FIG. 22 by the pre-stored animated gestures graphic 2216, although the set of pre-stored animations may be stored in the content and metrics data store 120 that is illustrated in FIG. 1. The plurality of pre-stored animated gestures may include a set of multiple animations for each letter of the alphabet (e.g., a set of at least two, three, four, or more animated gestures for each of the twenty-six letters in the English alphabet). Data stored with or otherwise associated with the animated gestures may indicate that one animated gesture in each set of animated gestures is designated as a representing a satisfactory technique for drawing the letter represented by the animated gesture (e.g., an animated gesture that starts drawing an "s" at the top of the letter and correctly traces to the end of the letter). The other aminations may represent unsatisfactory processes to draw the letter (e.g., start the "s" at the bottom of the letter, or write the "s" backwards).

At box 2220, the computing system compares the touchscreen input of the selected letter to a pre-stored animated gesture for the selected letter. As an illustration, the computing system may have identified both (1) an animated gesture or a portion of an animated gesture that represents the participant writing a single letter (e.g., excluding writing another letter), and (2) a first, pre-stored animated gesture selected from among the accessed set of pre-stored animated gestures. In this example, the first animated gesture represents a satisfactory technique for writing the letter. The computing system may request that a movement-comparison process compare the animated gesture that represents the user writing the first letter to the selected, first, pre-stored animated gesture that represents writing the first letter.

The movement-comparison process may correlate the times that it takes each of these gestures to form the letter, so that even if the gestures form the letter at different speeds, the techniques can be compared to each other. For example, the computing system may normalize a length of time represented by each animated gesture so that both begin at approximately the same time and end at approximately the same time. This correlation/normalization process can involve scaling the time values of one or both of the animated gestures, or not scaling values but leaving the values in their original form but mapping times from the participant-formed gesture to the pre-stored gesture.

The movement-comparison process may then, after the times of the animated gestures have been correlated, and for each of multiple moments in time (e.g., at 20 evenly-spaced apart times during the formation of the gestures), determine how far a location of the user input for the participant-defined gesture is from a location representing user input for the pre-stored gesture. For example, the computing system may determine, 10% of the way into the formation of each animated gesture, a distance between a single point of current user input in the participant-generated animated gesture and a single point representing user input in the pre-stored animated gesture. The computing system may determine a similarity score for each moment in time based on this distance.

The computing system may aggregate all of the similarity scores generated for the various moments in time to generate a confidence score that indicates a similarity in how the two animated gestures were formed. As such, if a participant started drawing a letter from a bottom of the input field and a pre-stored animation represents user input starting the drawing of the letter from the top of the input field, the confidence score is likely to be low because the locations representing the user inputs will only be near the same portion of a commonly-sized input field in the center of the letter where the animated gestures approximately cross each other. Similarly, if the participant-defined animation was written backwards, the input locations would differ from those of a pre-stored animation that was "written" in a more up-and-down manner (although with a higher confidence score than the example in which the participant-supplied gesture and pre-stored gesture started on different ends of the letter).

In some implementations, the computing system normalizes not only the length of time it takes to perform the participant-created and pre-stored animated gestures, but also a size/scale of the animated gestures. Still, it may be beneficial to determine that a participant is inputting letters larger than expected or smaller than expected, or offset from an expected location. As such, in some implementations, the computing system may not normalize the size/scale of the participant-created and pre-stored animated gestures to be similar in size/scale. In some implementations, the computing system may normalize an offset of the participant-specified animation so that the resulting letter is centered within a region of comparison (assuming that the pre-stored animated gesture is similarity centered within its own, respective region of comparison). The regions of comparison may be the same size.

At box 2222, the computing system determines whether the participant-defined animated gesture matches the pre-stored animated gesture. For example, the computing system may determine whether a threshold score that results from the comparison process of box 2220 exceeds a threshold value.

At box 2230, responsive to a "positive" result of the determination of box 2222, the computing system determines whether the pre-stored animated gesture that matched the participant-defined animated gesture represented a satisfactory technique in which to write the letter, for example, by accessing information stored with the pre-stored animated gesture.

At box 2240, responsive to a "positive" result of the determination of box 2222 (indicating that the matching animated gesture represents a satisfactory way to write the letter), the computing system determines whether the gesture-comparison process of FIG. 22 has another letter to analyze in the content item. If no, the gesture-comparison process is complete and the computing system returns to the process that called the gesture-comparison process. Otherwise, the operations of FIG. 22 repeat for another letter.

At box 2224, responsive to a "negative" result of the determination of Box 2222 (indicating that the participant-defined animated gesture did not match the pre-stored animated gesture), the computing system determines whether the set of pre-stored animated gestures accessed for the selected letter includes one or more additional, animated gestures that have not yet been compared to the participant-defined animated gesture. If not, the computing system moves to box 2240, to determine whether there are additional letters in the content item to analyze.

At box 2226, responsive to a "positive" result of the determination of box 2224 (indicating that there are one or more pre-stored animated gestures still to compare to the participant-defined animated gesture), the computing system selects a next animated gesture from the set of pre-stored animated gestures and returns to box 2220 to perform the comparison process described above for the next animated gesture.

At box 2232, responsive to a "negative" result of the determination of box 2230 (indicating that the process has identified a matching animated gesture, but that the matching animated gesture represents an unsatisfactory mechanism for drawing the letter), the computing system stores an indication of the unsatisfactory animated gesture that was determined to match the participant-defined animated gesture. Storing the indication may include setting a flag or recording a setting that specifies that the participant-defined animated gesture matches a particular method of writing a letter (or incrementing a counter reflecting a number of times that the participant has used a particular technique to write a letter, such as having written five letters backwards).

Example animated gestures in the set of animated gestures can include, for example, (1) an animated gesture that writes the letter on a slant, (2) an animated gesture that is oversized for the space provided, (3) an animated gesture that starts the letter in a different portion of the letter than in the satisfactory animation (e.g., at an opposite side of the letter such as the bottom rather than the top), (4) an animated gesture that writes the letter in the opposite case (e.g., uppercase vs. lowercase), and (5) an animated gesture that writes the letter backwards. The stored indication can specify, instead of or in addition to how the pre-stored animated gesture is different than the participant-defined animation, information that explains a potential reason that the pre-stored animated gesture may be different than the participant-defined animated gesture, such as an indication that a backwards-written letter may suggest "dyslexic tendencies."

In some implementations, the computing system does not determine, at the end of the above-described comparison process between the participant-defined animated gesture and a pre-stored animated gesture, whether the confidence score indicates that the process can terminate. Rather, the computing system may compare the participant-defined animated gesture to every one of the pre-stored animated gestures in the set of pre-stored animated gestures that the computing system accessed for the selected letter. The computing system may then identify which of the pre-stored animated gestures has a highest confidence level among the set, or which of multiple pre-stored animated gestures have particularly high confidence levels (e.g., both a pre-stored animation that represents slanted input and a pre-stored animation that represents oversized input).

Even if multiple pre-stored animated gestures exceed a threshold and/or an unsatisfactory pre-stored animated gesture has a confidence score higher than that for a satisfactory pre-stored animated gesture, the computing system may only flag the unsatisfactory, pre-stored animated gesture as a matching gesture if the confidence score for the satisfactory pre-stored animation fails to satisfy a threshold value. In other words, if the participant-defined animated gesture sufficiently matches a pre-stored animated gesture that is designated as being satisfactory, the computing system may not take into account whether the participant-defined animated gesture also matches some of the unsatisfactory pre-stored animated gestures.

The gesture-comparison process can also provide a convenient time to generate other metrics that involve analysis of the participant-supplied input. For example, the computing system may have received from the writing matching system an indication of the text that the participant-generated input represents. The computing system can then compare the text representation generated by the writing matching system to determine whether the participant-supplied input includes (a) an extra letter inserted, (b) a letter missing, and/or (c) letters ordered incorrectly. If the computing system determines that the participant-supplied input matches any of these conditions, the computing system may store data indicating such. For example, the computing system may store an indication of the content item that the participant was supposed to write, and an indication of what the participant actually wrote. In some implementations, these comparisons do not involve comparing a participant-defined gesture to pre-stored gestures, and rather may simply involve analysis of the final, written representation of the user input and the content item that the participant was prompted to write.

~Now returning to the main interactive session flow of FIG. 6B, the computing system has completed the fourth interactive exercise (Box 656), and moves onto the fifth interactive exercise (Box 658). The fifth interactive exercise is described with reference to the flowchart of FIGS. 23A-B and the user interfaces of FIGS. 24A-B, and involves the computing system outputting a recording of a multi-word content item, receiving user input that writes into an input field, and analyzing the user input to determine if the user input matches the multi-word content item.

At box 2310, the computing system accesses a collection of content items specified by an administrator for the fifth interactive exercise, for example, through previous administrator interaction with field 542e of the FIG. 5B user interface. As mentioned above, each of these content items may represent multiple-words, and may include a capital letter at the beginning of the first word and a punctuation mark at the end of the last word, and therefore the content items may be referred to as sentences.

Figure 24A:
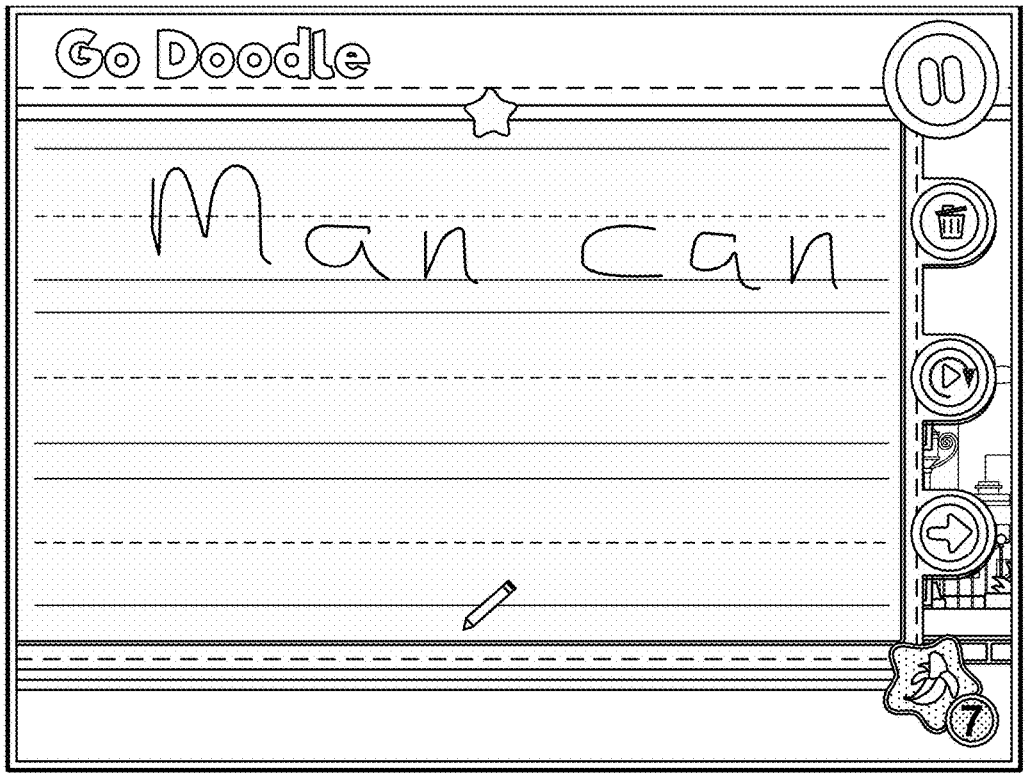
FIGS. 24A-B show user interfaces for performing the fifth interactive exercise.

At boxes 2312, 2314, 2316, and 2318, the computing system accesses a recording of the content item, outputs the recording, receives participant user input that writes into an input field, and uses a writing matching system to compare the participant-defined input to text defined by the administrator when the administrator originally created and defined the content item. FIG. 24A shows an example user interface after a user has written the words "man can" into an input field. These operations are similar to those of boxes 1812, 1850, and 1860 of the FIGS. 18A-B flowchart, which represents the fourth interactive exercise, and will not be described further here to avoid repetition.

At box 2330, the computing system determines whether the participant-written input matches the content item, for example, by determining whether a confidence score generated by the writing matching system of box 2318 exceeds a threshold value.

At box 2332, responsive to a "positive" result of the determination of box 2330 (indicating that the administrative-written input matches the content item), the computing system visually indicates that the touchscreen input matches the content item.

At box 2340, responsive to a "negative" result of the determination of box 2330 (indicating that the participant-written input does not match the content item), the computing system visually indicates that the touchscreen input does not match the content item. For example, the user interface of FIG. 24B may not shade the star 2450 at the top of the user interface, to indicate to the participant that the written input did not match the content item that the computing system audibly output.

Figure 24B:
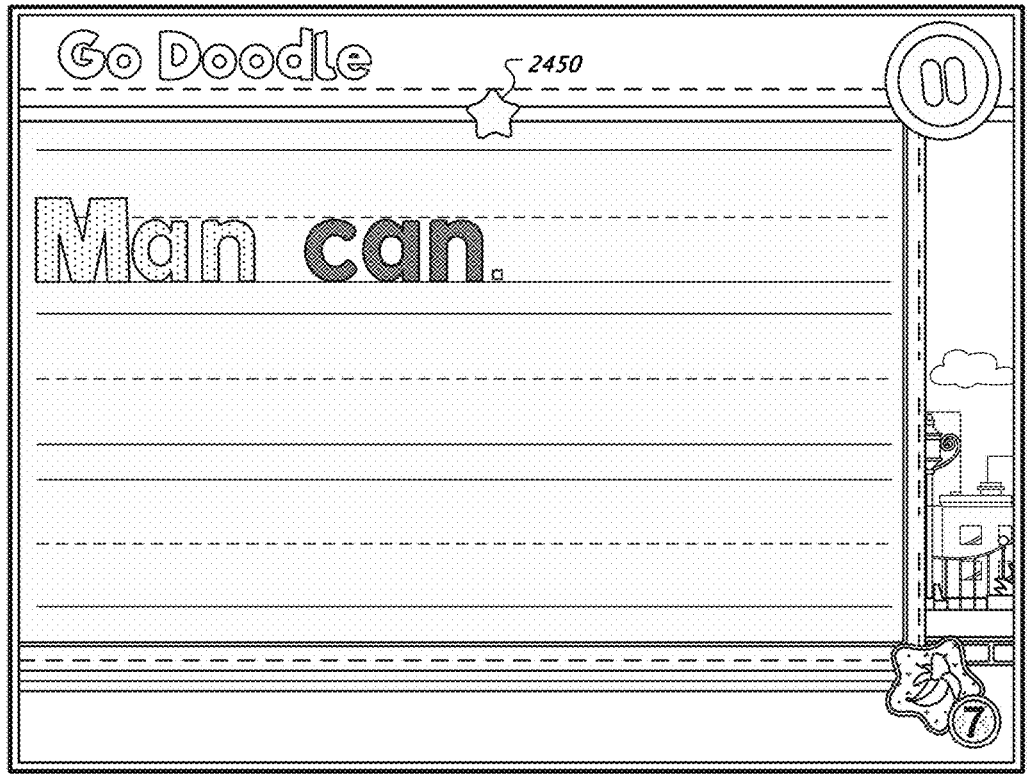
Figure 25:
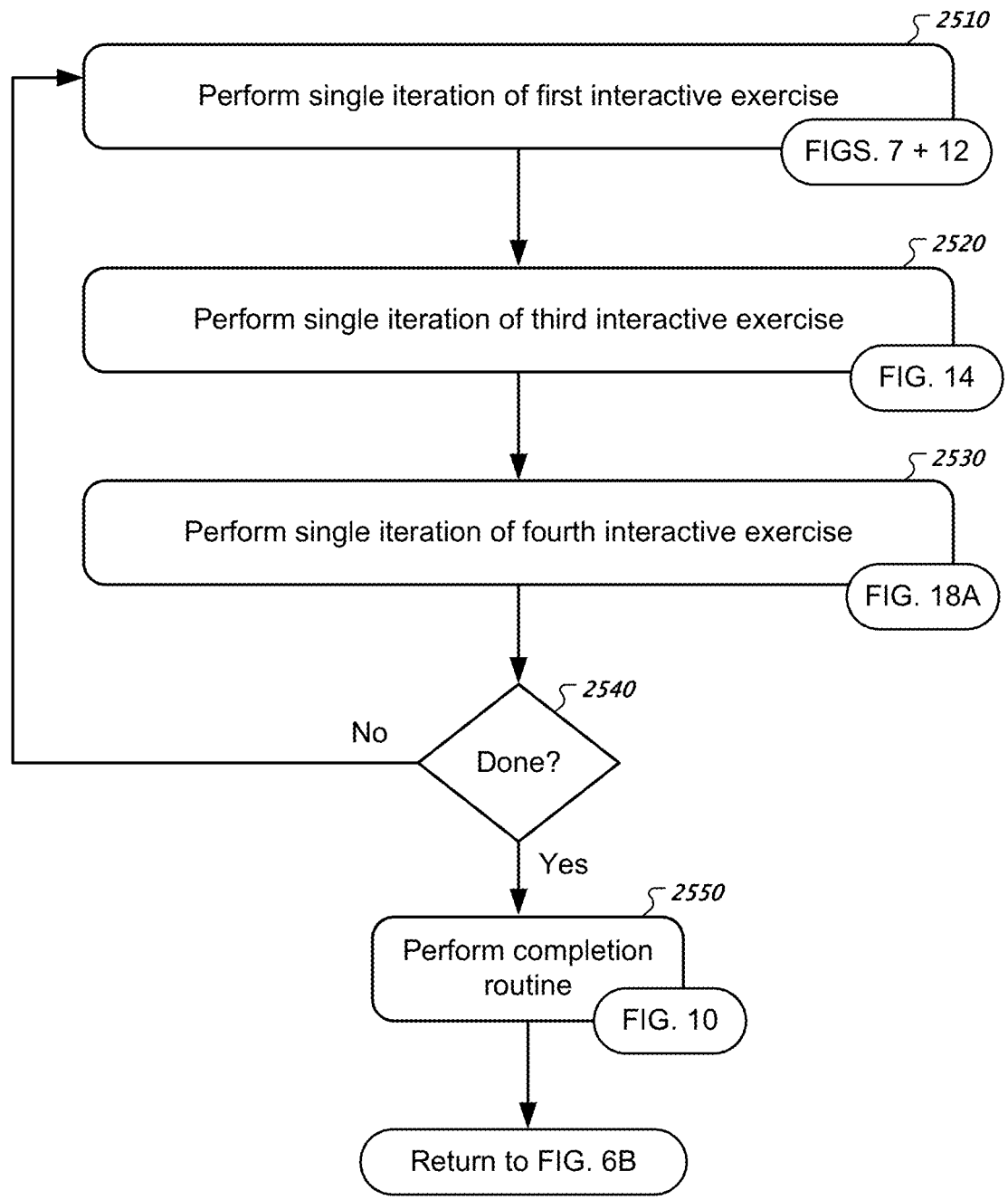
FIG. 25 shows a flowchart of a process for performing a sixth interactive exercise.
Figure 26:
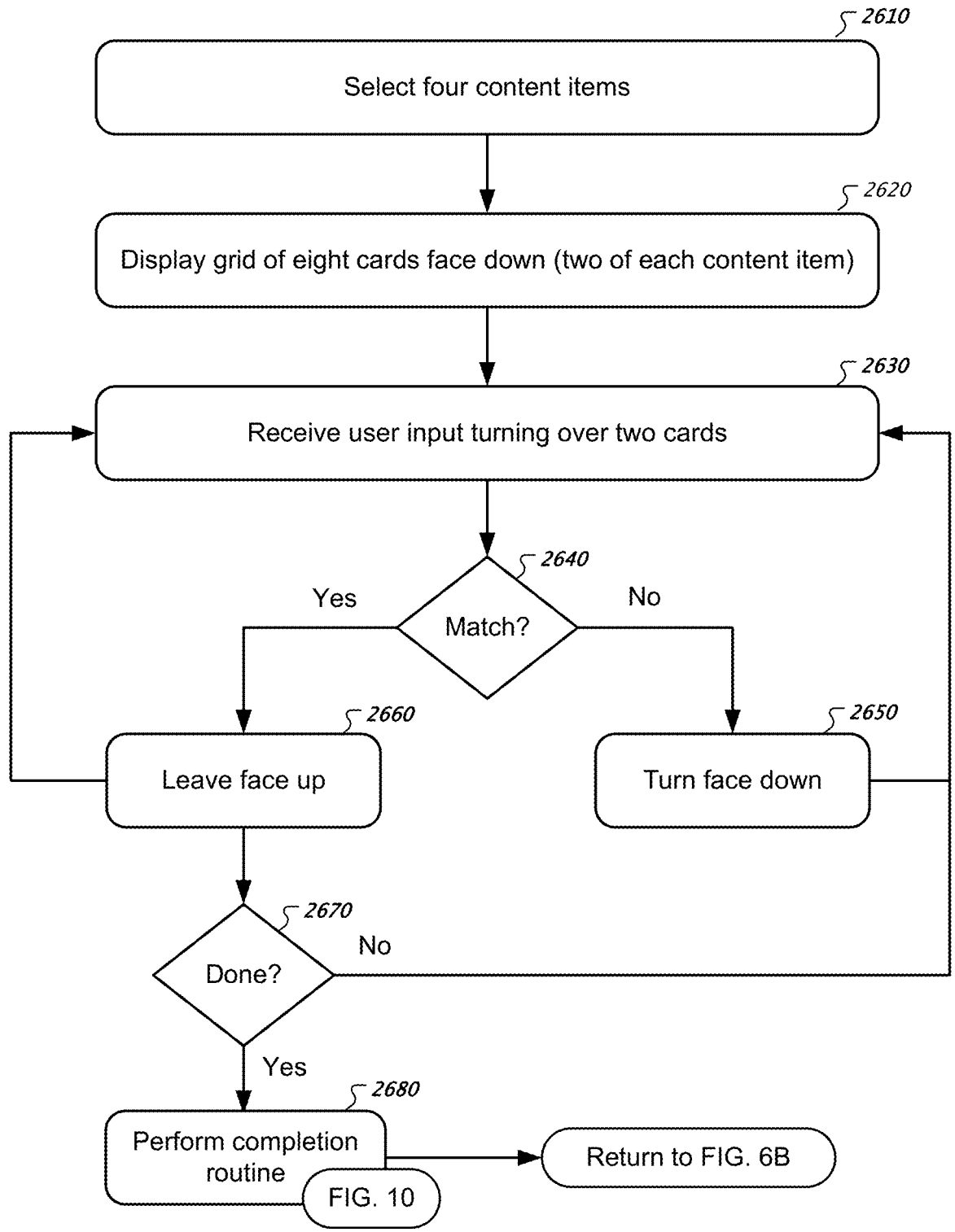
FIG. 26 shows a flowchart of a process for performing a seventh interactive exercise.

At box 2342, the computing system may indicate that a sub-set of the content item is incorrect. As an illustration, the content item may have been the sentence ("Man can.") and the participant-written input may have been determined to be the phrase ("Man can"), but without the period at the end. The writing matching system of box 2318 may have returned a confidence score for each letter/portion of the content item, including for the period punctuation mark, and the confidence score for the punctuation mark may have been below a threshold level, indicating that the participant-written input did not include a punctuation mark or that the participant-supplied punctuation mark was unsatisfactory. As a result, in the user interface that is shown in FIG. 24B, the computing system can display the correct phrase ("Man can.") but may shade the word "can." differently than the word "Man" to visually indicate to the participant which portion of the participant-supplied input the computing system determined to not match the originally-presented content item.

At box 2344, the computing system can store an indication of the content item that the computing system determined that the participant incorrectly input, similar to the operations of box 2072 from the FIGS. 20A-B flowchart.

At box 2350, regardless whether the participant-written content input matches the content item or not, the computing system performs the gesture-comparison process that is described in additional detail with respect to FIG. 22. As described above, this process parses through each letter (and punctuation mark) of the participant-written input, and compares the manner in which the participant formed a gesture that defines the letter to previously-defined and stored animated gestures which represent various techniques for forming the letter. The pre-stored animated gestures represent various satisfactory and unsatisfactory techniques for forming the letter, and the computing system steps through comparisons of the participant-defined gesture to one or more of these pre-stored animations to determine whether the participant-defined input is satisfactory or unsatisfactory. If unsatisfactory, the system can indicate how the participant-written input was unsatisfactory, for example, by flagging a setting indicating that the participant wrote a letter that was, for example, "backwards" or "starts at an improper location." The computing system may store the indication in association with the content item that the participant input incorrectly.

At box 2360, the computing system determines whether the interactive process is to be done, for example, whether a timer has elapsed or the system has cycled through all content items. Responsive to a "negative" result to the determination regarding whether the interactive process is done, the computing system selects a next content item from the ordered set specified by an administrative user, and returns to box 2310 to perform the operations of FIGS. 23A-B again for the next content item.

At box 2370, responsive to "positive" result to the determination of Box 2360 (indicating that the interactive exercise is to be done), the computing system performs the completion routine (Box 2370), which is discussed in detail with reference to FIG. 10.

Now returning to the main interactive session flow of FIG. 6B, the computing system has completed the fifth interactive exercise and moves onto the sixth interactive exercise (box 660). The sixth interactive exercise is described with reference to the FIG. 25 flowchart, and involves the computing system providing a preview of content items for the next interactive session, by performing various different types of interactive exercises with the previewed content items.

At box 2510, the computing system performs a single iteration of the first interactive exercise or the second interactive exercise. For example, the computing system may select one of the content items specified by an administrator in cell 542g from the FIG. 5B user interface, which includes single-letter content items, and perform either the first interactive exercise or the second interactive exercise using the selected content item. The performance of the single iteration of the first interactive exercise may include performing the operations of boxes 712 through 730 or 742 of the FIG. 7 flowchart using the selected content item (depending on the branch taken at decision box 720), without performing the completion routine of box 752 (which requests performance of operations in the FIG. 10 flowchart). The performance of the single iteration of the second interactive exercise may include performing the operations of boxes 1212 through 1230 or 1234 from the FIG. 12 flowchart using the selected content item (depending on the branch taken at decision box 1220) without performing the completion routine of box 1250 (FIG. 10). The computing system can randomly select whether to perform the first interactive exercise or the second interactive exercise, or can perform both interactive exercises for the selected content item.

At box 2520, the computing system performs a single iteration of the third interactive exercise. For example, the computing system may select one of the content items specified by an administrator in cell 542h of the FIG. 5B user interface, and may use the selected content item to perform the operations of boxes 1412 through either 1430 or 1442 from the FIG. 14A flowchart, depending on the branch taken at decision box 1420.

At box 2530, the computing system performs a single iteration of the fourth interactive exercise. For example, the computing system may select one of the content items specified by an administrator in cell 542i of the FIG. 5B user interface, and may use the selected content item to perform the operations of boxes 1812 through 1872, excluding the correction routine boxes 1844 and 1886 in the flowchart of FIGS. 18A-B, depending on the branch taken at decision box 1862.

At box 2540, the computing system determines whether the interactive exercise is to be done, for example, due to time running out or the computing system exhausting all content items. If not, the computing system repeats the operations of boxes 2510 through 2530, skipping a box if there are no more content items available for the corresponding interactive exercise.

In some implementations, the computing system performs multiple iterations of the first and/or second interactive exercises (box 2510) before performing multiple iterations of the third interactive exercise (box 2520) and then performing multiple iterations of the fourth interactive exercise (box 2530). The computing system may repeat each of the above-described boxes until the time limits specified in the cells of column 532 (FIG. 5B) expires or the content items specified in the respective cell of cells 542g-i (FIG. 5B) are used up.

Figure 10:
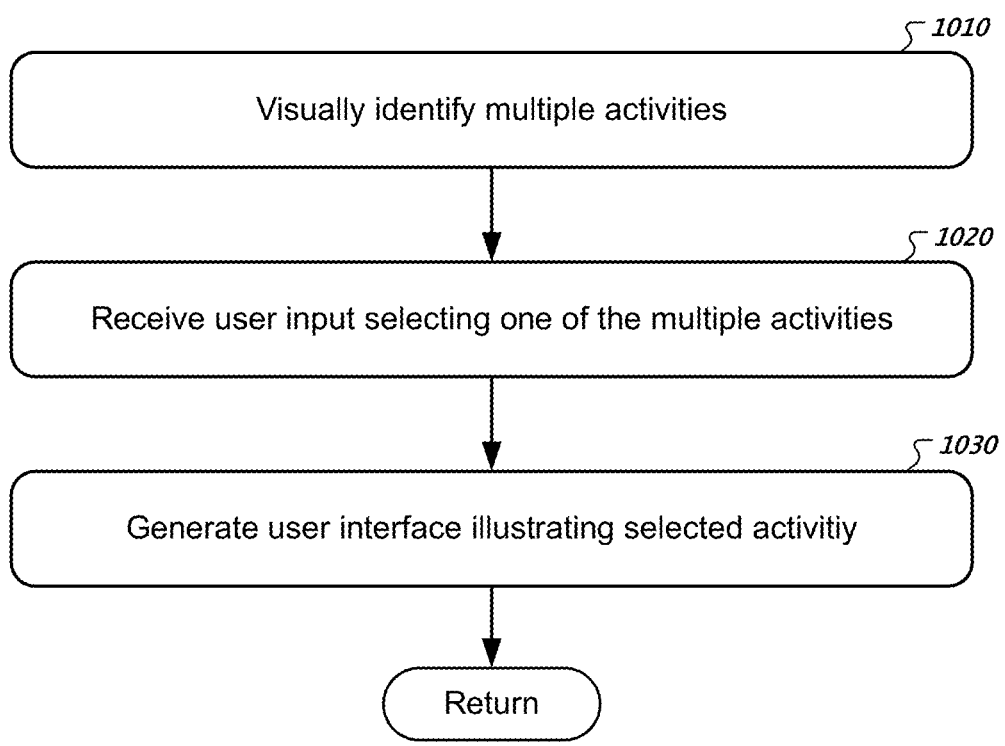
FIG. 10 shows a flowchart of a process for a completion routine.

At box 5550, the computing system performs the completion routine described with respect to FIG. 10.

Now returning to the main interactive session flow of FIG. 6B, the computing system has completed the sixth interactive exercise, and moves onto the seventh interactive exercise (box 662). The seventh interactive exercise is described with reference to the flowchart of FIG. 26, and involves the computing system providing the participant with a matching exercise.

At box 2610, the computing system selects four content items. For example, the computing system may select any four single-character or single-word content items from those shown in the user interface of FIG. 5B, although in some implementations the user interface of FIG. 5B includes a field in which an administrator can specify the content items for the seventh interactive exercise.

Figure 27A:
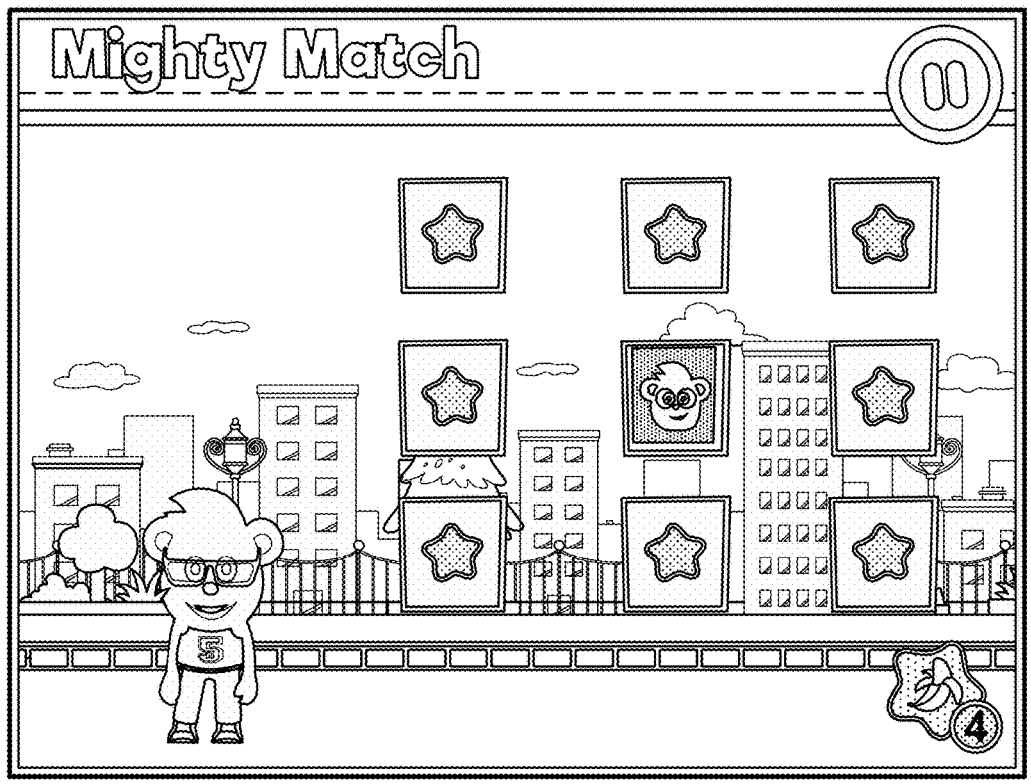
FIGS. 27A-D show user interfaces for performing the seventh interactive exercise.
Figure 27B:
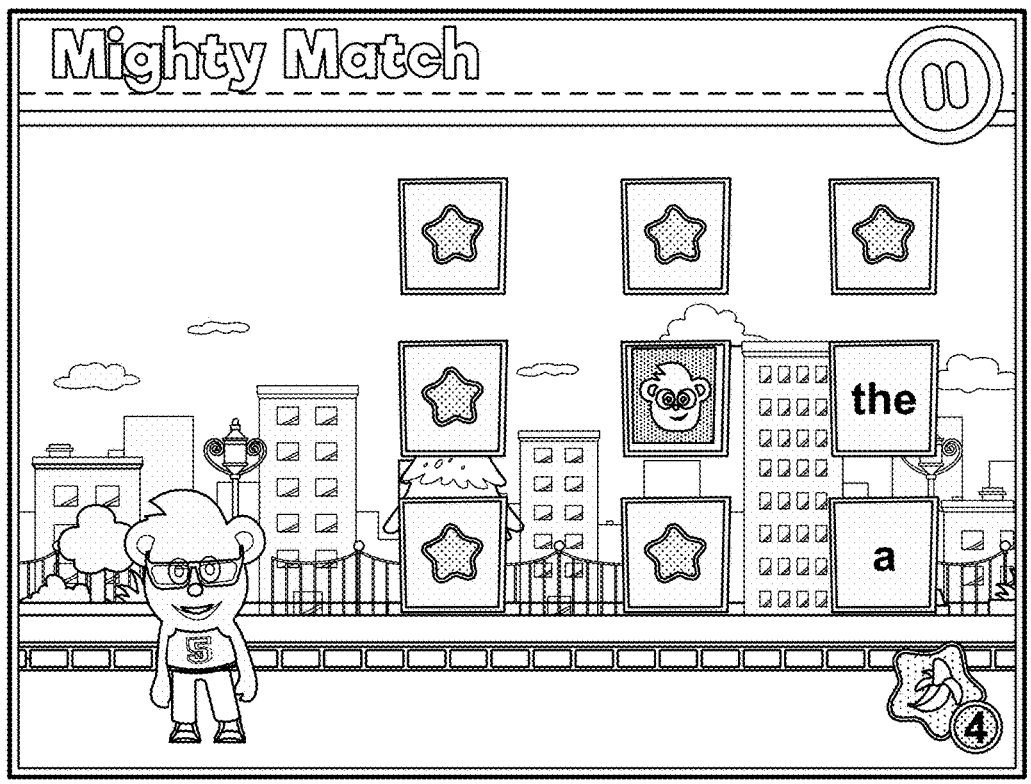

At box 2620, the computing system displays a grid of eight cards with the faces down, the each of the selected content items being represented on two respective instances of the eight cards (of course, with the cards displayed face down, the user interface does not show the content items on any of the cards). As an example, the user interface in FIG. 27A shows a grid of eight such cards face down.

At box 2630, the computing system receives user input that selects two cards. For example, the computing system may receive two user inputs that touch a touchscreen at two locations at which the touchscreen is displaying two different cards. In response, the computing system may display the two selected cards face up, as illustrated by the user interface in FIG. 27A.

At box 2640, the computing system determines whether the two selected cards match each other, for example, by showing and being assigned to the same content item.

Figure 27C:
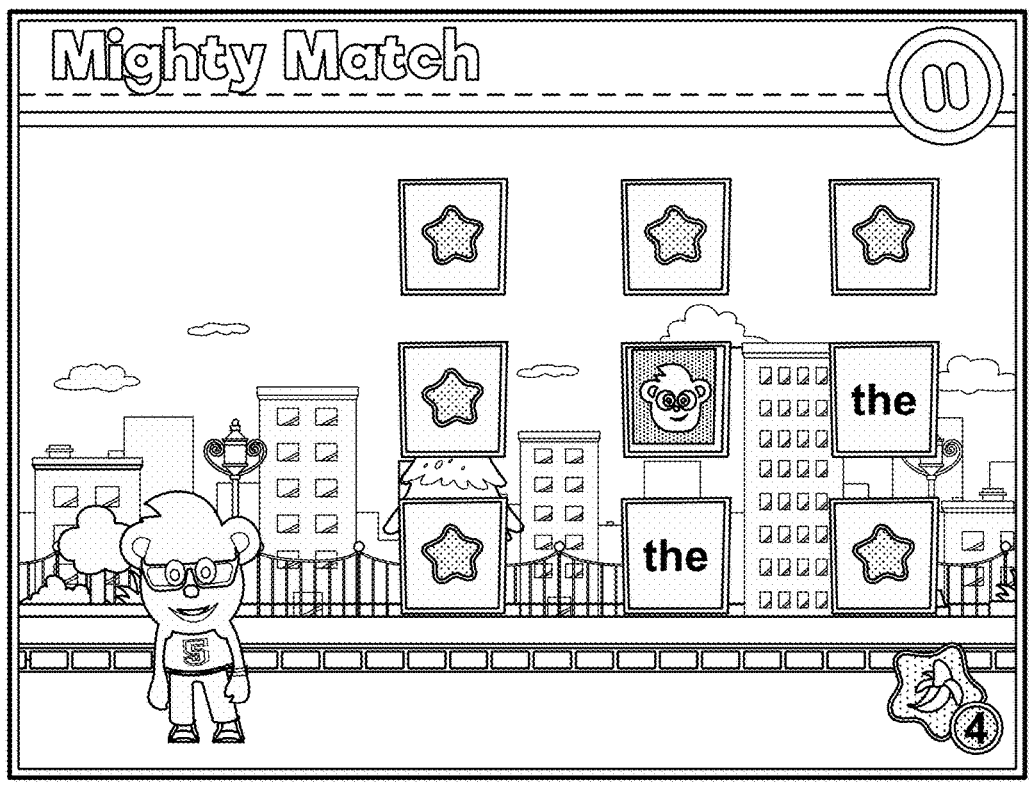
Figure 27D:
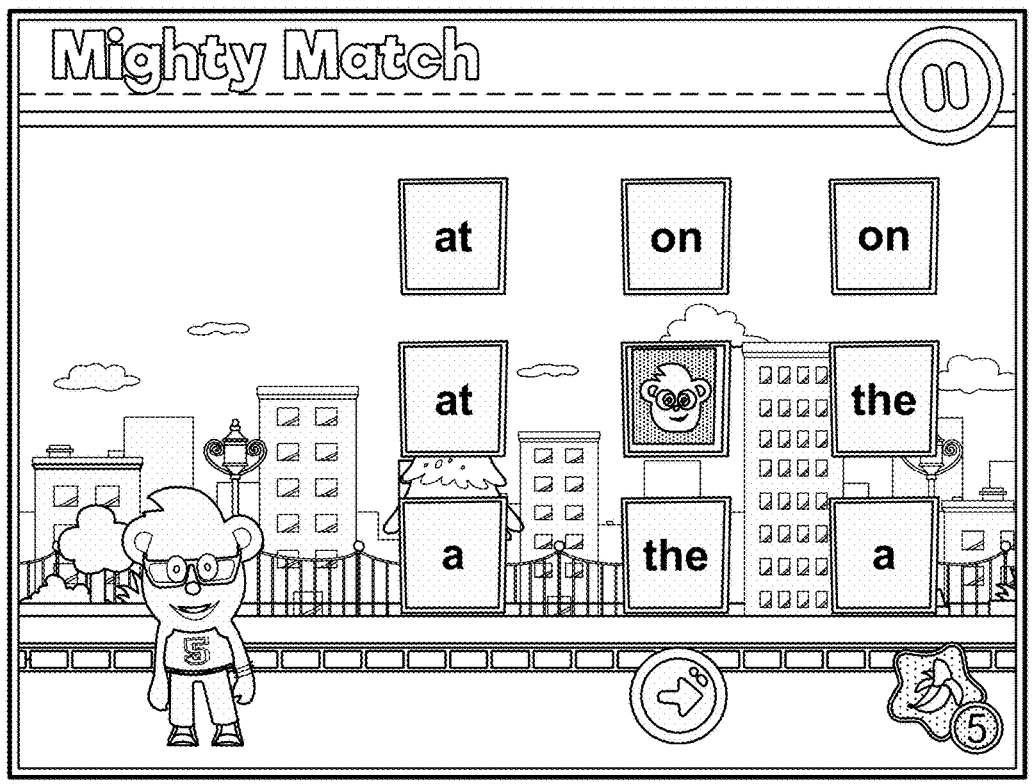

At box 2650, responsive to a "negative" result of the determination of box 2640 (indicating that the cards are not a match, as is the case in the FIG. 27D user interface), the computing system displays the cards face down again and returns to the operation of box 2630 and awaits user input that selects two face-down cards.

At box 2660, responsive to a "positive" result of the determination of box 2640 (indicating that the cards match), the computing system leaves the cards in the face-up configuration, as illustrated in the user interface of FIG. 27C.

At box 2670, the computing system determines whether the seventh interactive exercise is complete. The exercise may be complete when either a timer has expired or all cards have been turned face up. Responsive to a determination that the exercise not yet complete, the computing system returns to box 2630 and awaits user input that selects two face-down cards.

At box 2680, responsive to a determination that the interactive exercise is complete (which is illustrated in the user interface of FIG. 27D), the computing system performs the completion routine that is explained with respect to FIG. 10, and then returns to the main interactive session process flow of FIG. 6B.

Now returning to FIG. 6B, with all of the interactive exercises complete, the computing system returns to FIG. 6A and moves on to box 608.

Figure 30A:
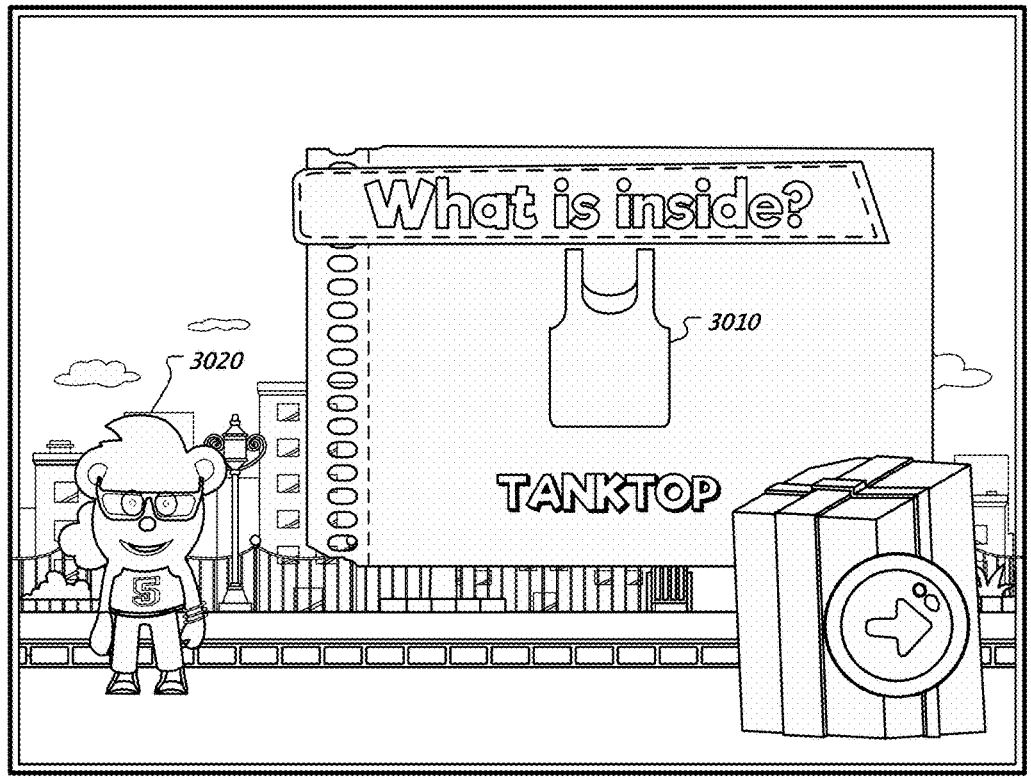
FIG. 30A shows a user interface for providing a participant with a virtual gift.

At box 608, the computing system provides the user with a virtual gift. The virtual gift may be provided to a participant every time that the participant completes an interactive session (i.e., has stepped through all seven exercises that together comprise the whole interactive session). An example user interface through which the computing system shows the virtual gift to the participant is shown in FIG. 30A. In this illustration, the computing system has awarded the participant tank top 3010. This and other virtual gifts allow the participant to customize the characteristics of their character 3020, and provide an incentive to complete the exercises.

Figure 30B:
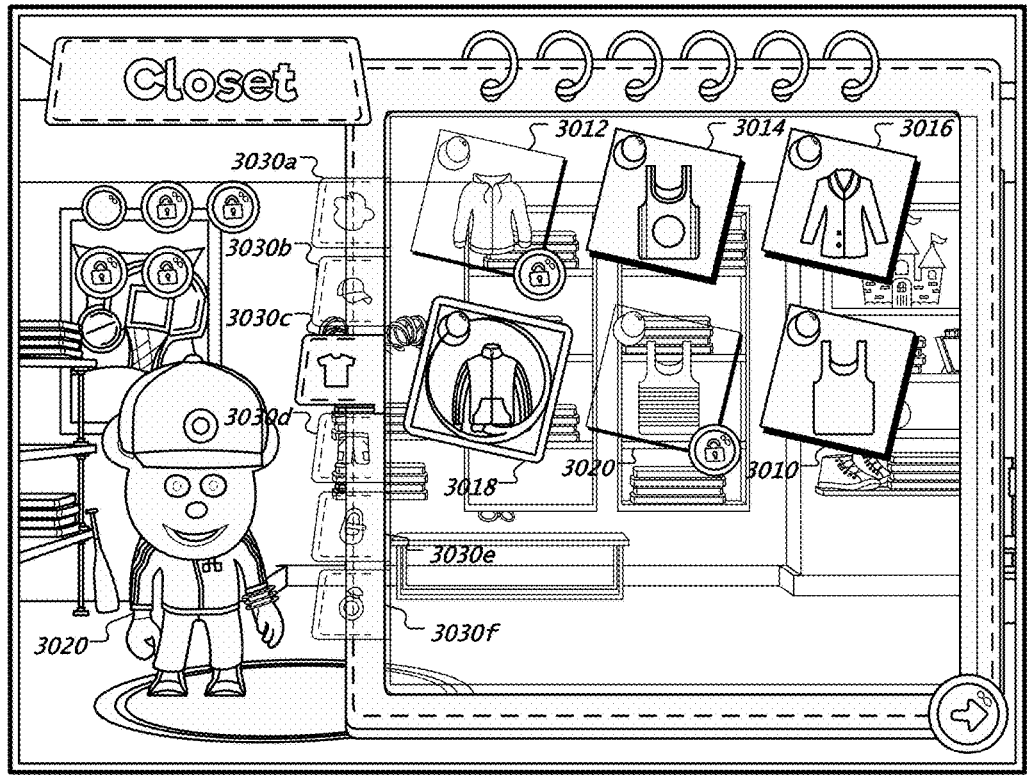
FIG. 30B shows a user interface with which a participant can customize a character.

At box 610, the computing system allows the user to customize their character. FIG. 30B shows an example user interface with which participants are able to customize the characteristics of their character. In this illustration, the user is able to select from four of six clothing tops (i.e., any of tops 3014, 3016, 3018, and 3010) by selecting any of those four clothing tops, with the recently-gifted tank top 3010 included as one of the four options. Options 3012 and 3020 are unavailable because they were not one of the default clothing tops available to the participant and the user has not yet been gifted either of those clothing tops. In this illustration, the user has not selected to dress his character with the newly-gifted clothing top 3010, but has instead selected the jacket 3018. User interface tabs 3030a-f allow the user to view options to change other character characteristics, such as character color 3030a, character hat 3030b, clothing bottom 3030d, character footwear 3030e, and character accessory 3030-f.

At box 620, the computing system determines whether to cycle through another interactive session that repeats the seven interactive exercises discussed above, but with different content items. As an example, the participant may be provided with an option to either leave the application program that provides the interactive session, or to start a new interactive session. Additionally or alternatively, the number of interactive sessions that the computing system prompts a participant to undertake may be defined by an instructor to which the participant is assigned. FIG. 5A shows an example ordering of the interactive sessions, although the instructor can specify a different ordering of the interactive sessions.

Analysis of Interactive Sessions

Figure 28A:
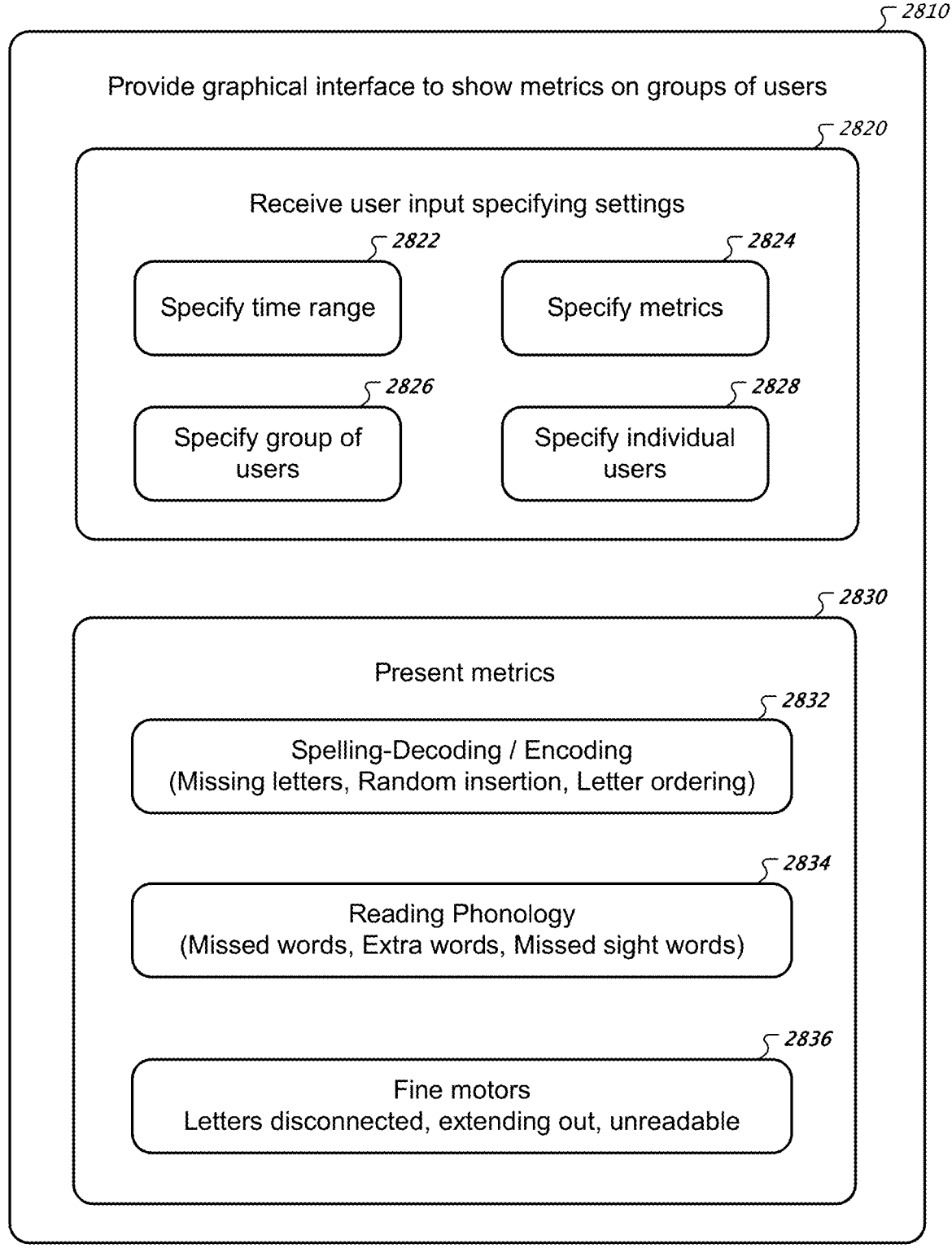
FIGS. 28A-B show a flowchart for analyzing user interaction during the interactive exercises.
Figure 28B:
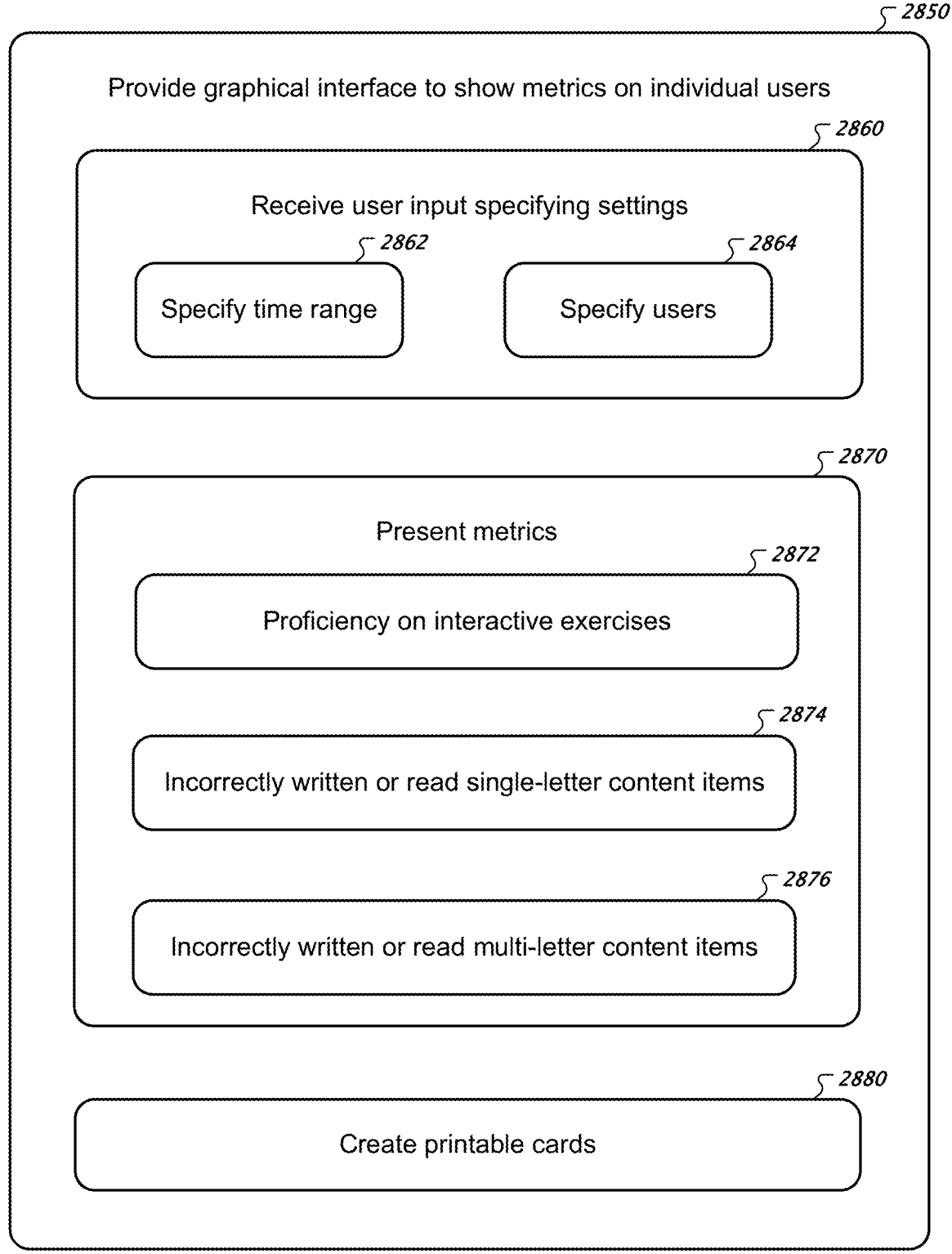

The flowcharts of FIGS. 28A-B show various user interfaces that are accessible to an individual with administrative and/or instructor access to the computing system described herein.

Beginning at FIG. 28A, at box 2810, the computing system provides a graphical interface to show metrics on groups of users. For example, the computing system may present the user interface of FIG. 29A, which a user may access by selecting the "Report" interface element in the left panel 310 shown in the FIG. 3A user interface (or any other user interface that includes the left panel 310). The user interface of FIG. 29A includes various different interface controls for specifying a filtering of participant data, including a start date control 2902, an end date control 2904, a type of data control 2906, a school control 2908, and a student-selection control 2910.

At box 2820, the computing system receives user input specifying settings. For example, the computing system may receive user input that interacts with the above-described controls to specify start and end dates to specify a time range (box 2822), a particular type of metric to view from among multiple different types of metrics (box 2824), a group of users on which to view metrics, such as a particular school (box 2826), and whether to view metrics on all students in that group or an anonymized subset of that group (e.g., a class within a school, given that the student designation is anonymized along with all other personally identifiable information) (box 2828).

At box 2830, the computing system presents metrics. The metrics may be shown at a display portion 2920 in the FIG. 29A user interface. There are various different types of metrics that the system may display, based on the metric specified by the user through interaction with control 2906. These metrics may include Spelling-Decoding/Encoding (box 2832), which presents metrics on missing letters, random letter insertion, and incorrect letter ordering. These are the metrics that are illustrated in the display portion 2920 of the FIG. 29A user interface, which shows bar graph bars that specify either the amount of or the number of students providing (1) occurrences of missing letters (see bar 2922), (2) random letter insertions (see bar 2924), and (3) incorrect letter orderings (see bar 2926).

Figures 29A, 29B:
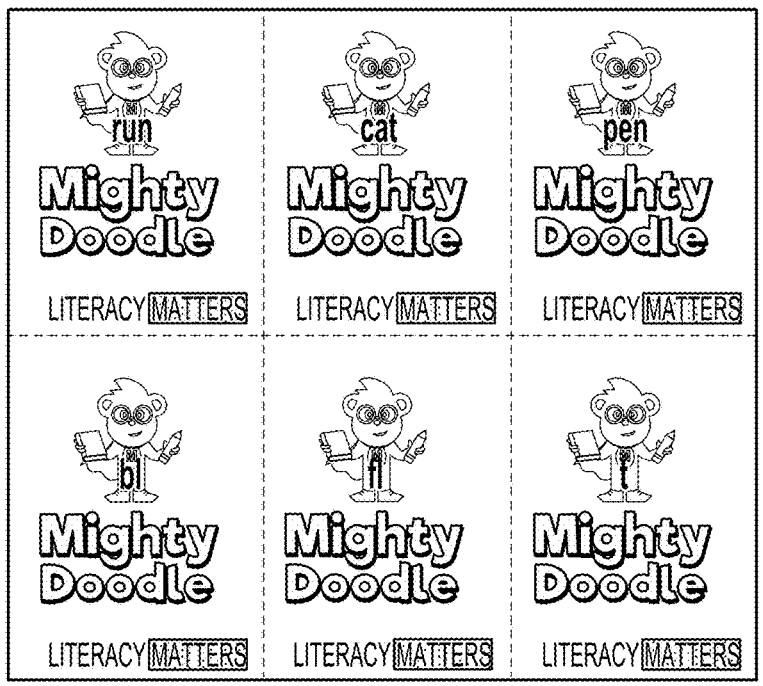

The computing system is configured to present other metrics in the display portion 2920 of the FIG. 29A user interface. For instance, user selection to view a Reading Phonology option with control 2906 causes the computing system to show bars with statistics on the number of users and/or occurrences of missed words, extra words, and missed sight words. User selection of a Fine Motor Skills option using control 2906 causes the computing system to show bars with statistics on letters being disconnected, letters extending out, and letters being unreadable. Other metrics may be presented, such as those determined through the gesture-comparison process of FIG. 22, although in some implementations there are certain ones of the metrics that are not available to an individual with administrative access, and rather such metrics may be viewable only by an instructor of the participants. The user interfaces for displaying these other metrics may otherwise be the same as or similar to those described with reference to the FIG. 28A-B flowcharts and the FIG. 29A and FIG. 29C user interfaces.

Now turning to the FIG. 28B flowchart, at box 2850, the computing system provides a graphical interface to show metrics on individual users. An example user interface is that shown in FIG. 29C, which includes a start date control 2932, an end date control 2934, a group-selection control 2936, a participant-selection control 2938, and a display portion 2940.

At box 2860, the computing system receives user input that specifies settings. For example, the computing system may receive user input that interacts with the start date control 2932 and the end date control 2934 to specify a time range (box 2862). The computing system may also or alternatively receive user input that that interacts with the group-selection control 2936 and the participant-selection control 2938 to select a group (e.g., a school) and possibly a sub-group of one or more participant users within that selected group (e.g., a class of students or an individual student, represented by anonymized identifier) (box 2864).

At box 2870, the computing system presents metrics on the selected group of one or more students for the selected time range. For example the computing system can present, for each instance of a participant user performing an interactive session within the selected time range, the proficiency of the participant on each of the exercises. As an illustration, the first row of the table shown in display portion 2940 shows a name of the group to which the participant belongs (column 1), the anonymized identifier for the participant (column 2), the date that the participant engaged in the interactive session (column 3), the name of the interactive session (column 4), overall proficiency on all the exercises as a percentage (column 5), and percentage correct and absolute number correct for each of the seven interactive exercises (e.g., with column 6 showing percentage for the first exercise, column 7 showing absolute number for the first exercise, column 8 showing percentage for the second exercise, as so forth). The server system 130 may access this information from the content and metrics data store 120, with this information having been stored in the data store 120 during each interactive exercise or at the completion thereof.

Figure 29C:
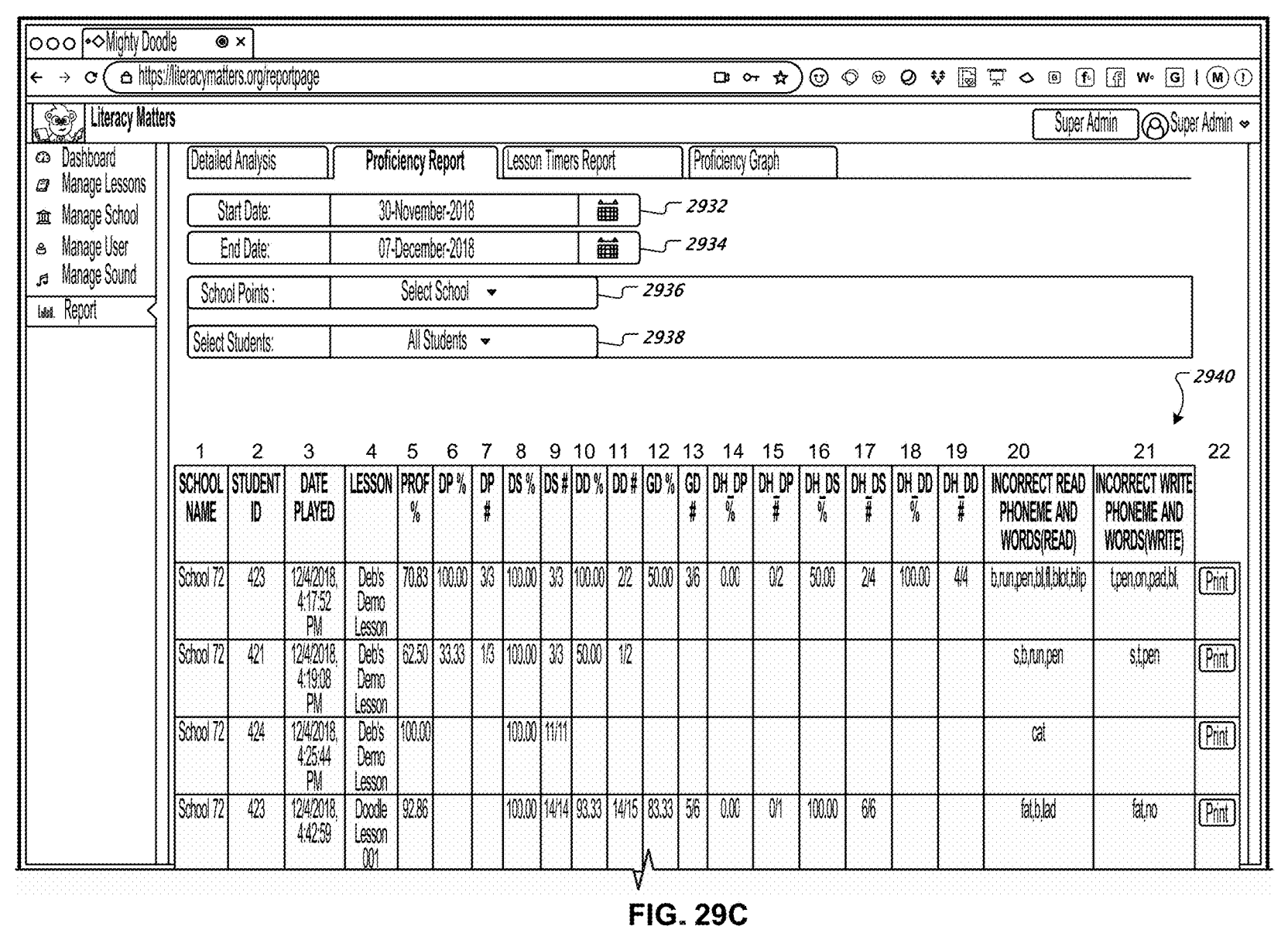
Figure 29C:
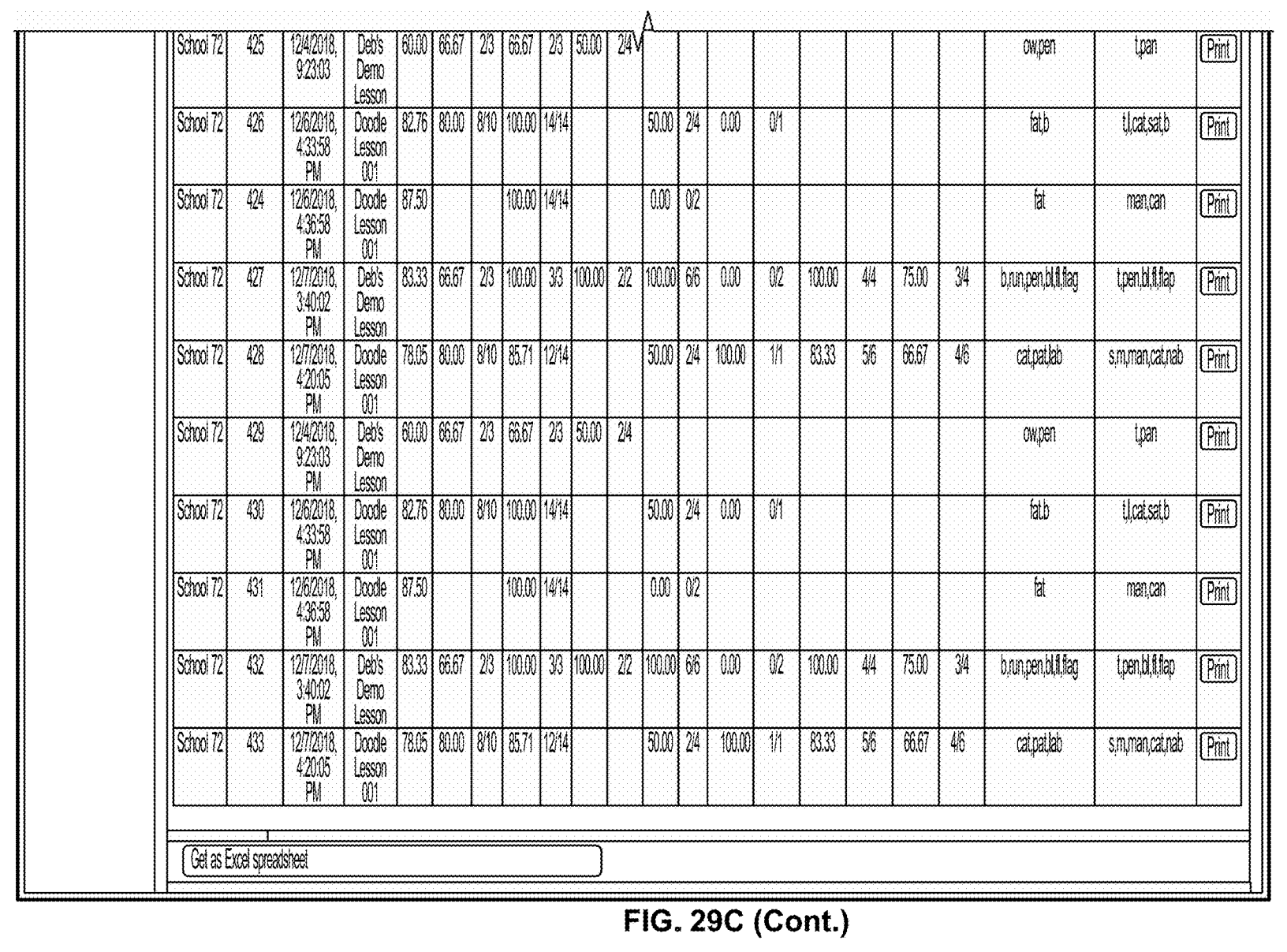

At box 2872, the computing system presents a list of the incorrectly written or read single-character content items. For example, the computing system may present, for each row in the table in FIG. 29C (representative of a single interactive session for a single user), a list of the single-character content items that the respective user either spoke or wrote unsatisfactorily during the respective session, which is shown in FIG. 29C under column 20.

At box 2874, the computing system presents a list of the incorrectly written or read multi-character content items. For example, the computing system may present, for each row in the table in FIG. 29C, a list of the multi-character content items that the respective user either spoke or wrote unsatisfactorily during the respective session, which is shown in FIG. 29C under column 21.

The server system 130 may access the incorrectly spoken or written content items from the content and metrics data store 120. Presenting this information can help an instructor determine if there is a specific type of content item on which a single participant repeatedly performs unsatisfactorily, and can allow the instructor to interact with that participant in a real-world training session that focuses on areas of that participant's literacy that may need additional attention. Moreover, such information can allow the instructor to determine if there are specific types of content items that a large amount of individuals are having difficulty with. If all those individuals participate in real-world instruction in a common setting, the instructor can provide real-world instruction to the entire group of individuals and focus on those aspects of literacy that a large portion of the group are struggling with.

At box 2880, the computing system creates a collection of flash cards. As an illustration, a user with access to the user interface presented in FIG. 29C may select, for any given row, the "Print" interface element listed under column 22. In response to selection of one of these interface elements, the computing system may generate a sheet of flash cards that list the content items from columns 20 and 21 for the appropriate participant. An example of such flash cards are those shown in FIG. 29B. An individual may then print off these flash cards so that the appropriate participant can practice those content items with which the participant struggled, and/or the user may send the flash cards electronically to another individual to print off or review (e.g., an instructor may send the flash cards to a parent of a student).

Overview of Example Computing Systems

Referring now to FIG. 31, a conceptual diagram of a system that may be used to implement the systems and methods described in this document is illustrated. In the system, mobile computing device 3110 can wirelessly communicate with base station 3140, which can provide the mobile computing device wireless access to numerous hosted services 3160 through a network 3150.

In this illustration, the mobile computing device 3110 is depicted as a handheld mobile telephone (e.g., a smartphone, or an application telephone) that includes a touchscreen display device 3112 for presenting content to a user of the mobile computing device 3110 and receiving touch-based user inputs and/or presence-sensitive user input (e.g., as detected over a surface of the computing device using radar detectors mounted in the mobile computing device 510). Other visual, tactile, and auditory output components may also be provided (e.g., LED lights, a vibrating mechanism for tactile output, or a speaker for providing tonal, voice-generated, or recorded output), as may various different input components (e.g., keyboard 3114, physical buttons, trackballs, accelerometers, gyroscopes, and magnetometers).

Example visual output mechanism in the form of display device 3112 may take the form of a display with resistive or capacitive touch capabilities. The display device may be for displaying video, graphics, images, and text, and for coordinating user touch input locations with the location of displayed information so that the device 3110 can associate user contact at a location of a displayed item with the item. The mobile computing device 3110 may also take alternative forms, including as a laptop computer, a tablet or slate computer, a personal digital assistant, an embedded system (e.g., a car navigation system), a desktop personal computer, or a computerized workstation.

An example mechanism for receiving user-input includes keyboard 3114, which may be a full qwerty keyboard or a traditional keypad that includes keys for the digits '0-9', '*', and '#.' The keyboard 3114 receives input when a user physically contacts or depresses a keyboard key. User manipulation of a trackball 3116 or interaction with a track pad enables the user to supply directional and rate of movement information to the mobile computing device 3110 (e.g., to manipulate a position of a cursor on the display device 3112).

The mobile computing device 3110 may be able to determine a position of physical contact with the touchscreen display device 3112 (e.g., a position of contact by a finger or a stylus). Using the touchscreen 3112, various "virtual" input mechanisms may be produced, where a user interacts with a graphical user interface element depicted on the touchscreen 3112 by contacting the graphical user interface element. An example of a "virtual" input mechanism is a "software keyboard," where a keyboard is displayed on the touchscreen and a user selects keys by pressing a region of the touchscreen 3112 that corresponds to each key.

The mobile computing device 3110 may include mechanical or touch sensitive buttons 3118a-d. Additionally, the mobile computing device may include buttons for adjusting volume output by the one or more speakers 3120, and a button for turning the mobile computing device on or off. A microphone 3122 allows the mobile computing device 3110 to convert audible sounds into an electrical signal that may be digitally encoded and stored in computer-readable memory, or transmitted to another computing device. The mobile computing device 3110 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include ANDROID, CHROME, IOS, MAC OS X, WINDOWS 7, WINDOWS PHONE 7, SYMBIAN, BLACKBERRY, WEBOS, a variety of UNIX operating systems; or a proprietary operating system for computerized devices. The operating system may provide a platform for the execution of application programs that facilitate interaction between the computing device and a user.

The mobile computing device 3110 may present a graphical user interface with the touchscreen 3112. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 3104. User-selection of the button may invoke the pre-defined action.

In some examples, the operating system provides a "desktop" graphical user interface that is displayed after turning on the mobile computing device 3110, after activating the mobile computing device 3110 from a sleep state, after "unlocking" the mobile computing device 3110, or after receiving user-selection of the "home" button 3118c. The desktop graphical user interface may display several graphical interface elements that, when selected, invoke corresponding application programs. An invoked application program may present a graphical interface that replaces the desktop graphical user interface until the application program terminates or is hidden from view.

User-input may influence an executing sequence of mobile computing device 3110 operations. For example, a single-action user input (e.g., a single tap of the touchscreen, swipe across the touchscreen, contact with a button, or combination of these occurring at a same time) may invoke an operation that changes a display of the user interface. Without the user-input, the user interface may not have changed at a particular time. For example, a multi-touch user input with the touchscreen 3112 may invoke a mapping application to "zoom-in" on a location, even though the mapping application may have by default zoomed-in after several seconds.

The desktop graphical interface can also display "widgets." A widget is one or more graphical interface elements that are associated with an application program that is executing, and that display on the desktop content controlled by the executing application program. A widget's application program may launch as the mobile device turns on. Further, a widget may not take focus of the full display. Instead, a widget may only "own" a small portion of the desktop, displaying content and receiving touchscreen user-input within the portion of the desktop.

The mobile computing device 3110 may include one or more location-identification mechanisms. A location-identification mechanism may include a collection of hardware and software that provides the operating system and application programs an estimate of the mobile device's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by receiving user a "check in" to a location).

The mobile computing device 3110 may include other applications, computing sub-systems, and hardware. A call handling unit may receive an indication of an incoming telephone call and provide a user the capability to answer the incoming telephone call. A media player may allow a user to listen to music or play movies that are stored in local memory of the mobile computing device 3110. The mobile device 3110 may include a digital camera sensor, and corresponding image and video capture and editing software. An internet browser may enable the user to view content from a web page by typing in an addresses corresponding to the web page or selecting a link to the web page.

The mobile computing device 3110 may include an antenna to wirelessly communicate information with the base station 3140. The base station 3140 may be one of many base stations in a collection of base stations (e.g., a mobile telephone cellular network) that enables the mobile computing device 3110 to maintain communication with a network 3150 as the mobile computing device is geographically moved. The computing device 3110 may alternatively or additionally communicate with the network 3150 through a Wi-Fi router or a wired connection (e.g., ETHERNET, USB, or FIREWIRE). The computing device 3110 may also wirelessly communicate with other computing devices using BLUETOOTH protocols, or may employ an ad-hoc wireless network.

A service provider that operates the network of base stations may connect the mobile computing device 3110 to the network 3150 to enable communication between the mobile computing device 3110 and other computing systems that provide services 3160. Although the services 3160 may be provided over different networks (e.g., the service provider's internal network, the Public Switched Telephone Network, and the Internet), network 3150 is illustrated as a single network. The service provider may operate a server system 3152 that routes information packets and voice data between the mobile computing device 3110 and computing systems associated with the services 3160.

The network 3150 may connect the mobile computing device 3110 to the Public Switched Telephone Network (PSTN) 3162 in order to establish voice or fax communication between the mobile computing device 3110 and another computing device. For example, the service provider server system 3152 may receive an indication from the PSTN 3162 of an incoming call for the mobile computing device 3110. Conversely, the mobile computing device 3110 may send a communication to the service provider server system 3152 initiating a telephone call using a telephone number that is associated with a device accessible through the PSTN 3162.

The network 3150 may connect the mobile computing device 3110 with a Voice over Internet Protocol (VoIP) service 3164 that routes voice communications over an IP network, as opposed to the PSTN. For example, a user of the mobile computing device 3110 may invoke a VoIP application and initiate a call using the program. The service provider server system 3152 may forward voice data from the call to a VoIP service, which may route the call over the internet to a corresponding computing device, potentially using the PSTN for a final leg of the connection.

An application store 3166 may provide a user of the mobile computing device 3110 the ability to browse a list of remotely stored application programs that the user may download over the network 3150 and install on the mobile computing device 3110. The application store 3166 may serve as a repository of applications developed by third-party application developers. An application program that is installed on the mobile computing device 3110 may be able to communicate over the network 3150 with server systems that are designated for the application program. For example, a VoIP application program may be downloaded from the Application Store 3166, enabling the user to communicate with the VoIP service 3164.

The mobile computing device 3110 may access content on the internet 3168 through network 3150. For example, a user of the mobile computing device 3110 may invoke a web browser application that requests data from remote computing devices that are accessible at designated universal resource locations. In various examples, some of the services 3160 are accessible over the internet.

The mobile computing device may communicate with a personal computer 3170. For example, the personal computer 3170 may be the home computer for a user of the mobile computing device 3110. Thus, the user may be able to stream media from his personal computer 3170. The user may also view the file structure of his personal computer 3170, and transmit selected documents between the computerized devices.

A voice recognition service 3172 may receive voice communication data recorded with the mobile computing device's microphone 3122, and translate the voice communication into corresponding textual data. In some examples, the translated text is provided to a search engine as a web query, and responsive search engine search results are transmitted to the mobile computing device 3110.

The mobile computing device 3110 may communicate with a social network 3174. The social network may include numerous members, some of which have agreed to be related as acquaintances. Application programs on the mobile computing device 3110 may access the social network 3174 to retrieve information based on the acquaintances of the user of the mobile computing device. For example, an "address book" application program may retrieve telephone numbers for the user's acquaintances. In various examples, content may be delivered to the mobile computing device 3110 based on social network distances from the user to other members in a social network graph of members and connecting relationships. For example, advertisement and news article content may be selected for the user based on a level of interaction with such content by members that are "close" to the user (e.g., members that are "friends" or "friends of friends").

The mobile computing device 3110 may access a personal set of contacts 3176 through network 3150. Each contact may identify an individual and include information about that individual (e.g., a phone number, an email address, and a birthday). Because the set of contacts is hosted remotely to the mobile computing device 3110, the user may access and maintain the contacts 3176 across several devices as a common set of contacts.

The mobile computing device 3110 may access cloud-based application programs 3178. Cloud-computing provides application programs (e.g., a word processor or an email program) that are hosted remotely from the mobile computing device 3110, and may be accessed by the device 3110 using a web browser or a dedicated program. Example cloud-based application programs include GOOGLE DOCS word processor and spreadsheet service, GOOGLE GMAIL webmail service, and PICASA picture manager.

Mapping service 3180 can provide the mobile computing device 3110 with street maps, route planning information, and satellite images. An example mapping service is GOOGLE MAPS. The mapping service 3180 may also receive queries and return location-specific results. For example, the mobile computing device 3110 may send an estimated location of the mobile computing device and a user-entered query for "pizza places" to the mapping service 3180. The mapping service 3180 may return a street map with "markers" superimposed on the map that identify geographical locations of nearby "pizza places."

Turn-by-turn service 3182 may provide the mobile computing device 3110 with turn-by-turn directions to a user-supplied destination. For example, the turn-by-turn service 3182 may stream to device 3110 a street-level view of an estimated location of the device, along with data for providing audio commands and superimposing arrows that direct a user of the device 3110 to the destination.

Various forms of streaming media 3184 may be requested by the mobile computing device 3110. For example, computing device 3110 may request a stream for a pre-recorded video file, a live television program, or a live radio program. Example services that provide streaming media include YOUTUBE and PANDORA.

A micro-blogging service 3186 may receive from the mobile computing device 3110 a user-input post that does not identify recipients of the post. The micro-blogging service 3186 may disseminate the post to other members of the micro-blogging service 3186 that agreed to subscribe to the user.

A search engine 3188 may receive user-entered textual or verbal queries from the mobile computing device 3110, determine a set of internet-accessible documents that are responsive to the query, and provide to the device 3110 information to display a list of search results for the responsive documents. In examples where a verbal query is received, the voice recognition service 3172 may translate the received audio into a textual query that is sent to the search engine.

These and other services may be implemented in a server system 3190. A server system may be a combination of hardware and software that provides a service or a set of services. For example, a set of physically separate and networked computerized devices may operate together as a logical server system unit to handle the operations necessary to offer a service to hundreds of computing devices. A server system is also referred to herein as a computing system.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

"Determining" by a computing system can include the computing system requesting that another device perform the determination and supply the results to the computing system. Moreover, "displaying" or "presenting" by a computing system can include the computing system sending data for causing another device to display or present the referenced information.

Figure 32:
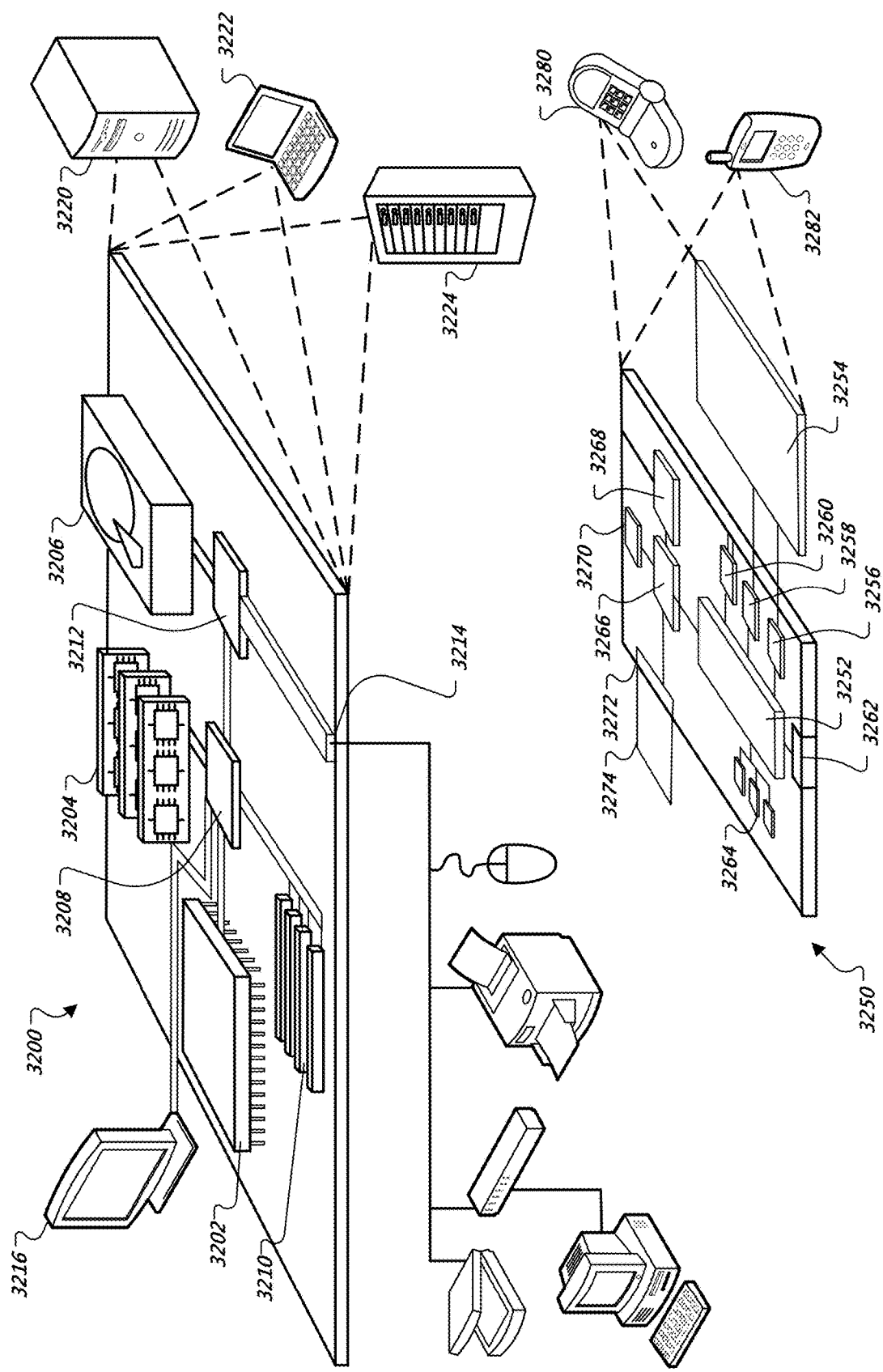
FIG. 32 is a block diagram of computing devices that may be used to implement the systems and methods described in this document, as either a client or as a server or plurality of servers.

FIG. 32 is a block diagram of computing devices 3200, 3250 that may be used to implement the systems and methods described in this document, as either a client or as a server or plurality of servers. Computing device 3200 is intended to represent various forms of digital computers, such as laptops, desktops, workstations, personal digital assistants, servers, blade servers, mainframes, and other appropriate computers. Computing device 3250 is intended to represent various forms of mobile devices, such as personal digital assistants, cellular telephones, smartphones, and other similar computing devices. The components shown here, their connections and relationships, and their functions, are meant to be examples only, and are not meant to limit implementations described and/or claimed in this document.

Computing device 3200 includes a processor 3202, memory 3204, a storage device 3206, a high-speed interface 3208 connecting to memory 3204 and high-speed expansion ports 3210, and a low speed interface 3212 connecting to low speed bus 3214 and storage device 3206. Each of the components 3202, 3204, 3206, 3208, 3210, and 3212, are interconnected using various busses, and may be mounted on a common motherboard or in other manners as appropriate. The processor 3202 can process instructions for execution within the computing device 3200, including instructions stored in the memory 3204 or on the storage device 3206 to display graphical information for a GUI on an external input/output device, such as display 3216 coupled to high-speed interface 3208. In other implementations, multiple processors and/or multiple buses may be used, as appropriate, along with multiple memories and types of memory. Also, multiple computing devices 3200 may be connected, with each device providing portions of the necessary operations (e.g., as a server bank, a group of blade servers, or a multi-processor system).

The memory 3204 stores information within the computing device 3200. In one implementation, the memory 3204 is a volatile memory unit or units. In another implementation, the memory 3204 is a non-volatile memory unit or units. The memory 3204 may also be another form of computer-readable medium, such as a magnetic or optical disk.

The storage device 3206 is capable of providing mass storage for the computing device 3200. In one implementation, the storage device 3206 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 3204, the storage device 3206, or memory on processor 3202.

The high-speed controller 3208 manages bandwidth-intensive operations for the computing device 3200, while the low speed controller 3212 manages lower bandwidth-intensive operations. Such allocation of functions is an example only. In one implementation, the high-speed controller 3208 is coupled to memory 3204, display 3216 (e.g., through a graphics processor or accelerator), and to high-speed expansion ports 3210, which may accept various expansion cards (not shown). In the implementation, low-speed controller 3212 is coupled to storage device 3206 and low-speed expansion port 3214. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 3200 may be implemented in a number of different forms, as shown in the figure. For example, it may be implemented as a standard server 3220, or multiple times in a group of such servers. It may also be implemented as part of a rack server system 3224. In addition, it may be implemented in a personal computer such as a laptop computer 3222. Alternatively, components from computing device 3200 may be combined with other components in a mobile device (not shown), such as device 3250. Each of such devices may contain one or more of computing device 3200, 3250, and an entire system may be made up of multiple computing devices 3200, 3250 communicating with each other.

Computing device 3250 includes a processor 3252, memory 3264, an input/output device such as a display 3254, a communication interface 3266, and a transceiver 3268, among other components. The device 3250 may also be provided with a storage device, such as a microdrive or other device, to provide additional storage. Each of the components 3250, 3252, 3264, 3254, 3266, and 3268, are interconnected using various buses, and several of the components may be mounted on a common motherboard or in other manners as appropriate.

The processor 3252 can execute instructions within the computing device 3250, including instructions stored in the memory 3264. The processor may be implemented as a chipset of chips that include separate and multiple analog and digital processors. Additionally, the processor may be implemented using any of a number of architectures. For example, the processor may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 3250, such as control of user interfaces, applications run by device 3250, and wireless communication by device 3250.

Processor 3252 may communicate with a user through control interface 3258 and display interface 3256 coupled to a display 3254. The display 3254 may be, for example, a TFT (Thin-Film-Transistor Liquid Crystal Display) display or an OLED (Organic Light Emitting Diode) display, or other appropriate display technology. The display interface 3256 may comprise appropriate circuitry for driving the display 3254 to present graphical and other information to a user. The control interface 3258 may receive commands from a user and convert them for submission to the processor 3252. In addition, an external interface 3262 may be provide in communication with processor 3252, so as to enable near area communication of device 3250 with other devices. External interface 3262 may provided, for example, for wired communication in some implementations, or for wireless communication in other implementations, and multiple interfaces may also be used.

The memory 3264 stores information within the computing device 3250. The memory 3264 can be implemented as one or more of a computer-readable medium or media, a volatile memory unit or units, or a non-volatile memory unit or units. Expansion memory 3274 may also be provided and connected to device 3250 through expansion interface 3272, which may include, for example, a SIMM (Single In Line Memory Module) card interface. Such expansion memory 3274 may provide extra storage space for device 3250, or may also store applications or other information for device 3250. Specifically, expansion memory 3274 may include instructions to carry out or supplement the processes described above, and may include secure information also. Thus, for example, expansion memory 3274 may be provide as a security module for device 3250, and may be programmed with instructions that permit secure use of device 3250. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 3264, expansion memory 3274, or memory on processor 3252 that may be received, for example, over transceiver 3268 or external interface 3262.

Device 3250 may communicate wirelessly through communication interface 3266, which may include digital signal processing circuitry where necessary. Communication interface 3266 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 3268. In addition, short-range communication may occur, such as using a Bluetooth, WiFi, or other such transceiver (not shown). In addition, GPS (Global Positioning System) receiver module 3270 may provide additional navigation- and location-related wireless data to device 3250, which may be used as appropriate by applications running on device 3250.

Device 3250 may also communicate audibly using audio codec 3260, which may receive spoken information from a user and convert it to usable digital information. Audio codec 3260 may likewise generate audible sound for a user, such as through a speaker, e.g., in a handset of device 3250. Such sound may include sound from voice telephone calls, may include recorded sound (e.g., voice messages, music files, etc.) and may also include sound generated by applications operating on device 3250.

The computing device 3250 may be implemented in a number of different forms, as shown in the figure. For example, it may be implemented as a cellular telephone 3280. It may also be implemented as part of a smartphone 3282, personal digital assistant, or other similar mobile device.

Additionally computing device 3200 or 3250 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method for defining and engaging in interactive sessions between computerized devices and participants, the method comprising:
   performing, by a computing system, operations to define a first interactive exercise and a second interactive exercise, including by:
      presenting, by the computing system, a first user interface that includes user controls configured to define a plurality of content items;
      receiving, by the computing system, user input that interacts with the user controls of the first user interface to specify, for each respective content item in the plurality of content items, characteristics of the respective content item, including (a) a user-specified text spelling of the respective content item, and (b) an audio recording of the respective content item, including user input that specifies a particular user-specified text spelling and a particular audio recording for a particular content item;
      presenting, by the computing system, a second user interface that includes user controls configured to define a plurality of interactive exercises that are each arranged to present content items to users;
      receiving, by the computing system, user input that interacts with the user controls of the second user interface to:
         (i) select a first set of user-selected content items from among the plurality of content items for inclusion as part of the first interactive exercise,
         (ii) assign an order to the first set of user-selected content items to produce a first ordered set of user-selected content items that are assigned to the first interactive exercise, the first ordered set of user-selected content items including the particular content item,
(iii) select a second set of user-selected content items from among the plurality of content items for inclusion as part of the second interactive exercise, and
(iv) assign an order to the second set of user-selected content items to produce a second ordered set of user-selected content items that are assigned to the second interactive exercise, the second ordered set of user-selected content items including the particular content item;

performing, by the computing system, operations to engage in the first interactive exercise, including by:
accessing, by the computing system, the first ordered set of user-selected content items based on the first ordered set of user-selected content items being assigned to the first interactive exercise;
for each respective content item from the first ordered set of user-selected content items, selected one at a time in order from among the first ordered set of user-selected content items:
(i) displaying, by the computing system, the user-specified text spelling of the respective content item and prompting a participant user to audibly speak the respective content item,
(ii) receiving, by the computing system responsive to the computing system prompting the participant user to audibly speak the respective content item, user-supplied audio, and
(iii) determining, by the computing system, whether the user-supplied audio matches the respective content item, and presenting an indication regarding whether the computing system determined the user-supplied audio to match the respective content item,
wherein preforming the first interactive exercise includes displaying the particular user-specified text spelling of the particular content item and prompting the participant user to audibly speak the particular content item; and performing, by the computing system, operations to engage in the second interactive exercise, including by:
accessing, by the computing system, the second ordered set of user-selected content items based on the second ordered set of user-selected content items being assigned to the second interactive exercise;
for each respective content item from the second ordered set of user-selected content items, selected one at a time in order from among the second ordered set of user-selected content items:
(i) audibly outputting, by the computing system, the audio recording of the respective content item and prompting the participant user to spell the respective content item with hand input,
(ii) receiving, by the computing system responsive to the computing system prompting the participant user to spell the respective content item with hand input, user input provided by hand that spells the respective content item, and
(iii) determining, by the computing system, whether the user input provided by hand matches the respective content item, and presenting an indication regarding whether the computing system determined the user input provided by hand to match the respective content item,
wherein preforming the second interactive exercise includes audibly outputting the particular audio recording of the particular content item and prompting the participant user to spell the respective content item with hand input.

2. The computer-implemented method of claim 1, wherein each content item in the plurality of content items comprises a multi-character word.

3. The computer-implemented method of claim 1, wherein:
the characteristics specified for each respective content item in the plurality of content items by the user input that interacts with the user controls of the first user interface include (c) a user-specified phonetic representation of multiple component sounds of the respective content item, which was defined by hand input that provided multiple text strings that correspond to the multiple component sounds.

4. The computer-implemented method of claim 3, wherein the first user interface concurrently presents:
(i) a first user-specified text spelling of a first content item of the plurality of content items,
(ii) a first audio recording for the first content item,
(iii) a first user-specified phonetic representation of multiple component sounds of the first content item depicted with multiple respective text strings,
(iv) a second user-specified text spelling of a second content item of the plurality of content items,
(v) a second audio recording for the second content item, and
(vi) a second user-specified phonetic representation of multiple component sounds of the second content item depicted with multiple respective text strings.

5. The computer-implemented method of claim 3, wherein:
determining whether the user-supplied audio matches the respective content item includes:
(a) providing the user-supplied audio recording to a sound-identifying process that identifies multiple component sounds within the user-supplied audio,
(b) accessing the user-specified phonetic representation of the multiple component sounds of the respective content item, which was defined by the hand input as multiple text strings that correspond to the multiple component sounds,
(c) running a pre-configured routine, for each respective text string of the multiple text strings that define the user-specified phonetic representation of the multiple component sounds of the respective content item, to determine whether the respective text string matches audio data indicated by the corresponding component sounds of the multiple component sounds, such that multiple pre-configured routines are run, one for each text string of the multiple text strings.

6. The computer-implemented method of claim 5, wherein the user-specified phonetic representation of the multiple component sounds of the respective content item identifies two or more sounds from among a collection of sounds, the collection of sounds including multiple sounds for each of various different alphabetical letters.

7. The computer-implemented method of claim 5, wherein:
presenting the indication regarding whether the computing system determined the user-supplied audio to match the respective content item includes presenting (a) a text representation of the respective content item, (b) an indication that a first letter in the respective content item was spoken satisfactorily, the first letter corresponding to a first component sound of the multiple component sounds, and (c) an indication that a second letter in the respective content item was spoken unsatisfactorily, the second letter corresponding to a second component sound of the multiple component sounds.

8. The computer-implemented method of claim 1, wherein receiving the user input that interacts with the user controls of the second user interface to assign the order to the first set of user-selected content items to produce the first ordered set of user-selected content items includes:
displaying, by the computing system, a collection of interface elements that correspond to the first set of user-selected content items; and
receiving, by the computing system, user input that interacts with a location at which one interface element from the collection of interface elements is displayed and drags the one interface element to a different location among the collection of interface elements to change an order of the first set of user-selected content items.

9. The computer-implemented method of claim 8, wherein receiving the user input that interacts with the user controls of the second user interface to select the first set of user-selected content items includes:
displaying, by the computing system, the collection of interface elements that correspond to (i) the first set of user-selected content items selected for inclusion as part of the first interactive exercise, and (ii) an additional interface element that corresponds to an additional content item that is initially selected from among the plurality of content items for inclusion as part of the first interactive exercise; and
receiving, by the computing system, user input that interacts with a location at which the additional interface item is displayed to remove the additional content item from the first interactive exercise and leave the first set of user-selected content items as those content items selected for the first interactive exercise.

10. The computer-implemented method of claim 1, wherein:
the user input provided by hand includes user interaction with a touchscreen to form a freehand line drawing;
determining whether the user input provided by hand matches the respective content item includes:
(a) identifying a text representation of the freehand line drawing, and
(b) determining whether the text representation of the freehand line drawing matches the user-specified text spelling of the respective content item; and
presenting the indication regarding whether the computing system determined the user input provided by hand to match the respective content item includes:
(a) presenting a text representation of the respective content item, and
(b) presenting an indication regarding whether the computing system determined the respective content item to be written satisfactorily, the computing system not presenting the text representation of the respective content item while the computing system was receiving the user interaction with the touchscreen to form the freehand line drawing.

11. A computing system, comprising:
one or more processors; and one or more computer-readable devices including instructions that, when executed by the one or more processors, cause the computing system to perform operations that include:
performing, by a computing system, operations to define a first interactive exercise and a second interactive exercise, including by:
presenting, by the computing system, a first user interface that includes user controls configured to define a plurality of content items;
receiving, by the computing system, user input that interacts with the user controls of the first user interface to specify, for each respective content item in the plurality of content items, characteristics of the respective content item, including (a) a user-specified text spelling of the respective content item, and (b) an audio recording of the respective content item, including user input that specifies a particular user-specified text spelling and a particular audio recording for a particular content item;
presenting, by the computing system, a second user interface that includes user controls configured to define a plurality of interactive exercises that are each arranged to present content items to users;
receiving, by the computing system, user input that interacts with the user controls of the second user interface to:
(i) select a first set of user-selected content items from among the plurality of content items for inclusion as part of the first interactive exercise,
(ii) assign an order to the first set of user-selected content items to produce a first ordered set of user-selected content items that are assigned to the first interactive exercise, the first ordered set of user-selected content items including the particular content item,
(iii) select a second set of user-selected content items from among the plurality of content items for inclusion as part of the second interactive exercise, and
(iv) assign an order to the second set of user-selected content items to produce a second ordered set of user-selected content items that are assigned to the second interactive exercise, the second ordered set of user-selected content items including the particular content item;
performing, by the computing system, operations to engage in at least the first interactive exercise, including by:
accessing, by the computing system, the first ordered set of user-selected content items based on the first ordered set of user-selected content items being assigned to the first interactive exercise;
for each respective content item from the first ordered set of user-selected content items, selected one at a time in order from among the first ordered set of user-selected content items:
(i) displaying, by the computing system, the user-specified text spelling of the respective content item and prompting a participant user to audibly speak the respective content item,
(ii) receiving, by the computing system responsive to the computing system prompting the participant user to audibly speak the respective content item, user-supplied audio, and
(iii) determining, by the computing system, whether the user-supplied audio matches the respective content item, and presenting an indication regarding whether the computing system determined the user-supplied audio to match the respective content item, wherein preforming the first interactive exercise includes displaying the particular user-specified text spelling of the particular content item and prompting the participant user to audibly speak the particular content item; and performing, by the computing system, operations to engage in the second interactive exercise, including by:

accessing, by the computing system, the second ordered set of user-selected content items based on the second ordered set of user-selected content items being assigned to the second interactive exercise;

for each respective content item from the second ordered set of user-selected content items, selected one at a time in order from among the second ordered set of user-selected content items:

(i) audibly outputting, by the computing system, the audio recording of the respective content item and prompting the participant user to spell the respective content item with hand input, (ii) receiving, by the computing system responsive to the computing system prompting the participant user to spell the respective content item with hand input, user input provided by hand that spells the respective content item, and (iii) determining, by the computing system, whether the user input provided by hand matches the respective content item, and presenting an indication regarding whether the computing system determined the user input provided by hand to match the respective content item, wherein preforming the second interactive exercise includes audibly outputting the particular audio recording of the particular content item and prompting the participant user to spell the respective content item with hand input.

12. The computing system of claim 11, wherein each content item in the plurality of content items comprises a multi-character word.

13. The computing system of claim 11, wherein:
the characteristics specified for each respective content item in the plurality of content items by the user input that interacts with the user controls of the first user interface include (c) a user-specified phonetic representation of multiple component sounds of the respective content item, which was defined by hand input that provided multiple text strings that correspond to the multiple component sounds.

14. The computing system of claim 13, wherein the first user interface concurrently presents:

(i) a first user-specified text spelling of a first content item of the plurality of content items,
(ii) a first audio recording for the first content item,
(iii) a first user-specified phonetic representation of multiple component sounds of the first content item depicted with multiple respective text strings,
(iv) a second user-specified text spelling of a second content item of the plurality of content items,
(v) a second audio recording for the second content item, and
(vi) a second user-specified phonetic representation of multiple component sounds of the second content item depicted with multiple respective text strings.

15. The computing system of claim 13, wherein:
determining whether the user-supplied audio matches the respective content item includes:

(a) providing the user-supplied audio recording to a sound-identifying process that identifies multiple component sounds within the user-supplied audio,
(b) accessing the user-specified phonetic representation of the multiple component sounds of the respective content item, which was defined by the hand input as multiple text strings that correspond to the multiple component sounds,
(c) running a pre-configured routine, for each respective text string of the multiple text strings that define the user-specified phonetic representation of the multiple component sounds of the respective content item, to determine whether the respective text string matches audio data indicated by the corresponding component sounds of the multiple component sounds, such that multiple pre-configured routines are run, one for each text string of the multiple text strings.

16. The computing system of claim 15, wherein the user-specified phonetic representation of the multiple component sounds of the respective content item identifies two or more sounds from among a collection of sounds, the collection of sounds including multiple sounds for each of various different alphabetical letters.

17. The computing system of claim 15, wherein:
presenting the indication regarding whether the computing system determined the user-supplied audio to match the respective content item includes presenting (a) a text representation of the respective content item, (b) an indication that a first letter in the respective content item was spoken satisfactorily, the first letter corresponding to a first component sound of the multiple component sounds, and (c) an indication that a second letter in the respective content item was spoken unsatisfactorily, the second letter corresponding to a second component sound of the multiple component sounds.

18. The computing system of claim 11, wherein receiving the user input that interacts with the user controls of the second user interface to assign the order to the first set of user-selected content items to produce the first ordered set of user-selected content items includes:

displaying, by the computing system, a collection of interface elements that correspond to the first set of user-selected content items; and receiving, by the computing system, user input that interacts with a location at which one interface element from the collection of interface elements is displayed and drags the one interface element to a different location among the collection of interface elements to change an order of the first set of user-selected content items.

19. The computing system of claim 18, wherein receiving the user input that interacts with the user controls of the second user interface to select the first set of user-selected content items includes:

displaying, by the computing system, the collection of interface elements that correspond to (i) the first set of user-selected content items selected for inclusion as part of the first interactive exercise, and (ii) an additional interface element that corresponds to an additional content item that is initially selected from among the plurality of content items for inclusion as part of the first interactive exercise; and receiving, by the computing system, user input that interacts with a location at which the additional interface item is displayed to remove the additional content item from the first interactive exercise and leave the first set of user-selected content items as those content items selected for the first interactive exercise.

20. The computing system of claim 11, wherein:

the user input provided by hand includes user interaction with a touchscreen to form a freehand line drawing;

determining whether the user input provided by hand matches the respective content item includes:
  (a) identifying a text representation of the freehand line drawing, and
  (b) determining whether the text representation of the freehand line drawing matches the user-specified text spelling of the respective content item; and presenting the indication regarding whether the computing system determined the user input provided by hand to match the respective content item includes:
  (a) presenting a text representation of the respective content item, and
  (b) presenting an indication regarding whether the computing system determined the respective content item to be written satisfactorily, the computing system not presenting the text representation of the respective content item while the computing system was receiving the user interaction with the touchscreen to form the freehand line drawing.

* * * * *